(12) United States Patent
Yoshitake et al.

(10) Patent No.: US 11,941,011 B2
(45) Date of Patent: *Mar. 26, 2024

(54) ADVICE PROVISION METHOD FOR USER USING HOUSEHOLD APPLIANCE WHILE VIEWING TERMINAL SCREEN

(71) Applicant: Panasonic Intellectual Property Corporation of America, Torrance, CA (US)

(72) Inventors: Hiroshi Yoshitake, Chiba (JP); Hideo Umetani, Kanagawa (JP); Kentaro Nakai, Hyogo (JP); Keigo Aso, Kanagawa (JP); Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,391

(22) Filed: Mar. 30, 2023

(65) Prior Publication Data

US 2023/0244679 A1    Aug. 3, 2023

Related U.S. Application Data

(63) Continuation of application No. 17/124,777, filed on Dec. 17, 2020, now Pat. No. 11,645,291, which is a
(Continued)

(30) Foreign Application Priority Data

May 30, 2013   (JP) ................................. 2013-114485

(51) Int. Cl.
*G06F 16/2457* (2019.01)
*G06F 3/0482* (2013.01)
(Continued)

(52) U.S. Cl.
CPC ...... *G06F 16/24578* (2019.01); *G06F 3/0482* (2013.01); *G06F 16/35* (2019.01); *G06Q 10/10* (2013.01); *H04L 67/10* (2013.01)

(58) Field of Classification Search
None
See application file for complete search history.

(56) References Cited

U.S. PATENT DOCUMENTS 7,423,546 B1   9/2008   Aisa
8,461,725 B1   6/2013   Stubbs et al.
(Continued)

FOREIGN PATENT DOCUMENTS

JP   2002-315079   10/2002
JP   2003-196412    7/2003
(Continued)

OTHER PUBLICATIONS

International Search Report (ISR) dated Jul. 15, 2014 in International (PCT) Application No. PCT/JP2014/002075.

*Primary Examiner* — Thu N Nguyen
(74) *Attorney, Agent, or Firm* — Wenderoth, Lind & Ponack, L.L.P.

(57) ABSTRACT

A provision method provides plurality of pieces of advice pertaining to household appliances of a user on a tablet 103. A priority of each piece of advice is changed by determining whether an advice-specific standard for the user the reference that piece of advice is met by an auto-log or overall user information. The pieces of advice are displayed in accordance with determination results. The format of display according to determination results is a list of advice sorted by priority.

24 Claims, 43 Drawing Sheets

Related U.S. Application Data continuation of application No. 16/239,893, filed on Jan. 4, 2019, now Pat. No. 10,902,008, which is a continuation of application No. 14/427,787, filed as application No. PCT/JP2014/002075 on Apr. 10, 2014, now Pat. No. 10,210,217.

(51) Int. Cl.
*G06F 16/35* (2019.01)
*G06Q 10/10* (2023.01)
*H04L 67/10* (2022.01)

(56) References Cited

U.S. PATENT DOCUMENTS

| | | | | |
|---|---|---|---|---|
| 8,976,126 | B2* | 3/2015 | Kim | D06F 33/46 68/3 R |
| 2007/0011195 | A1 | 1/2007 | Kutsumi et al. | |
| 2009/0249643 | A1* | 10/2009 | Harpenau | D06F 34/26 34/524 |
| 2010/0238183 | A1* | 9/2010 | Sakanaka | H04N 21/472 345/501 |
| 2011/0022242 | A1* | 1/2011 | Bukhin | G06F 1/3206 700/291 |
| 2011/0046904 | A1 | 2/2011 | Souilmi | |
| 2011/0061545 | A1* | 3/2011 | Foster | A47J 36/00 99/407 |
| 2011/0242416 | A1 | 10/2011 | Sugiue | |
| 2012/0265586 | A1* | 10/2012 | Mammone | G06Q 50/06 705/14.1 |
| 2012/0290144 | A1* | 11/2012 | Yuasa | H02J 3/14 700/295 |
| 2012/0290230 | A1 | 11/2012 | Berges Gonzalez et al. | |
| 2012/0310416 | A1 | 12/2012 | Tepper et al. | |
| 2013/0009788 | A1 | 1/2013 | Langenberg et al. | |

FOREIGN PATENT DOCUMENTS

| | | |
|---|---|---|
| JP | 2005-228355 | 8/2005 |
| JP | 2007-142761 | 6/2007 |
| JP | 2008-243088 | 10/2008 |
| JP | 2010-218436 | 9/2010 |
| JP | 2011-210073 | 10/2011 |

* cited by examiner

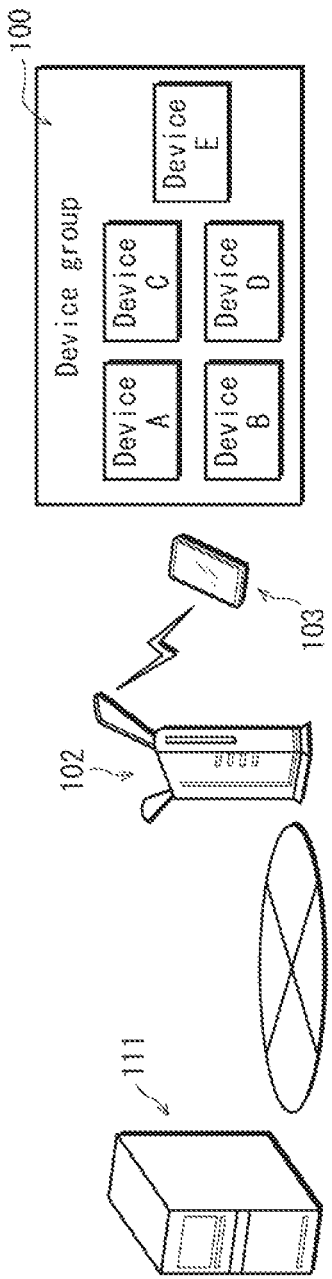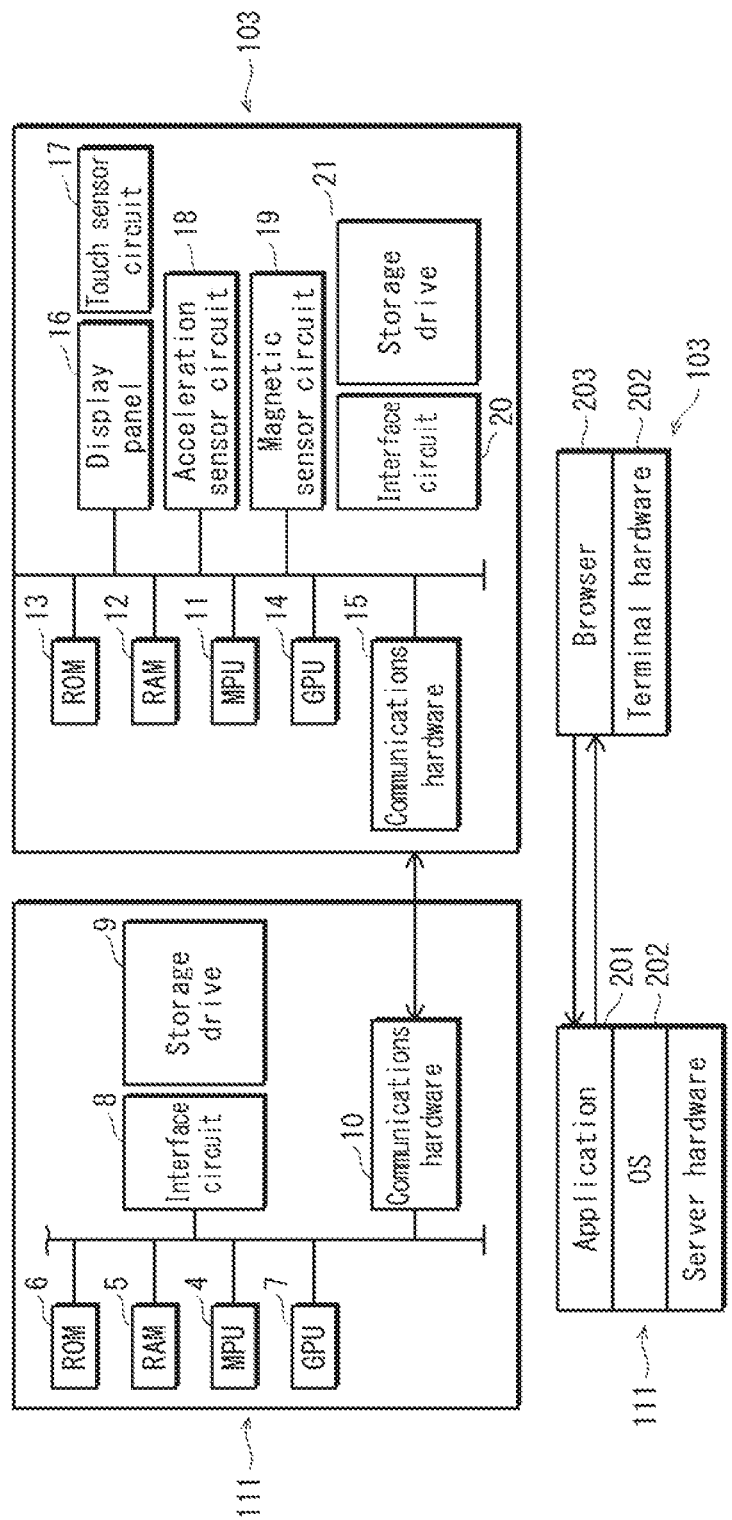
FIG. 2A  FIG. 2B  FIG. 2C

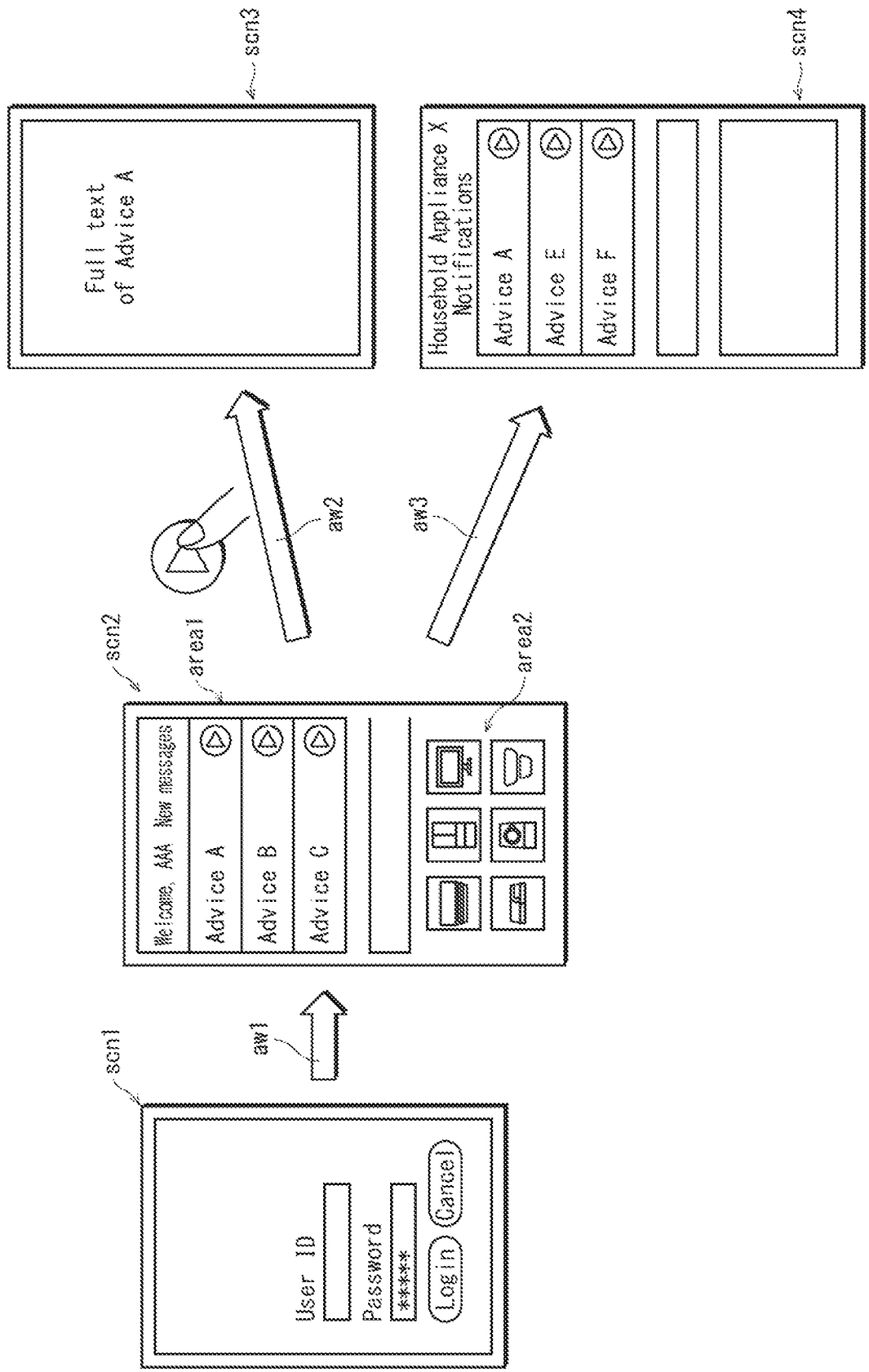

FIG. 6D

Advice configuration
- Advice ID
- Target product code
- Abbreviated display text
- Main data (Text file)
- Reference count by others
- Reference count by user
- Category Support/Recommended
- Method (Command, Script)
- Priority

FIG. 6A

Abbreviated display format

| Bitmap | [Title text] | △ |

FIG. 6B

Full-text display format

| Bitmap | Advice text |

FIG. 6C

| Bitmap | Title text | Reason for priority attachment text |

FIG. 9A

Content.
Advice priority = Initial value + $\sum$ [Increment corresponding to description for profile of person who should reference the advice] × [Weighting coefficient corresponding to newness or type of applied advice] ⊕ [Reference count for others] + [Increment value for self-reference count]

{First term} {Second term} {Third term} {Fourth term}

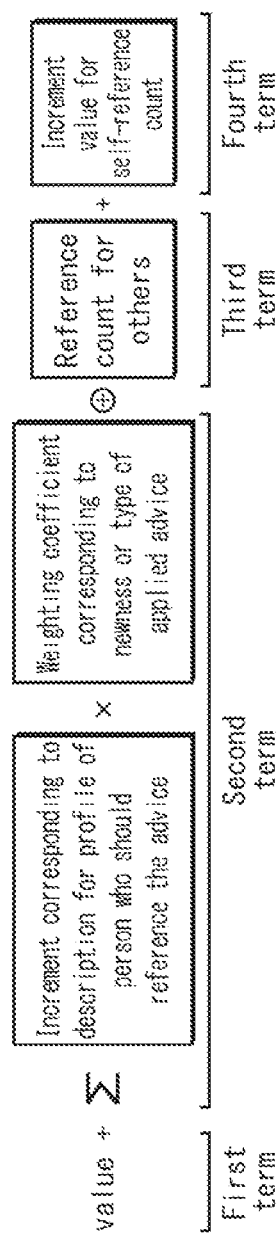

FIG. 9B
Application Principles 1

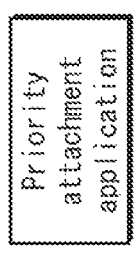

Priority attachment application ↑ref1

Other device log 2013/06/01 — Weighting: Large

Auto-log 2013/05/30 — Weighting: Medium

External information 2012/12/01 — Weighting: Small

FIG. 9C
Application Principles 2

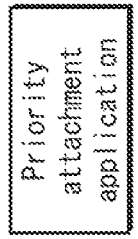

Priority attachment application ↑ref2

Overall user information (Internal information, External information) > Auto-log > Other device log

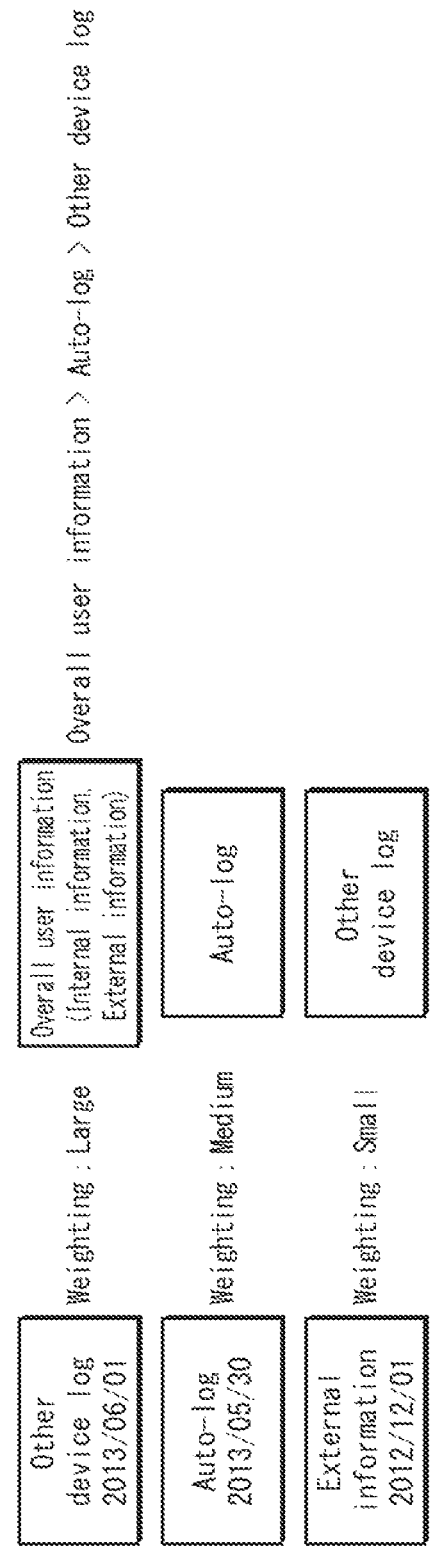

Overall user information (Internal information, External information)

Auto-log

Other device log

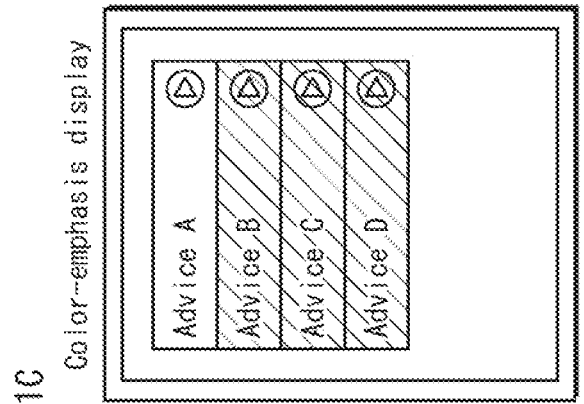
FIG. 11A
List display
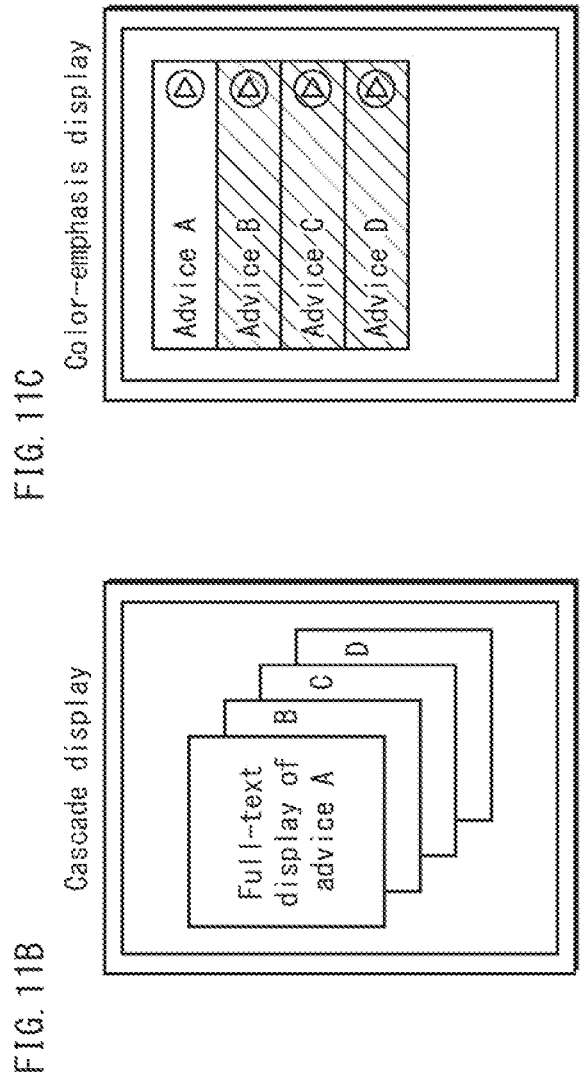
FIG. 11B
Cascade display
FIG. 11C
Color-emphasis display
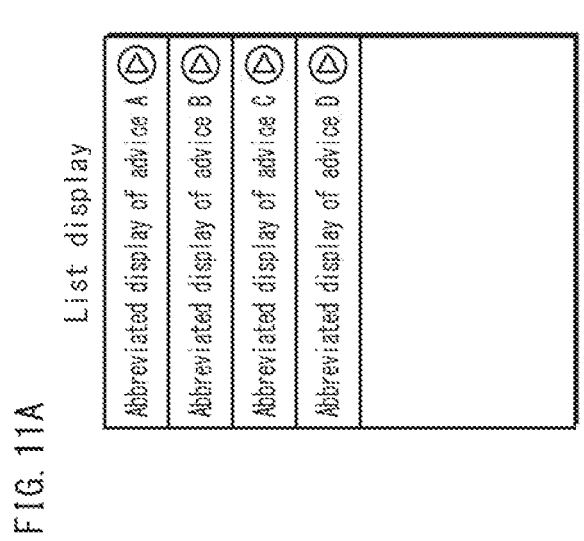
FIG. 11D
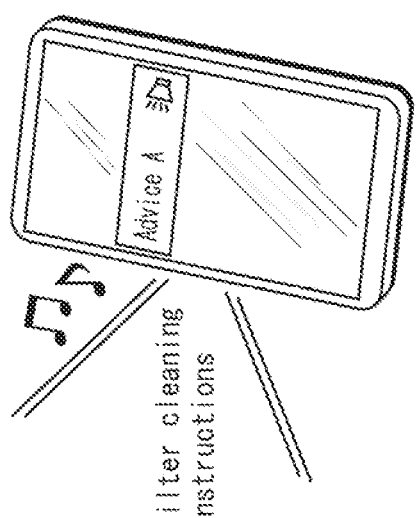
FIG. 11E

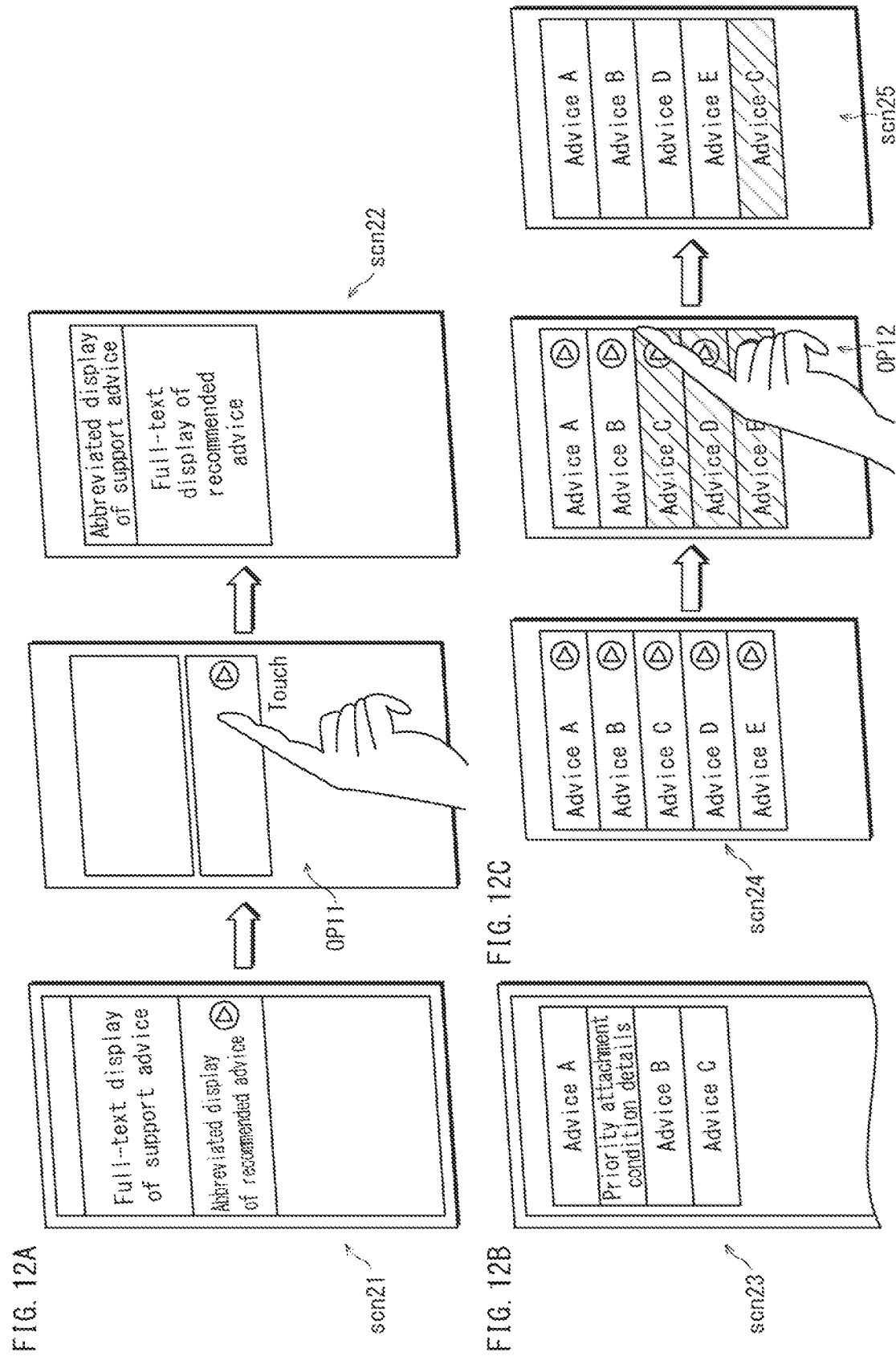

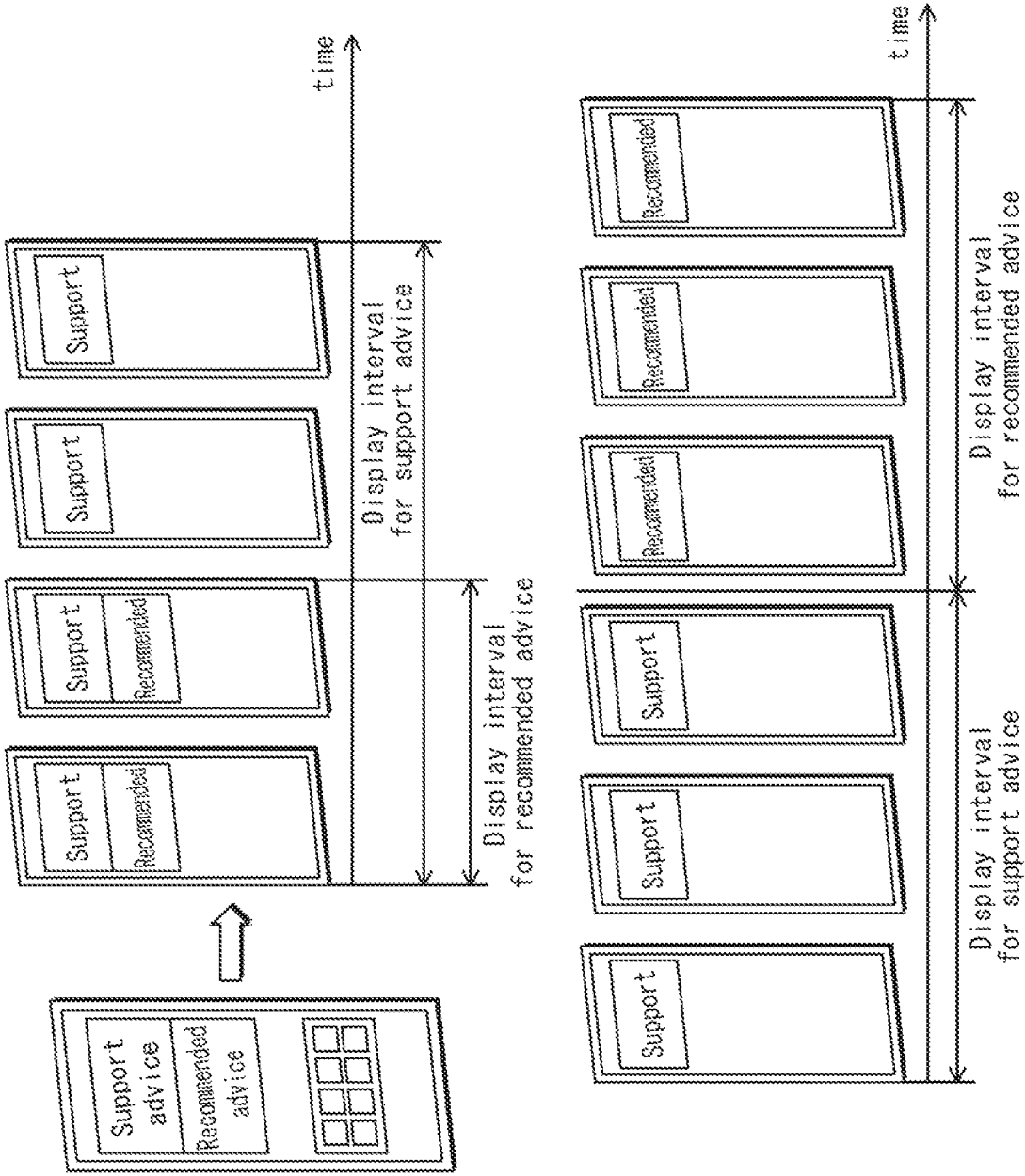

FIG. 15

| | Advice Category | Abbreviated Display | Priority Increment: High/Low Priority Person | Reference Source for Priority Attachment |
|---|---|---|---|---|
| First row | Recommended (Recommendation for an unused function) | Recommendation to use a night course | (High priority)<br>• A person who does laundry at night:a1<br>• A person who is often sensitive to noise:a2<br>• A person living in an apartment and concerned with ambient noise:a3<br>(Low priority)<br>• A person who prefers thorough washing:a4<br>• A person wanting to finish laundry immediately:a5 | a1:Laundry time from 11:00 PM to 4:00 AM (auto-log)<br>a2:Phone ringer set to silent mode (other device log)<br>a2:External information indicates concern with noise<br>a3:Lower volume for TV and music (other device logs)<br>a3:Listens to TV and music using headphones (other device logs)<br>a4:Uses powerful course<br>a5:Does laundry daily or 2-3 times per week (auto-log) |
| Second row | Recommended (For full utilization) | Automating washing and drying saves time and electricity | (High priority)<br>• A person who does not want to hang clothes outside (in some periods):b1<br>• A person concerned with the electricity bill:b2<br>• An ecologically-conscious person:b3<br>• A person wanting to finish quickly:b4<br>• A person who does not know about this function:b5<br>• A person living in an area that will have bad weather the next day:b6<br>• A working person (active at night):b7<br>• A person who does laundry at night:b8<br>• A sloppy person:b9<br>(Low priority)<br>• A person wanting to separate washing and drying:b10<br>• A person living in an area that will have nice weather the next day:b11 | b1:High-pollen period, external information<br>b2:Uses less than average electricity among people in similar circumstances<br>b3:No drying function usage history<br>b4:External information<br>b5:Home cleaning function usage history (auto-log)<br>b6,b11: Weather forecast<br>b7:User registered information, external information<br>b8:Usage history at night (auto-log)<br>b9:External information<br>b10:Volume difference between washing and drying (auto-log) |
| Third row | Recommended (Recommendation for an unused function) | Jet drying can reduce wrinkles for loads 3 kg and under | (High priority)<br>• A working person:c1<br>• A person who does not own or does not use an iron:c2<br>• A person in a dormitory:c3<br>• A person living alone:c4<br>• A person working away from home:c5<br>(Low priority)<br>• A person concerned with noise:c6<br>• A person in a large family:c7<br>• A person concerned with the electricity bill:c8<br>• A highly ecologically-conscious person:c9 | c1:A history of doing laundry at night (auto-log)<br>c2~c6:User registered information<br>c7:Volume and frequency of laundry loads correspond to large family (auto-log)<br>c8,c9:Energy-saving mode set on other devices |

FIG. 16A

| | Advice Category | Abbreviated Display | Priority Increment: High/Low Priority Person | Reference Source for Priority Attachment |
|---|---|---|---|---|
| First row | Recommended (Appliance-related external information) | Notification of weather forecast and pollen information | (High priority)<br>・A person who performs drying outdoors:d1<br>・A person with a pollen allergy:d2<br>(Low priority)<br>・A person who performs drying indoors:d3<br>・A person who uses the automatic drying mode:d4 | d1:Laundry only. in the morning or from noon to 5:00 PM (auto-log)<br>d2:Use of an air purifier (other device log)<br>d1, d3:Registered detergent for indoor or outdoor drying (user registered information)<br>d3:Air conditioner set to clothes drying or dehumidifying mode (other device log)<br>d4:Auto-log |
| Second row | Support (Maintenance) | Cleaning the filter could reduce drying time | (High priority)<br>・A person who has never cleaned the filter:e1<br>・A person who uses the drying function:e2<br>・A person who does not know that cleaning is necessary:e3<br>(Low priority)<br>・A person who has cleaned the filter:e4<br>・A person who does not use the drying function:e5 | e1:Three or more consecutive filter obstructions<br>e2:Uses automatic drying or only uses drying (auto-log)<br>e3:External information<br>e4:User registered information<br>e5:Auto-log |
| Third row | Recommended (For full utilization) | Too much detergent. You only need xx cups of detergent for x kg. | (High priority)<br>・A person concerned with darkening:f1<br>・A person who uses too much detergent:f2<br>・A person who has changed detergents:f3<br>・A person using the laundry machine for the first time:f4 | f1:Laundry machine log (washing fancy clothing) (auto-log)<br>f2:Three or more consecutive over-sudsing incidents. volume at or over threshold (auto-log)<br>f3:Change in registered detergent (user registered information)<br>f4:Usage period within one week |

FIG. 16B

| | Advice Category | Abbreviated Display | Priority Increment: High/Low Priority Person | Reference Source for Priority Attachment |
|---|---|---|---|---|
| First row | Recommended (for full utilization) | Extensive drying time required due to XYZ. Problem solving guide | (High priority)<br>• A person performing drying:g1<br>• A person performing drying for a long time:g2 | g1:Three or more consecutive loads of washing and drying or drying only (auto-log)<br>g2:Drying time exceeds a threshold (auto-log) |
| Second row | Recommended (for full utilization) | Recommendation for course often used by similar people (in terms of family structure, region, etc.) | (High priority)<br>• A person concerned with others:h1<br>• A person unsure about their laundry:h2<br>• A person loosely connected to others on social media:h3<br>• A person wanting more efficiency with laundry and seeking self-improvement:h4 | h1:Age of lifestyle change (user registered information)<br>h2:Subscribes to a mailing list (mailing list registered information)<br>h3:Social media usage history (number of friends, posts, views, likes, comments) (social media information)<br>h4:Uses various menus, not only on laundry machine (other device logs) |
| Third row | Recommended (for full utilization) | Display ranking of popular detergents | (High priority)<br>• A person concerned with others:i1<br>• A person dissatisfied with their current detergent:i2<br>• A person who frequently changes detergents:i3<br>• A detergent manufacturer:i4 | i1:External information<br>i2:Water washing in 1-hour units<br>i3:Change in registered detergent (user registered information)<br>i4:User registered information |
| Fourth row | Support Maintenance | Tank washing recommendation (alongside campaign) | (High priority)<br>• A person who has never used tank washing:j1<br>• A person who frequently does laundry:j2<br>(Low priority)<br>• A person who infrequently does laundry:j3 | j1:Never used tank washing<br>j2:Cumulative laundry total meets or exceeds threshold (auto-log)<br>j3:Cumulative laundry total below threshold |

FIG. 17A

| | Advice Category | Abbreviated Display | Priority Increment: High/Low Priority Person | Reference Source for Priority Attachment |
|---|---|---|---|---|
| First row | Recommended (Recommendation for an unused function) | Recommendation automatic cooking menu suited to recent usage trends | (High priority)<br>・A person wanting to learn more about microwave functions:k1<br>・A person who performs similar cooking without using the automatic cooking function:k2<br>(Low priority)<br>・A person who has decided on functions for ordinary use:k3 | k1:External information<br>k2:Set time on microwave exceeds threshold (auto-log)<br>k3:Auto-log |
| Second row | Recommended (Recommendation for an unused function) | Recommendation to use maintenance function | (High priority)<br>・A person cooking smelly food:l1<br>・A person concerned with odors:l2<br>・A person cooking with oil:l3<br>・A person who does not want to spend time on maintenance:l4<br>・A person approaching a major cleaning period (holidays):l5<br>・A person approaching a regular cleaning period (weekend, time):l6<br>・A person who has just used the microwave:l7<br>(Low priority)<br>・An ecologically-conscious person:l8<br>・A person who cleans the microwave every day:l9 | l1, l3:Usage history of a fish-cooking mode (auto-log)<br>l2:Usage history of an air purifier (air purifier used just after microwave) (other device log)<br>l4:User registered information<br>l5, l6:External information<br>l7:Auto-log<br>l8:External information<br>l9:Timing of cleaning with vacuum cleaner (other device log) |

FIG. 17B

First row:

| Advice Category | Abbreviated Display | Priority Increment: High/Low Priority Person | Reference Source for Priority Attachment |
|---|---|---|---|
| Recommended (Appliance-related external information) | Popular menus related to most frequently cooked menu from past month (CookPad). Cooking lesson referral (ABC Cooking) | (High priority)<br>• A person facing difficulty in daily meal planning:m1<br>(Low priority)<br>• A person who only uses the microwave for reheating, and a person who does not use the microwave for cooking:m2 | m1:User registered information<br>m1:Daytime appliance operations match a homemaker (other device logs)<br>m1:Recording history of cooking programs (other device logs)<br>m2:Usage history of automatic warming mode (auto-log) |
| Recommended | Steps recommended for microwave cooking and for manual cooking | (High priority)<br>• A foodie, a person sensitive to taste differences:n1<br>(Low priority)<br>• A person who is not sensitive to taste differences:n2<br>• A person who prefers simple cooking:n3 | n1:Recording history of foodie programming (other device logs)<br>n2:External information<br>n3:Child-oriented character settings (user registered information) |

Second row:

| Advice Category | Abbreviated Display | Priority Increment: High/Low Priority Person | Reference Source for Priority Attachment |
|---|---|---|---|
| Recommended (Improved functionality) | Recommended keep-warm time for preserving flavor | (High priority)<br>• A person who uses the keep-warm function for long periods:o1<br>(Low priority)<br>• A person who uses the keep-warm function for short periods:o2 | o1:Rice cooker keep-warm time at or over threshold (auto-log)<br>o2:Rice cooker keep-warm time under threshold (auto-log) |

FIG. 18A

Internal information: Single, works for a corporation, lives alone in apartment

External information: Might have pollen allergy

Auto-log:
2013/06/01 11:00 PM to 11:30 PM : Filter obstruction occurred
2013/06/02 11:45 PM to 12:15 AM : Filter obstruction occurred
2013/06/03 11:15 PM to 11:45 PM : Filter obstruction occurred Other device log (TV):
2013/06/01 9:00 PM to 10:00 PM Headphones used

FIG. 18B

| Right-hand side: | Priority attachment |
|---|---|
| Recommendation to use a night course | ... a1+a2+a3 (a1=5, a2=5, a3=5) |
| Recommendation to automate washing and drying | ... b7+b8 (b7=7, b8=8) |
| Recommendation to use jet drying | ... c1+c4+c6 (c1=3, c4=3, c6=3) |
| Recommendation of pollen information from weather forecast | ... d1 (d2=4) |
| Recommendation to clean the filter | ... e1 (e1=100) |

| Recommendation to clean the filter |
| Recommendation to use a night course |
| Recommendation to use jet drying |
| Recommendation to automate washing and drying |
| Recommendation of pollen information from weather forecast |

ADVICE PROVISION METHOD FOR USER USING HOUSEHOLD APPLIANCE WHILE VIEWING TERMINAL SCREEN

TECHNICAL FIELD

The present disclosure pertains to usability support technology for a household appliance.

BACKGROUND ART

Usability support technology for a household appliance is technology supplying a user who has purchased and is using a product with a better usage method. Usability support technology for a household appliance is provided in various forms. A typical form involves providing advice indicating a better usage method for the household appliance to the user who is a registered as a member upon purchasing a product.

CITATION LIST

Patent Literature

Patent Literature 1

Japanese Unexamined Patent Application Publication No. 2002-315079

Patent Literature 2

Japanese Unexamined Patent Application Publication No. 2005-228355

SUMMARY OF INVENTION

Technical Problem

As it happens, there is a trend for the user manual modern multifunctional, multi-purpose household appliances to increase in volume, such that most of the content of the manual for any household appliance does not reach the user. There is a risk that supplying a large amount of advice for using a single household appliance may confuse the user and lead to the household appliance being misused. Displaying the content of the manual in the form of advice on a smartphone or similar terminal constantly carried by the user has been considered. However, covering each piece of advice contained in a manual with the above-described volume requires a large amount of time even to scroll through the display of items on a smartphone. This is not useful to a user holding the smartphone in one hand and attempting to finish chores with the household appliance in a short period of time. Also, a monotonic advice provision method (e.g., providing a sequential list of items, providing frequently-viewed items, etc.) saps user motivation to operate the household appliance when looking at the advice on the terminal screen.

The present disclosure aims to provide rich and varied advice to the user while avoiding confusion for the user.

Solution to Problem

An advice provision method solving the above-described problem involves a system that provides a plurality of pieces of advice pertaining to a household appliance on a user terminal, displaying the pieces of advice that are to be referenced by the user according to priority, and ensuring that the display of the advice is modified according to higher or lower priority corresponding to each piece advice, based on household appliance usage conditions and on user circumstances.

Advantageous Effects of Invention

According to the present disclosure, the priority of advice is changed according to user circumstances or household appliance usage conditions, and the advice is provided to the user in accordance with the priority. Thus, the user is presented with advice on using the household appliance in response to conditions experienced by the user. Information the user needs is provided in the form of advice. Thus, the advice provision of the disclosure makes many daily chores performed using the household appliance more efficient.

Also, the advice provision of the present disclosure is displayed in accordance with priority. Thus, advice narrowed-down to the topic of using the household appliance is made providable to the user. Accordingly, the various functions of the household appliance are demonstrated maximally.

BRIEF DESCRIPTION OF DRAWINGS

FIG. 2A illustrates a server device 111, a wireless LAN base device 102, and a terminal 103, FIG. 2B illustrates the hardware configuration of the server device 111 and the terminal 103, and FIG. 2C illustrates the layer configuration of the server device 111.

FIG. 5 illustrates a screen transition by the terminal 103.

FIG. 6A depicts an example of an abbreviated display format, FIG. 6B depicts an example of a full text display format for advice, FIG. 6C depicts an example of the full text display format with reasons for the priority of the advice attached, and FIG. 6D depicts an instance of an advice configuration file.

FIG. 9A lists an example of a formula for a priority calculation rule applied to advice objects, and FIG. 9B schematically illustrates principles of weighting according to newness of an auto-log and other device log, and FIG. 9C schematically illustrates principles of priority weighting according to type of information among the auto-log, the other device log, and overall user information.

FIG. 11A depicts a basic display format, in which advice objects are displayed in a list, FIG. 11B depicts a cascade display, FIG. 11C depicts a color-emphasis display, FIG. 11D depicts a combination of list display with audio readout, and FIG. 11E depicts revolving display of a plurality of advice objects in a predetermined period.

FIG. 12A depicts a display format combining full-text display of support advice with abbreviated display of recommended advice, FIG. 12B depicts a display format in which a highest-priority advice object is displayed with reasons attached to explain the high priority, and FIG. 12C depicts a display format in which the priority of any advice objects that have been selected at least once by the user is lowered.

FIG. 14A depicts advice objects split into support advice and recommended advice for display, and FIG. 14B depicts support advice and recommended advice displayed in a single display area by time-division.

FIG. 15 is a table of correspondence between a profile of a person who would raise or lower advice priority and a reference source for priority attachment.

FIG. 16A is a table of correspondence between a profile of a person who would raise or lower advice priority and a reference source for priority attachment, and FIG. 16B depicts a table of correspondence between a profile of a person who would raise or lower advice priority and a reference source for priority attachment.

FIG. 17A is a table of correspondence between a profile of a person who would raise or lower advice priority and a reference source for priority attachment, and FIG. 17B is a table of correspondence between a profile of a person who would raise or lower advice priority and a reference source for priority attachment.

FIG. 18A illustrates a user profile (for user AAA), FIG. 18B indicates five pieces of advice to be provided to the user (namely advice recommending the use of a night course, advice to automate washing and drying, advice to use jet drying, advice making a notification about weather forecast and pollen information, and advice to clean the filter), FIG. 18C indicates a calculated priority value for each piece of advice, and FIG. 18D indicates results of sorting the advice in accordance with changes in priority resulting from the calculation.

DESCRIPTION OF EMBODIMENTS (Preamble to Embodiments)

Figure 1A:
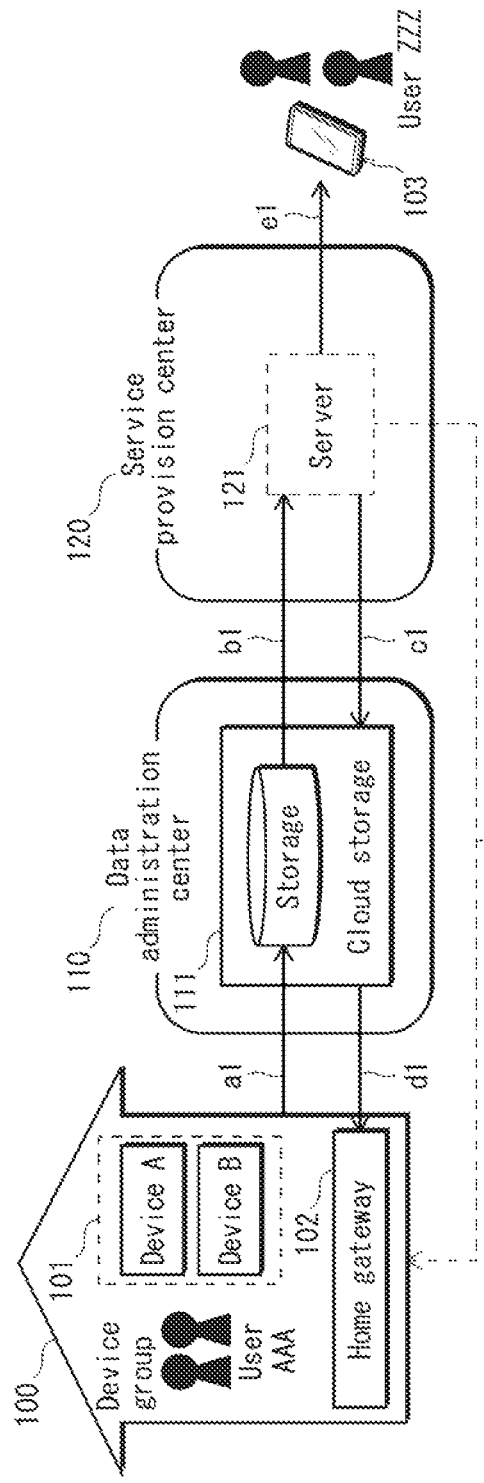
FIG. 1A depicts a computer system for realizing an advice provision method (i.e., an information provision system)

As a basis for the above-described advice provision method, the inventors considered the realization of a computer system that acquires information from various appliances within the household, analyzes the acquired information, and provides feedback to the user.

In the aforementioned Patent Literature 1 and 2, a computer system is described that analyzes information acquired from appliances within the household and provides feedback to the user. Here, a server in the computer system of Patent Literature 1 updates a user information database according to usage status information received from the household appliance. Then, as required, the server references a design information database and the user information database for consulting information indicating a usage method for the household appliance, and provides a feedback to the user by sending the results to the household appliance. However, the computer system described in Patent Literature 1 provides advice to all users according to the usage status information, and thus may simultaneously display many pieces of advice about usage. As such, when the user is simultaneously presented with many pieces of advice, the information required by the user may be buried.

In contrast, the computer system of Patent Literature 2 extracts a historical common operation pattern that satisfies a predetermined condition from operation history data, specifies the operator having the common operation pattern, and determines the service to be provided therefrom. When not possible to provide all of the services at once, then the services to be provided are compared in terms of priority and a highest-priority service is selected from among the plurality of services. However, in the computer system of Patent Literature 2, the priority used as the basis for selection is based on a priority order that is defined in advance. Accordingly, the computer system of Patent Literature 2 has a service priority order that is set in advance and is unable to adapt to changing conditions. Thus, this computer system is unable to realize flexible service provision adapted to household appliance usage conditions and to user conditions.

As discussed above, attempting to solve the problem given in the section "Problems to be Solved by the Invention", namely the risk that supplying a large amount of advice for using a single household appliance may confuse the user and lead to the household appliance being misused, using the above-described computer system of Patent Literature 1 and 2 results in problems of realization such that, when the computer system described in Patent Literature 1 and 2 has an overabundance of required information, some information becomes buried, and in that a flexible provision of services cannot be provided an accordance with household appliance usage conditions and user circumstances.

Embodiments of the present disclosure that solve these problems are described below, with Embodiment 1 being a basic embodiment and Embodiments 2, 3, 4, and so on being derived Embodiments.

1. Basic Embodiment

The above described problem of realization involves a system that provides a plurality of pieces of advice pertaining to a household appliance on a user terminal, displaying the pieces of advice that are to be referenced by the user according to priority, and ensuring that the display of the advice is modified according to higher or lower priority corresponding to each piece advice, based on household appliance usage conditions and on user circumstances. The present Embodiment applies to a case where advice is provided for a household appliance having barely any usage history. Here, reference information in the system has a priority attached thereto such that a higher priority applies to advice that is to be managed as relevant information given the user circumstances. Advice regarding a household appliance that has very little usage history is thus given a change to be displayed. This enables the usage directions for a household appliance that receives little attention to become widely known.

Over time, when there is a change in household appliance usage conditions or in user circumstances, this change affects the display format for the advice, which enables advice provision to be made with flexibility. The user is able to view advice without bias toward frequent pieces of advice, which enables the user to achieve deeper understanding of the household appliance.

The term advice, as used above, refers to data played back for the user while using the household appliance or prior to using the household appliance, and includes useful information regarding the use of the household appliance. Given that all useful information regarding the use of the household appliance is included, the advice includes not assembly instructions for the household appliance and data provided by the vendor of the household appliance (e.g., manuals, help files, tutorials, support information, and recommendations), but also weather information, traffic information, governmental information, news, and other external information.

Here, the above-described information provision system denotes a computer system and may be configured from one or more computers. For example, this term may be widely defined to include a cloud computer system in which a cloud server starts a guest OS on a terminal and performs information provision through an application started by the guest OS, a client-server system in which a server performs information provision in response to a request from a client, a computer system in which computers share a peer-to-peer connection, and a grid computer system in which a computer operates as a grid to perform distributed processing. The term "terminal device" is widely defined to include a laptop computer operated using a pointing device such a mouse or keypad, a notebook computer, a smartphone, a tablet terminal, a register device, and so on. Providing explanations of Embodiments for all of these lower-level concepts would be complex and non-desirable. As such, Embodiment 1 is described below in a case where the terminal device is a smartphone.

When displaying advice, the management of priority-added reference information, indicating which pieces of information are to be referenced among a plurality of pieces of information indicating household appliance usage conditions and user circumstances, may be performed by any computer among the one or more computers making up the information provision system. That is, any of the above-describes server, cloud server, terminal, and client may be used.

2. Substantiation of Household Appliance Conditions and User Circumstances

The household appliance conditions and user circumstances are expandable into substantiation. That is, "insert claim 2 upon confirmation" may apply. The need to display advice for the first household appliance is determined indirectly through the second household appliance, which enables useful information regarding the first household appliance to be provided to the user even when there is little usage history of the first household appliance for making advice.

Also, searching for information to be referenced for priority attachment in the first household appliance log information, the second household appliance log information, and the user information enables determination of high-priority advice. Thus, the advice provision method is realizable as an extension of search technology presented by a search engine, thus enabling high-speed, meticulous advice provision.

2-1. Associating Household Appliance Conditions and User Circumstances

The management performed regarding which pieces of information among information indicating household appliance usage conditions and user circumstances are to be referenced when priority is applied is expanded upon below. Here, the information to be referenced when priority is applied as managed by the system is categorized according to the profile of the user who will reference the advice into information indicating household appliance usage conditions and information indicating user circumstances.

The advice provided in the present Embodiment is thus restricted to suit the user's current lifestyle, preferences, and ideas, which enables for more accuracy in advice provision. Providing the user with advice that has been narrowed down regarding the use of the household appliance enables the various functions fulfilled by the household appliance to be utilized to the greatest possible extent, which in turn enables the manufacturer of the household appliance to improve brand value. Here, the profile of the user may be an image as categorized from various viewpoints. Specific examples include general categorization such as working adult, homemaker, student, and child, as well as occupation, social ranking, differences in experience, personal lifestyle and ideological categories (e.g., an ecologically-conscious person, a person with loose social ties, a person keenly aware of trends), and so on.

3. Relation Between Log Information and User Information

The relationships between log information from a first household appliance, log information from a second household appliance, and user information is expanded upon below. More specifically, when the above-described advice provision method is further modified to raise or lower the priority of each piece of advice according to at least two of log information from the first household appliance, log information from the second household appliance, and user information, then the entries in the log information from the first household appliance, the log information from the second household appliance, and the user information are compared in terms of newness and the priority of the advice is weighted according to the results of this comparison. Taking the newness of the log information and the user information into consideration enables the display conditions of advice to match the latest information rather than information originally registered several years prior, which in turn enables provision of advice suitable to recent user circumstances. Here, newness may be expressed in terms of date or time or similar information. For example, the creation date or update date of the log information and user information may be used.

4. Approach 1 to Consideration of Log Information and User Information

The manner of thinking regarding the respective consideration of the log information from the first household appliance, the log information from the second household appliance, and the user information is expanded upon below. That is, when the above-described advice provision method is further modified to raise or lower the priority of each piece of advice according to at least two of log information from the first household appliance, log information from the second household appliance, and user information, then the entries in the log information from the first household appliance, the log information from the second household appliance, and the user information are weighted in terms of advice priority in accordance with whether or not the priority associated with each entry has been raised or lowered. The amount of change in priority varies according to which of the log information from the first household appliance, the log information from the second household appliance, and the user information describes the profile of the intended user while also examining the log information from the first household appliance, the log information from the second household appliance, and the user information. Thus, the understanding of user circumstances is advanced by one level.

4-1. Substantiation of Advice and User Information

The advice and user information are developed more substantially below. That is, the above-described user information is made up of registered information for the user that is registered within the information provision system and external information for the user that is obtained from an external network via the information provision system. The above-described advice is information that is obtainable from the external network via the information provision system, and may also include appliance-related external information that is to be used in relation to household appliance operation. Each of various types of advice, such as manual information and appliance-related external information, is evaluated along a single dimension, namely priority, which changes the display format for each type of advice. As such, the manual information advice is sometimes displayed in a higher-priority advice format, while at other times, appliance-related external information is displayed in a higher-priority advice format. The advice that is provided is updated at a high frequency when there is an opportunity to view the screen, which enables usage support for the household appliance to be implemented. Also, the change in priority is made using not only the registered information for the user managed within the system, but also takes external information for the user into consideration. As such, a priority change made to change the advice is carried out with high precision.

Also, this includes four combinations, namely cases where the priority of manual information is increased in accordance with registered information, cases where the priority of manual information is increased in accordance with external information for the user, cases where the priority of appliance-related external information is increased in accordance with registered information for the user, and cases where the priority of appliance-related external information is increased in accordance with external information for the user. As such, the user is continuously given an impression of freshness.

5. Approach 2 to Consideration of Log Information and User Information

Another manner of thinking regarding the respective consideration of the log information from the first household appliance, the log information from the second household appliance, and the user information is expanded upon below. Here, the weighting of the priority for the above-described advice is given in the descending order: user information>log information from the first household appliance>log information from the second household appliance. The user information is accurate information registered personally by the user and thus, the user information is centered for evaluation. The log information from the first household appliance and the log information from the second household appliance are treated as auxiliary. This enables advice provision according to the user's perspective.

6. Content Expansion for Reference by Others

The change in priority may also include processing made in response to reference by others. Additional processing pertaining to the above-described advice display involves acquiring a count of references by other users regarding the advice for the household appliance and raising or lowering the priority in accordance with this count, such that the priority of advice for the household appliance referenced by the other user is weighted accordingly. Advice implemented by others is ranked relatively highly, which provides information for a user concerned with the usage by other people. The usage of the household appliance eliminates differences among users and enables progress in appropriate use of the household appliance.

When the change in priority is expressible in terms of advice ranking, then the change is universally applicable. An integer display such as 1, 2, 3, ranks such as AAA, AA, A, A-, or a hardware resource such as memory or a register may be used to store the order. Numbering with tags or links may also apply. The manner in which the priority is changed may involve an increase in priority or a decrease in priority made in accordance with a determination regarding whether or not an advice-specific standard is met. This may be done by adding or subtracting a predetermined increment in accordance with determination results, or by deriving the priority from the determination results by using some type of function or correlation.

7. Content Expansion for Reference by Owner

The change in priority may also include additional processing made in response to reference by the owner. That is, when the advice is displayed, reference conditions are acquired for the user of the advice concerning the household appliance, and a change in priority is made according to the acquired reference conditions for the user such that the priority of a given piece of advice is decreased when the user has already referenced that advice. Decreasing the ranking of advice that has already been referenced by the user enables advice that has not yet been viewed to be made more available.

8. Content Expansion for Silent Mode

The first household appliance and the advice corresponding thereto are expanded upon below in relation to a laundry machine in silent mode. Here, the above-discussed first household appliance is a laundry machine, and the above-discussed advice is a recommendation to select silent mode. The priority of the recommendation to select silent mode is changed in accordance with any of a history of using the laundry machine at night, a history of using a mute mode for an audio-visual device serving as the second household appliance, a history of setting a portable phone serving as the second household appliance to silent mode, and a location indicated in the user information that corresponds to a quiet environment. The recommendation to use silent mode may be made to a user who is sensitive to sound, such that recommendations regarding the usage of the laundry machine are made according to user circumstances.

8.1 Content Expansion for Energy Savings

The advice corresponding to the laundry machine may be expanded to include content relating to energy savings. That is, the advice is a recommendation to automate washing and drying by the laundry machine. The profile of the user to whom the recommendation to automate washing and drying is made describes any of a history of using a house cleaning mode on the first household appliance, a power consumption for the first household appliance or the second household appliance that is remarkably lower than other users in similar conditions, a history of frequent use on high-pollen days, and a high volume of washing and drying. Suggesting the use of the mode also satisfies recent demands for energy savings.

8.2 Content Expansion for Unused Functions

The advice corresponding to the laundry machine may be expanded to include content relating to unused functions. That is, the above-described advice is a recommendation to use a jet drying function on clothing below a predetermined weight. The jet drying function is a mode in which drying is performed by having a heat pump blow air while the laundry tank rotates back and forth. The profile of the user to whom the recommendation to use the jet drying function is made includes a change in the amount of laundry washed and dried per load indicated in the log information for the first household appliance, and may also include the user's work address, a usage history of an iron serving as the second household appliance, and a time slot during which laundry is done daily when these exceed a predetermined value. This enables the prevention of functionality becoming buried as high-tech laundry machines advance further. Suggesting the use of this function enables a reduction in daily household labor.

8-3. Content Expansion for Maintenance

The advice corresponding to the laundry machine may be expanded to include content relating to maintenance. That is, the above-described advice is a recommendation to clean the filter in the laundry machine. The profile of the user to whom the recommendation to clean the filter in the laundry machine is made may include a count of filter obstructions that is equal to or greater than a predetermined value, or a cumulative laundry time that is equal to or greater than a predetermined duration. Continuing to use the laundry machine while there is a filter obstruction may be dangerous, and as such, early warning is desirable for the user.

8-4. Content Expansion for Detergent Amount

The advice corresponding to the laundry machine may be expanded to include content relating to an amount of detergent. That is, the above-described advice concerns a desired improvement when too much detergent is used. The profile of the user to whom the recommendation to improve the use of detergent is made includes any of a usage count of a defoamer that is equal to or greater than a predetermined value, an amount of used detergent that is equal to or greater than a predetermined value, and a change in registered brand of detergent. Reducing the amount of detergent used by the household contributes to protection of the environment.

8-5. Content Expansion for Detergent Use

The advice corresponding to the laundry machine may be expanded to include content relating to a detergent used. That is, the above-described advice is a recommendation to use a given detergent. The profile of the user to whom the advice regarding detergent use is made includes a registered brand of detergent. Beneficially providing a detergent that is appropriate for use with the household appliance enables appropriate detergent selection to be called for. Accordingly, laundry efficiency is increased.

8-6. Content Expansion for Laundry Tank Washing in Household Appliance

The advice corresponding to the laundry machine may be expanded to include content relating to maintenance of the laundry tank in the household appliance. That is, the above-described advice is a recommendation for laundry tank washing. The profile of the user to whom the recommendation to perform laundry tank washing is made includes an indication that the laundry tank has not been cleaned and a cumulative time of laundry that exceeds a predetermined time. This enables attention to be paid to dirt accumulation in the tank, which is often overlooked among daily chores, and prevents premature damage and the like.

9. Content Expansion for Maintenance of a Cooking Device

The advice corresponding to the laundry machine may be expanded to include content relating to maintenance of a cooking device. Here, the above-described first household appliance is a cooking device. The above-described advice is a recommendation to perform maintenance on the cooking device. The priority corresponding to the recommendation to perform maintenance on the cooking device is changed in accordance with one of a history of use for baking and a history of using an air purifier or vacuum cleaner. Accordingly, this enables the user to be made aware of the need to clean accumulated grime from the cooking device.

9-1. Content Expansion for Cooking Device and Cooking Process

Here, the content regarding the advice corresponding to the cooking device is expanded to cover the cooking device and a cooking process. That is, the above-described advice is a recommendation for an automatically-prepared menu. The profile of the user to whom the recommendation to use the automatically-prepared menu is made may include a history of cooking time that exceeds a predetermined threshold. Accordingly, beneficial assistance is provided to a user who is struggling with some type of cooking.

9-2. Content Expansion for Usage of a Cooking Device

Here, the advice corresponding to the cooking device is expanded to cover a usage method for the cooking device. That is, the above-described advice is a process or instructions to which use of the cooking device is applicable. The profile of the user to whom the recommendation to use the process or instructions to which use of the cooking device is applicable is made may include a history of recording foodie-oriented programs on a recording device serving as the second household appliance, and a history of recording children's programming. This enables a homemaker struggling with daily tasks to be provided with cooking methods using a microwave, and is particularly effective for homemakers with a large workload involving childcare.

10. Substantiation of Circumstances According to Priority

Circumstances according to priority are not limited to cases visible to humans, but may also include some sort of information relating to the other senses such as hearing and smell. When information relating to human vision is used, then the substantiation of circumstances according to priority is further expandable. That is, the user terminal displays a plurality of pieces of advice in a list. Display is made according to priority by displaying each piece of advice in the list as ranked according to priority. On the screen, this is displayed as listing the pieces of advice from the top down, which enables effective determination of what to do when using the household appliance.

11. Content Expansion for Cascade Display

The above-described circumstances according to priority are substantially expanded upon below. That is, the user terminal displays a plurality of pieces of advice in superposition. The display according to priority is made with the cascade display by displaying a piece of advice having the highest priority as the front-most. Using the cascade display enables the entire text of a piece of advice having high priority to be seen by the user.

12. Content Expansion for Change in Display Over Time

The above-described circumstances according to priority may also introduce changes over time. That is, the user terminal performs periodic display of a plurality of pieces of advice. Periodic display according to priority involves performing periodic display of advice by selecting a piece of advice having high priority for display on the user terminal, among a plurality of pieces of advice pertaining to the household appliance of the user. After a fixed interval, a piece of advice is re-selected for display on the user terminal from among the pieces of advice having high priority among the plurality of pieces of advice. As such, the selected advice is displayed on the user terminal. The advice automatically changes, even when the user makes no operations. As such, this enables more thorough knowledge to be reliably imparted to the user. This also enables the user to be shown more information content when the terminal screen area is constrained.

13. Content Expansion for Change in Color Over Time

The above-described circumstances according to priority are substantially expanded upon below. That is, the display according to priority involves making a display color of a piece of advice having high priority among a plurality of pieces of advice pertaining to the household appliance of the user different from a display color of other pieces of advice. This makes the piece of advice having high priority more conspicuous, and enables the user to pay more attention thereto.

14. Content Expansion for Voice Introduction

The above-described circumstances according to priority may also include elements appealing to human hearing. That is, a piece of advice judged as having high priority among a plurality of pieces of advice pertaining to the household appliance of the user may be used in an audio notification made to the user. This enables the user's attention to be drawn to the terminal through the use of audio, which enables the content of the piece of advice to be correctly imparted to the user.

15. Attachment of Reasons

The above-described circumstances according to priority are substantially expanded upon below. That is, the display on the user terminal may be accompanied by the conditions making for the high priority of the piece of advice judged as having high priority among the plurality of pieces of advice pertaining to the household appliance of the user. This enables indirect improvement of user actions by presenting the user with reasons why the pieces of advice is being provided.

16. Reference of New and Old Advice

The above-described circumstances according to priority are substantially expanded upon below. That is, log information for the household appliance of the user is acquired, a piece of advice that has been used by the user among the plurality of pieces of advice pertaining to the household appliance of the user is determined based on the acquired log information for the household appliance of the user, and display of the piece of advice determined as having been used by the user is deleted. This enables old advice to be deleted and new advice to be more widely provided the user.

17. Compatibility with a Plurality of Household Appliances

The above-described circumstances according to priority may be expanded in accordance with the household appliance subject to advice. That is, the household appliances of the user are classified into a plurality of categories, and advice pertaining to household appliances of the user that are classified into the same category are displayed simultaneously on the user terminal. This enables advice pertaining to a plurality of related household appliances to be seen collectively by the user, which in turn enables the user to more quickly decide on a course of action to take when performing simultaneous settings or operations on a plurality of household appliances.

18. Restrictions in Accordance with Household Appliance Type

The above-described circumstances according to priority may be restricted in accordance with household appliance type. That is, an icon indicating the household appliance of the user is displayed on the user terminal, and this icon is selectable by the user. Advice pertaining to the household appliance of the user indicated by the icon selected by the user is then displayed on the user terminal. Restricting the displayed advice to the household appliance selected by the user simplifies organization of the advice. A user prioritizing viewing of advice for a frequently-used or recently-purchased household appliance may thus be provided with more useful advice.

19. Restrictions in Accordance with Advice Display Interval

The advice display interval may be realized in accordance with the following aspects. That is, the advice provision method is for a system providing a plurality of pieces of advice pertaining to a household appliance on the user terminal. A display region on the user terminal includes a first region and a second region. The display interval may vary between a piece of advice pertaining to the household appliance of the user displayed in the first region and a piece of advice pertaining to the household appliance of the user displayed in the second region.

Providing respective regions having a long update interval and a short update interval enables a selection of a piece of advice having high priority for longer viewing by the user through disposition in the first region. Conversely, a piece of advice having low priority is updated more frequently, enabling the user to be shown various pieces of advice within a limited time.

20. Other Aspects of Advice Provision

The advice provision method for the system providing a plurality of pieces of advice pertaining to a household appliance on the user terminal may also include the following aspects. That is, the advice pertaining to the household appliance of the user may be categorized into support advice intended for common operation of the household appliance of the user, and recommended advice intended for further improving user-friendliness within the range of common operation of the household appliance of the user. The support advice and the recommended advice are displayed on the user terminal in different formats. The display format differs for different advice types, which enables the user's attention to be drawn toward support advice having high urgency.

21. Restrictions in Accordance with Advice Type

The display format for the advice may be subject to improvements in accordance with advice type. That is, the display interval for the support advice may be longer than the display interval for the recommended advice. The display interval is different for support and recommended advice, which enables easier determination of what to do first when deciding on a course of action. Making the interval allocated to the support advice longer enables the user to be given plenty of time to understand the support provided.

22. Content Expansion Regarding Display Timing of Advice

Additional improvements may be applied regarding the display timing of the advice. That is, the display timing on the user terminal may differ between the support advice and the recommended advice. Changing the display timing enables information selection such that the advice is fully seen by the user and may be allowed to pass.

23. Content Expansion 1 Regarding Terminal Screen Region Distribution

Additional improvements may be applied to the terminal screen region distribution. That is, the support advice is displayed in full on the user terminal, while the recommended advice is abbreviated for display on the user terminal. This enables efficient distribution of the screen region and faster understanding for the user.

24. Content Expansion 2 Regarding Terminal Screen Region Distribution

Additional improvements may be applied to the terminal screen region distribution. That is, the abbreviated recommended advice may be an indication that advice is available. This enables the user to be made aware that multiple pieces of advice are available within a limited screen area.

The below-described Embodiments each represent a specific example of the disclosure. Elements of the below Embodiments such as numerical values, shapes, components, steps, and order of processing are intended only as examples, and not as limitations on the main thrust of the disclosure. Also, among the components of the below-described Embodiments, any component not described as top-level concepts are described as optional components. Also, various content combinations among all of the Embodiments are also applicable.

Embodiment 1

An embodiment of the advice provision method on a computer system is described below, with reference to the accompanying drawings.

(Overall View of Provision Service)

FIG. 1A depicts a computer system for realizing an advice provision method (i.e., an information provision system). The computer system realizes a remote support service for a household appliance. Here, the remote support service is a service that performs monitoring via a network of whether or not a household appliance is operating normally, and that performs troubleshooting or software updates as needed. Various types of information provision are performed as part of the remote support service. The information provision system is configured from a device group 100 (which includes a plurality of household appliances 101 and a home gateway 102), a terminal 103, a data administration center 110 (which includes a cloud server 111), and a service provision center 120 (which includes a server 121).

The device group 100 is a collection of devices installed by a business, group, or family, for example. The household appliances 101, which include devices A and B, and the home gateway 102 are found in the device group 100. The household appliances 101 are a group of household appliances subject to remote support from the information provision system. Here, remote support refers to the cloud server 111 managing the state of the household appliances, which are registered in advance for remote support. The household appliances subject to remote support may include internet-connectable devices (e.g., a television, a video recording device, and so on) as well as devices that are not able to connect to the internet directly (e.g., a light fixture, a laundry machine, a refrigerator, and so on). The latter devices are unable to connect to the internet directly, but include devices that are able to connect to the internet through the home gateway 102. The user using these household appliances 101 is termed User AAA.

Figure 1B:
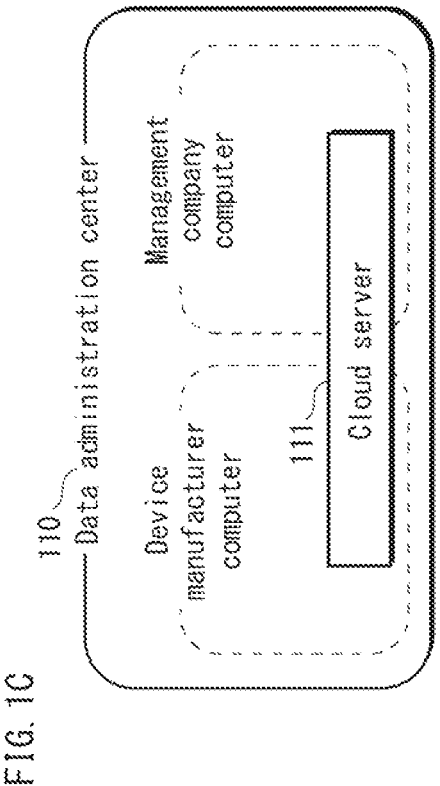
FIG. 1B depicts a situation where a device manufacturer both manages a data management and a cloud server 111 and has a computer acting as a data administration center 110.
Figure 1C:
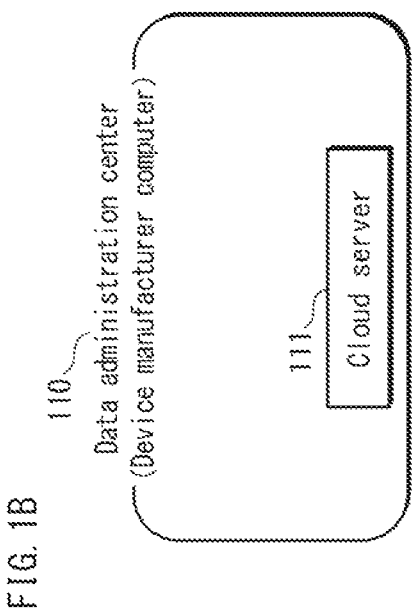
FIG. 1C depicts a situation where the device manufacturer and another management company merge or split and continue data management and cloud server 111 administration, with a computer belonging to either one or both serving as the data administration center 110.

The terminal 103 is a portable terminal that is able to communicate with the cloud server 111, such as a smartphone or a tablet terminal. When outside the information provision system, the user referencing the information (indicated as User ZZZ in FIG. 1) receives information provided through this terminal 103.

The data administration center 110 is configured from a company intranet installed by a data center operator, and performs data management, data center administration, and so on in order to realize the remote support service. Here, data management refers to receiving a user registration from the user upon purchase of any household appliance, and managing the user having performed the user registration as a member of the remote support service. The user registration includes registration of the household appliance that is subject to remote support and member registration of the user as a member of the remote support service. The data administration center 110 manages information on any registered household appliance and registered information on the user input upon member registration. The data administration center 110 manages registered information on the user, such as an ID, name, home address, work address, and so on, from the member registration.

Also, at user registration, URL input is performed for any social media site, blog, or website pertaining to the user. This input is received in order to acquire information pertaining to the user from external networks. In addition, the data administration center 110 specifies a household appliance as being subject to remote support service by using a product code of that household appliance, which is within the registered household appliance information. The data administration center 110 is not limited to a company performing only data management and cloud server 111 administration. For example, a device manufacturer developing and manufacturing one of the devices among the household appliances 101 may have a computer serving as the data administration center 110 when the device manufacturer also performs data management and cloud server 111 administration (see FIG. 1B). Furthermore, the data administration center 110 is not limited to a single company. For example, when a device manufacturer and another management company merge or split and continue data management and cloud server 111 administration, then a computer belonging to either one or both may serve as the data administration center 110 (see FIG. 1C). The other management company may be a security company or electric power company. The cloud server 111 is within the data administration center 110, being a virtual server accessing the company intranet installed by the data center operator and the outside Internet without division, and manages big data through connection with various devices via the Internet.

The service provision center 120 is configured from a computer of a service provider. The computer configured as the service provision center 120 includes the server 121. The server 121 is indicated by a dashed line because, in some cases, the service provision center 120 may not have the server 121. For example, the server 121 is unnecessary when the cloud server 111 performs all of the data management.

The flow of information in the above-described service is described next. First, log information is generated with every use of device A or device B in the device group 100 by the user, and this log information is transmitted to the cloud server 111 of the data administration center 110. The cloud server 111 collects the log information for device A or device B in cloud server storage (see arrow a1). Here, the log information is information indicating, for example, operating conditions and operation dates for the household appliances 101. For instance, this may include a television viewing history, recording schedule information for a recorder, date and time of operation as well as laundry volume for a laundry machine, a date, time, and frequency of opening and closing for a refrigerator, and so on. The log information may also be provided directly to the cloud server 111 by the household appliances 101 via the Internet. Also, as indicated by arrow d1, the log information may be collected by the home gateway 102 and provided to the cloud server 111 by the home gateway 102.

Next, the cloud server 111 of the data administration center 110 provides the collected log information to the service provision center 120 in constant units. The unit of provision may be a unit of information collected and organized by the data center operator and providable to the service provision center 120, or may be a unit of information required by the service provision center 120. Although constant units are indicated, the amount of information provided may also fluctuate and need not always be constant.

The log information is stored by the server 121 within the service provision center 120 as needed, through the storage of the cloud server 111. The service provision center 120 then organizes the log information into information suitable for the service provided to the user, and provides the result to the user. The user who receives this organized information may be both user AAA using the household appliances 101 or may be an external user ZZZ. The service provision method for the user involves a provision path is indicated by arrows f1 and e1. That is, there is a provision path for provision to the user through the service provider. Cases where user AAA and ZZZ are separate people and where they are the same person are both possible. Embodiment 1, below, describes a case in which user AAA and user ZZZ are the same person, and which the device group 100 is present.

Also, the service provision method for the user may use the provision path shown by arrows c1 and d1. That is, provision to the user may be made by re-passing through the cloud server 111 of the data administration center 110. The cloud server 111 of the data administration center 110 is able to organize the log information to be suitable for the service provided to the user. The service provision center 120 is provided with information obtained by organizing. The following explanation applies to a server (i.e., the server device 111) having the functions of the cloud server 111 and the service provision center 120 and performing information provision in the above-described information provision system.

The big data management by the cloud server 111 is described next. The big data considered in this document is only accessible through the intranet of the data administration center, and includes internal information managed within the system and external information obtainable from an exterior network via the system. The internal information and the external information relating to the user are described next. The internal information relating to the user is the registered information for the user, input by the user during member registration for the remote support service. The external information relating to the user is information obtainable from an exterior network through the system (e.g., social media information, blog information, website information, and so on).

The internal information and the external information relating to the household appliances are described next. The internal information relating to the household appliances is the log information transmitted from the device group, and online manual information created by a manufacturer and relating to one of the household appliances (e.g., recommendation information for unused functions, tips and tricks, maintenance information, and so on). The external information relating to the household appliances is appliance-related external information, being information obtainable from an external network via the system, such as the information to be displayed on the terminal 103 in connection with usage of the household appliances (e.g., weather information, pollen information, detergent rankings, menus, cooking lesson referrals, and so on).

The information provision by the system is performed when the user, who is a member, logs in, and involves selecting an appropriate piece of advice within an online manual for the household appliance and among the appliance-related external information for the household appliance, and displaying the selected advice on the terminal 103. The piece of advice among the online manual information for the household appliance and the appliance-related external information for the household appliance displayed on the terminal 103 as advice for one logged-in user is termed an advice object.

(Information Provision System Hardware Resources)

The hardware resources of the above-described information provision system are depicted in FIG. 2A. FIG. 2A depicts a wireless LAN base device 102, which is the home gateway installed in the user's home, the terminal 103, and the server device 111. FIG. 2B illustrates the hardware configuration of the server device 111 and the terminal 103. The hardware configuration of the server device 111, depicted on the left-hand side of FIG. 2B, includes a microprocessor unit (hereinafter, MPU) 4, random access memory (hereinafter, RAM) 5, read-only memory (hereinafter, ROM) 6, a graphics processor unit (hereinafter, GPU) 7, an interface circuit 8, a storage drive 9, and communications hardware 10.

The hardware configuration of the terminal 103, depicted on the right-hand side of FIG. 2A, includes an MPU 11, RAM 12, ROM 13, a GPU 14, communications hardware 15, a display panel 16, a touch sensor circuit 17, an acceleration sensor circuit 18, a magnetic sensor circuit 19, an interface circuit 20, and a storage drive 21.

The touch sensor circuit 17 optically or electrically detects an operation of touching the screen of the terminal 103 (i.e., a touch operation) and an operation of gliding along the screen of the terminal 103 (i.e., a flick operation). Surface static capacitive detection is an example of such a detection. Using surface static capacitive detection involves a configuration in which a transparent electrode film (i.e., a conductive layer) is applied over the surface of a glass substrate and has a protective cover layered thereon. Electrodes at the four corners of the glass substrate apply voltage to produce a uniform, low-voltage electric field across the entirety of the panel. When a finger touches the surface, the change in static capacitance is measured at the four corners to specify the coordinates of the finger. Accordingly, the coordinates of a touch operation or a flick operation are detectable.

FIG. 2C illustrates the layer configuration of the server device 111. The layer configuration of the server device 111 is made up of three layers, namely an application layer 201, an operating system (hereinafter, OS) layer 202, and a hardware layer. The OS layer 202 is a platform made up of middle-ware and a file system, and is equipped with a virtual machine. The virtual machine converts an application created in an object-oriented language into native code and causes the MPU to execute the native code. The application running on this OS may include executable code for causing the MPU of the server device 111 to execute the advice provision method.

The hardware resources of the server device 111 and the hardware resources of the terminal 103 in the system are respectively centered on the core hardware resources of the MPU, ROM, and RANI. However, in the software layer, the configuration of the server includes an application 201 and an OS 202 running on the hardware, while the terminal 103 includes a browser 203 for screen execution of the application without the OS, being run directly by the hardware resources.

The user of the system perceives the presence and content of the advice as an advice object being displayed on the browser screen, playback of the text in an advice object by reading aloud, play back of a video tutorial in an advice object, and so on. The terminal 103 and the server device 111 may each perform the construction of the browser screen, using menus and icons for display of the advice object. This concludes the explanation of the system.

(Household Appliances Subject to Advice Provision)

The advice provision by the system is performed for the user of a plurality of household appliances (also termed the device group) installed in a typical home. Appropriate usage of the household appliances is suggested to the user through display of a browser screen that includes a plurality of advice objects on the terminal 103. The household appliances of the present document are devices equipped with specialized functions for the daily life of a typical individual, and are used in connection with food, clothing, shelter, and other needs of the user. Washing clothing and preparing food are part of these functions for the daily life of a typical individual. Thus, the household appliances include a laundry machine and a cooking device. Watching television is also part of the functions for the daily life of a typical individual. Thus, the household appliances include a television and a video recording device. These household appliances may communicate with the server device 111 not only through wired access, but also through wireless access or touch access.

Wireless access is performed through the home gateway and a wireless adapter, and involves the server device 111 being constantly connected to the household appliances. Touch access is performed using the terminal 103 rather than the home gateway and the wireless adapter or equivalents, and involves accumulated communication performed through a wireless tab each time the terminal 103 and the household appliances touch. The accumulated communication involves the household appliances constantly accumulating log information indicating the usage of the household appliances and, upon touching the terminal 103, handing over the accumulated log information to the terminal 103 as bundle for transmission to the server device 111 through the terminal 103.

The log information is described next. The log information of the present Embodiment mainly indicates usage conditions for the household appliances. The log information indicates the usage conditions of each household appliance, and includes a usage start time paired with a continuous duration or a usage end time, in association with usage contents and any troubleshooting code or error code. The usage contents indicate mode settings, course selection, parameter settings, and so on for using the household appliance, and may vary among household appliances. The log information may be in various formats. However, in the present Embodiment, the log information is an information unit indicating one usage condition. In order to transfer the log information over a network to record onto a recording medium, the generation of the log information involves storing one or more pieces of the log information in a file (i.e., a log information file). The storage format of the log information file may involve storing one piece of log information per log information file, or may involve storing a plurality of pieces of log information into a single file. In the former storage format, the creation date of the log information file is usable for checking the date and time at which the most recent use of the household appliance ended. In the latter storage format, the update date of the log information file is usable for checking the date and time at which the most recent use of the household appliance ended.

When each piece of log information is stored in an individual log information file, the controller of the corresponding household appliance generates the log information as follows. When usage start by the user is detected, a template defining the format of the log information file is constructed in memory, and the log information file is written to include the start time, a mode setting by the user, a course selection, and a parameter setting. During operation of the household appliance, the controller waits for the end of the operation of the household appliance. Once the operation ends, the log information file is closed to obtain one log information. Afterward, the log information file so generated is transmitted to the server device 111 through one of wired access, wireless access, and touch access.

Figure 3:
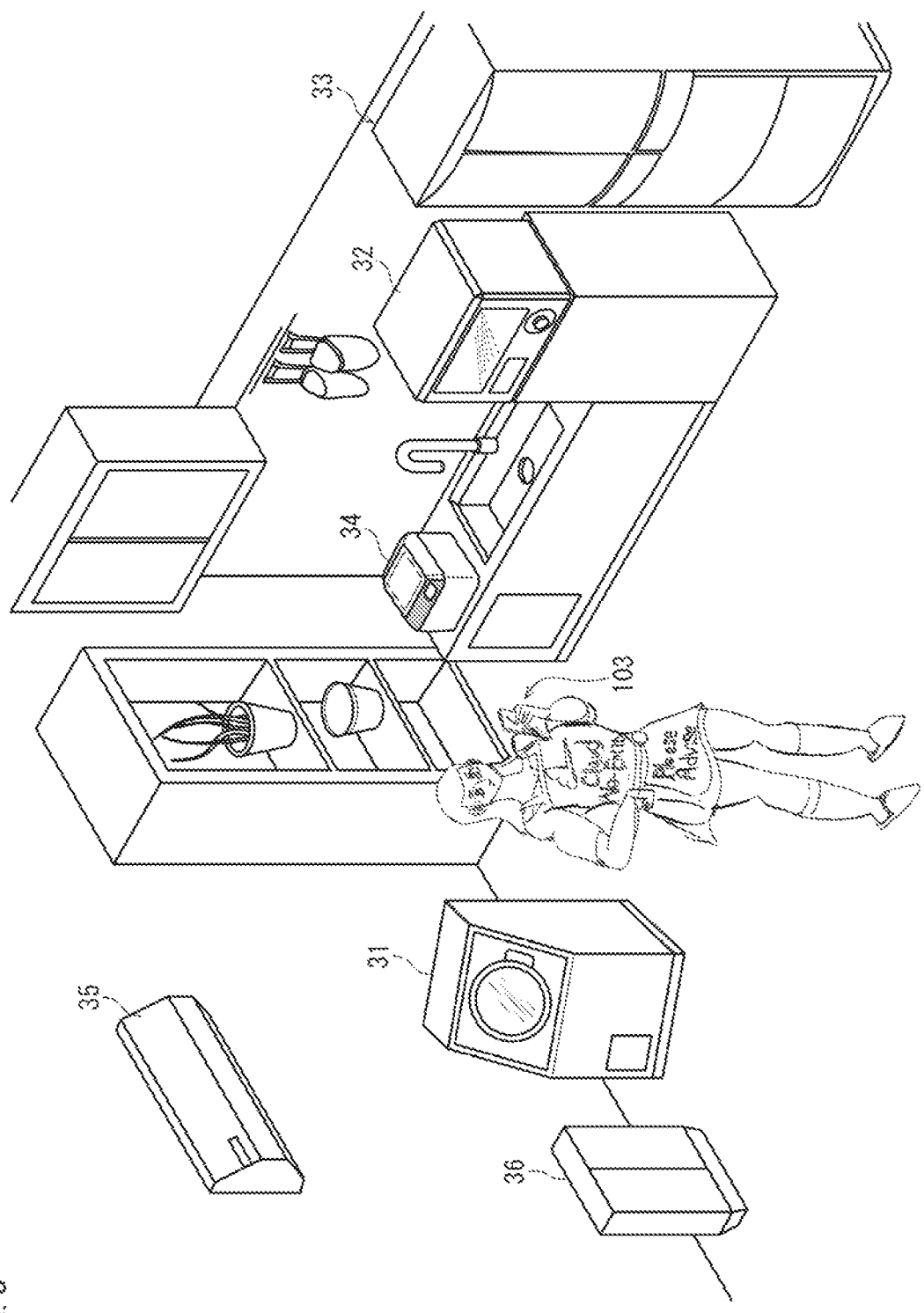
FIG. 3 illustrates an example of a device group.

FIG. 3 depicts an example of a plurality of household appliances making up the device group. In FIG. 3, user AAA, who is a member of the information provision service, is holding a smartphone in one hand and appears to be performing daily chores such as laundry and cooking. As shown, the device group includes a laundry machine 31, a cooking device 32, a refrigerator 33, a jar rice cooker 34, an air conditioner 35, and an air purifier 36, performing communication using any of the above-described wired access, wireless access, and touch access. The information provision system provides support to the user of these household appliances in the form of an advice object presented through the terminal 103. Although not diagrammed, the household appliances subject to remote support by the server device 111 also include a vacuum cleaner, a television, a video recording device, and a portable phone. Each of the household appliances in the device group is subject to the advice provision method. The role of the advice provision method is to display the advice objects on the terminal 103 held by the user in a place where a plurality of household appliances are located in order to recommend appropriate use of the household appliances. However, explanations are difficult to provide for all of the household appliances. Thus, the explanations are narrowed down to the laundry machine 31 and the cooking device 32 while explanations for the other household appliances are omitted or simplified.

(Laundry Machine 31)

The laundry machine is a drum-type washer-dryer device performing a washing process, a rinsing process, a draining process, and a drying process by having a controller automatically control a water supply system, a waste water system, a drying system, and so on in accordance with a mode setting and a control program. A water tank inside the main body of the laundry machine is provided with a rotating drum that is freely rotatable. The rotating drum is driven to rotate by a motor affixed to the outside of a back surface of the water tank. The rotating drum is directly connected to a motor fixed to the outside of a bottom surface of the water tank. Washing is performed by agitating clothing placed in the rotating drum by opening and closing the door.

The drying system circulates air in the water tank and the rotating drum using a blowing fan motor. The drying system includes a heat pump system that is configured from a filter collecting and trapping lint, a dehumidifier dehumidifying the air introduced after filtering, a heater heating the filtered air into dry, hot air, and so on. Selection of a mode, such as a course of operation, and selections of various functions are made through an operation panel and a display panel on the main body. Once operation start is set through input settings on the operation panel, the operations of the motor, waste water valve, water supply valve, and so on are controlled in accordance with a water level detected in the water tank to perform the washing, rinsing, draining, and drying processes.

(Cooking Device 32)

The cooking device 32 is a dielectric cooking device using dielectric heating to heat a heating target by supplying microwaves to a heating chamber in which the heating target is contained. A microwave oven includes main components such as a magnetron serving as a high-frequency generator generating high-frequency waves, a circulation fan agitating and circulating air in the heating chamber, a convection heater serving as an internal heater heating the air that is circulated in the heating chamber, a temperature sensor detecting the temperature in the heating chamber, a controller, and an input unit. The input unit is equipped with a start switch making an instruction to start heating, a liquid crystal display indicating control content, heating temperature, heating duration, and so on, a switch for switching between high-frequency wave heating and another type of heating, an automatic cooking switch for starting a heating program prepared in advance, and various other switches. The controller performs processing through input to these switches.

This concludes the explanations of the household appliances. An overview of the terminal 103 is provided in conclusion to the explanation of the household appliances.

(Terminal 103 Configuration)

Figure 4:
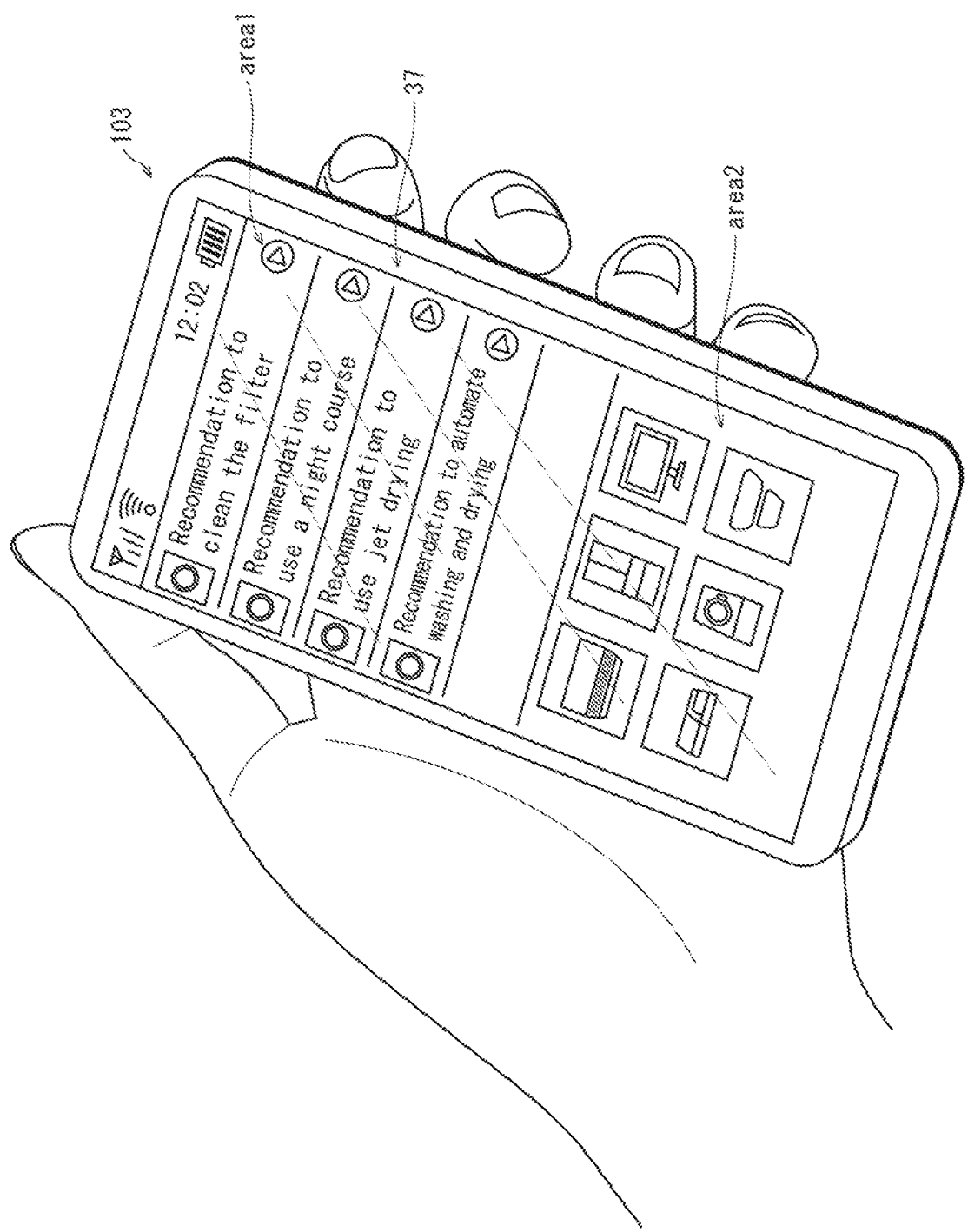
FIG. 4 illustrates an example of the appearance of the terminal 103.

FIG. 4 illustrates an example of the appearance of the terminal 103. As shown, the surface of the terminal 103 includes a touch panel 37. The browser screen is displayed on the touch panel. Graphical user interface (hereinafter, GUI) elements making up the browser screen include text boxes, buttons, links, maximize and minimize boxes, list boxes, scroll bars, check boxes, list menus, windows, and icons.

The content of the screen displayed on the touch panel in FIG. 4 is described next. The content of the screen is the browser screen, displayed on the terminal 103 by the browser. The browser screen includes a recommendation screen area1 that includes a list menu of n advice objects each having priority, and an icon list area2 in which are arranged icons of devices registered as subject to the remote support service.

When the display area for any of the advice objects that are displayed is touched, that advice object is displayed in full. Also, a flick made on the screen causes scrolling of the n advice objects. This scrolling is performed by deleting a topmost of the n advice objects present in the area, raising the respective positions of the second and subsequent advice objects, and arranging an n+1th advice object as the bottommost in the area. Scrolling through the advice objects in response to a flick operation enables lower advice objects to also be provided for display.

The terminal 103 does not perform the construction of the browser screen using menus and icons for display of the advice object. Rather, the server device 111 does so. Thus, the application processing to be performed by the terminal 103 is limited to transmission processing of transmitting an event such as a touch, flick, drag, or key touch on a software keyboard to the server device 111 when there is a user operation on the touch panel, and reception processing of receiving and displaying screen data for the browser screen, which has been created and transmitted by the server device 111.

The browser screen of FIG. 4 transitions into the screens of FIG. 5 through the transmission processing and the reception processing in connection with the server device 111.

FIG. 5 illustrates an example of screen transitions by the terminal 103. These screen transitions take a log-in screen scn1 on the left-hand side as an initial state. Once user authentication is performed in the initial state, the screen transitions into screen scn2, which includes the recommendation screen area2, and the icon list area2 for the devices. In FIG. 5, arrow aw1 indicates the transition. On this screen, a touch on a switching button produces a screen transition as indicated by arrow aw2. As a result, the full-text screen scn3 for the advice object appears. Conversely, when there is a touch any of the device icons, a screen transition to occurs as indicated by arrow aw3. This leads a device-specific screen scn4. This concludes the explanation of the terminal 103. Next, the advice object is explained in detail.

FIGS. 6A-6D illustrate an example of the data configuration for various advice object display formats. The advice object has one of the display formats depicted in FIGS. 6A-6C and has the data configuration depicted in FIG. 6D. FIG. 6A illustrates an example of abbreviated display. In this format, a bitmap symbolizing the target device is arranged at the left-hand edge and abbreviated display text for the advice is arranged in the middle. The abbreviated display text is a simplified version of the advice. Specifically, the abbreviated display text represents the content of the advice in simplified form, such that what to do with the household appliance is clear at a glance. A switching button is arranged at the right-hand edge.

FIG. 6B depicts an example of full text display for the advice. In FIG. 6B, the bitmap symbolizing the target device is arranged at the upper left and the full text of the advice is displayed in the entire remainder of the screen area. FIG. 6C depicts an example of the full text display format with reasons for the priority of the advice attached. A reason for the priority may be, for example, that advice recommending the use of a night course is given priority because the log information indicates a usage interval of 11:00 PM to 4:00 AM, or similar reasoning. This enables deeper understanding of the target household appliance.

The data configuration used to display advice in the above-described formats to each user is described next. An advice object in any of the display formats of FIGS. 6A-6C is an instance of an advice configuration file having the data configuration of FIG. 6D, and is generated for each logged-in user. The data configuration of the advice configuration file is described below. The advice configuration file is configured from an advice ID identifying the advice configuration file, a target product code that is the product code of the target household appliance, abbreviated display text that is a text string for abbreviated display, main data that is text data for full text display or online manual information and appliance-related external information for display as the advice, a reference count by others, a reference count by the user, a category indicating whether the advice configuration file is categorized as support or recommend, a method that is a programming portion of the advice configuration file and that indicates a control method for raising or lower the priority and a command or script for performing an actual operation of the household appliance, and a priority that is calculated at each log-in.

Figure 7:
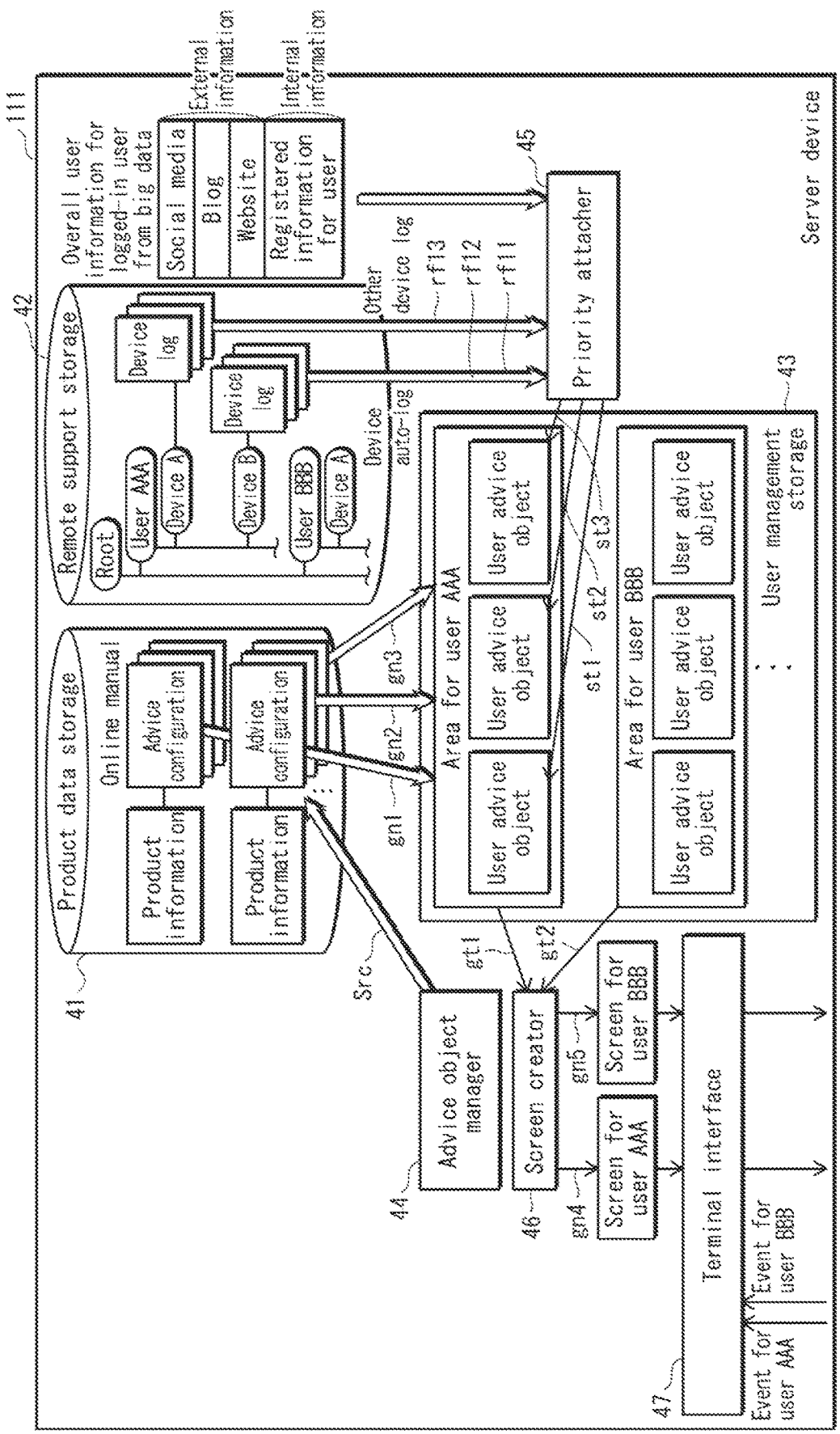
FIG. 7 is a block diagram indicating the functional configuration of the server device 111.

FIG. 7 is a block diagram illustrating the functional configuration of the server device 111. As shown, the server device 111 is configured from product data storage 41, remote support storage 42, user management storage 43, an advice object manager 44, a priority attacher 45, a screen creator 46, and a terminal interface 47. The product data storage 41 stores product information corresponding to each household product manufactured by a manufacturer in association with online manual information for the corresponding product. FIG. 7 depicts a plurality of advice configuration files, each defining a data configuration for online manual information.

The remote support storage 42 collects log information files for the household appliances subject to online support. The remote support storage has a directory corresponding to the users (i.e., a user directory). A household-appliance specific directory for each appliance owned by the user (i.e., a user/appliance directory) is arranged as a sub-directory of the user directory in the remote support storage. The log information files generated as the user uses the household appliances are accumulated in the user/appliance directory for that household appliance within the local storage of the server device 111.

The user management storage 43 includes a plurality of user domain areas (given in FIG. 7 as a user AAA area and a user BBB area), and stores data for each of a plurality of users who are members. When a user who is a member logs into the system, the advice object manager 44 searches the product information stored in the product information storage using all product codes registered in the registered information for that user and loads an advice configuration file corresponding to any hits in the product information from the product data storage 41. Then, the advice object manager 44 generates an instance of the advice configuration file for the logged-in user (also termed a user advice object) in the user domain area for that user within the user management storage 43. The advice object manager 44 generates a plurality of user advice objects by performing the same processing for all logged-in users each time that user logs in. In FIG. 7, arrow Src schematically indicates the searching of the advice configuration file performed by the advice object manager 44 using the product code. Arrows gn1, gn2, and gn3 indicate instance generation based on the advice configuration files found in the search.

The priority attacher 45 calculates a priority for each user advice object generated by the advice object manager 44 and writes the calculated priority into the priority field of that user advice object. In attaching the priority, the priority attacher 45 references not only the log information for the household appliance that is the subject of the advice object (i.e., an auto-log) but also log information from household appliances other than the household appliance that is the subject of the advice object (i.e., other device logs).

In attaching the priority, the priority attacher 45 also references overall user information. The overall user information is overall information on the user that is obtainable through the system, and includes internal information from the system and external information to the system regarding the logged-in user. In FIG. 7, arrows rf11, rf12, and rf13 schematically indicate the priority attacher 45 referencing the auto-log, other device logs, and the overall user information. Arrows st1, st2, and st3 symbolically represent a priority setting set by the priority attacher 45 for each user advice object. The details of priority calculation are described later. The priority attachment by the priority attacher 45 is not only performed when the user is logged in, but may also involve transmission of a new auto-log and other device logs when the user advice object has been referenced by the logged-in user or by another user. Changes in priority may occur as a result of such referencing, or due to the new auto-logs and other device logs. As such, the priority attachment is used in multiple aspects by making use of the auto-log, the other device logs, and the overall user information.

The screen creator 46 creates a browser screen using abbreviated display text or full text display text data for a user advice object having highest priority. When an event indicating an operation made by the logged-in user is transmitted from the terminal 103 to the server device 111, the screen creator 46 performs an update of the browser screen and transmits the updated browser screen to the terminal 103. In FIG. 7, arrows gt1 and gt2 schematically indicate the acquisition of the user advice objects by the screen creator 46. Arrows gn4 and gn5 schematically represent the generation of the browser screen for each user by the screen creator 46. The events transmitted from the terminal 103 include events indicating a reference to the user advice object. Further, the events indicating the reference to the user advice object include events indicating reference by the logged-in user (i.e., a reference by the user), and a reference by a user other than the logged-in user (i.e., a reference by others).

When the transmitted event indicates that the user advice object has been referenced by the logged-in user, then an auto-reference count field of the user advice object for the logged-in user is incremented. Conversely, when a transmitted event from the terminal 103 of another logged-in user indicates that the user advice object has been referenced by a user other than the logged-in user, then an reference count by others field of the user advice object for the logged-in user is incremented These incremented reference counts are reflected in the priority calculation by the priority attacher 45.

The terminal interface 47 performs communication with the logged-in user. These communications include transmitting the browser screen to the terminal 103 held by each logged-in user, and receiving events indicating any operation performed on the browser screens. The server device 111 has a hardware-OS-application hierarchy. The respective hardware resources of the terminal 103 and the server device 103 use the basic configuration of the MPU, ROM, and RAM. Thus, as described above, applications from the advice object manager 44 through the terminal interface 47 are executed by either one of the terminal 103 MPU and the server device 111 MPU. This concludes the explanations of the application for realizing the advice provision method. The priority attacher 45 and the screen creator 46 are particularly important to the realization of the advice provision method. The processing by the priority attacher 45 and the processing by the screen creator 46 are explained in detail below.

Figure 8:
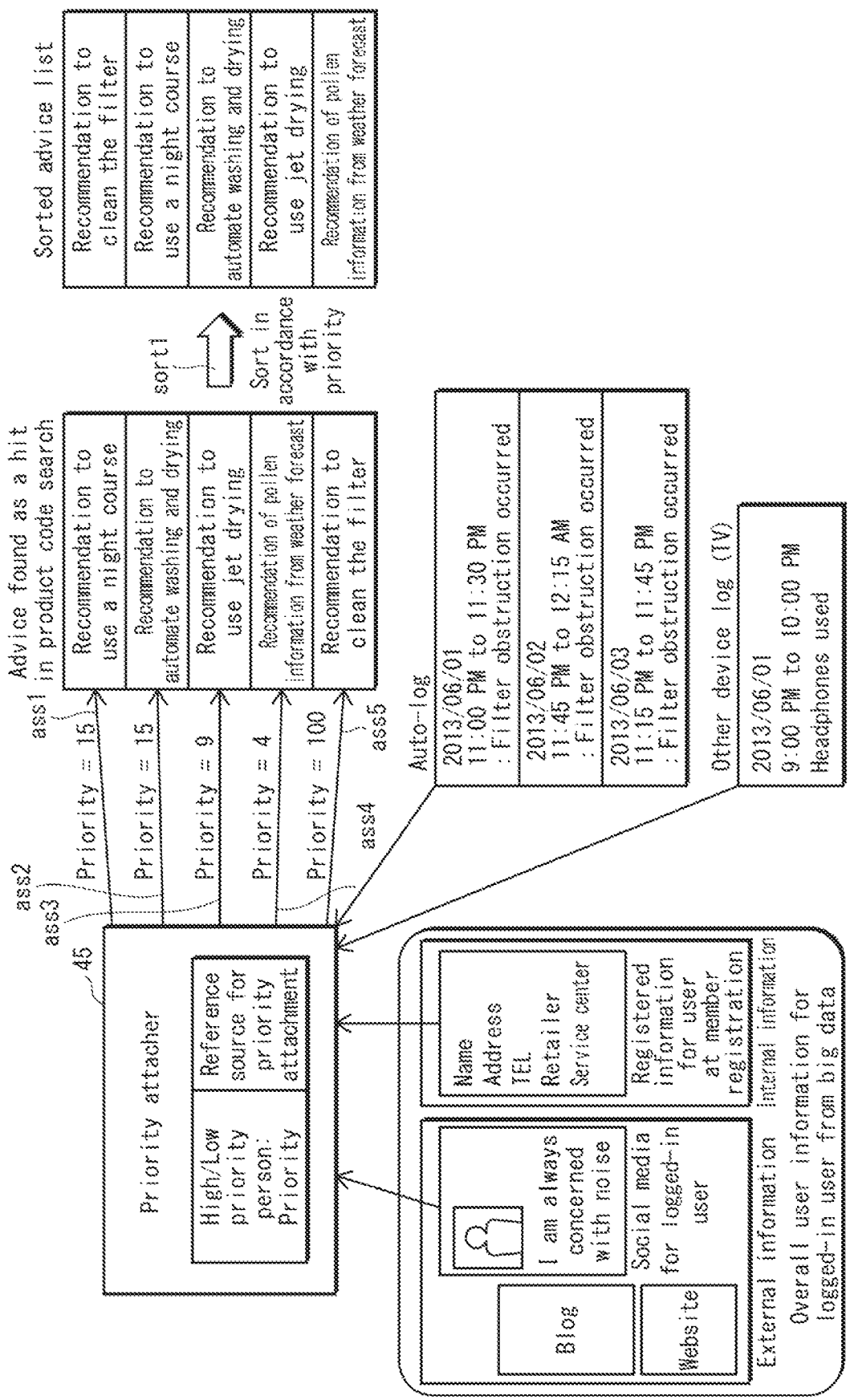
FIG. 8 depicts a priority attacher 45 referencing various information and attaching priority based on these references.

FIG. 8 indicates the priority attacher 45 referencing various information and attaching the priority based on these references. In FIG. 8, a plurality of advice objects listed on the right-hand side of the priority attacher 45 includes five advice objects found as hits in the search using the product code. Here, arrows ass1-ass5 schematically indicate the allocation of priority to each advice object. As indicated by the arrows, five advice objects, namely advice to use a night course, advice to automate washing and drying, advice to use jet drying, informative advice on weather forecasts and pollen information, and advice to change the filter, have a priority of 15, 15, 9, 4, and 100 respectively attached thereto (the method of priority attachment is described later in more detail with reference to FIG. 18). Here, arrow sort1 indicates sorting in accordance with priority. As a result of sorting the left-hand list of advice objects, the advice objects are reordered in the new order of advice to change the filter, advice to use the night course, advice to automate washing and drying, advice to use jet drying, and informative advice on weather forecasts and pollen information.

The priority attachment by the priority attacher 45 includes an initialization performed when the service is started by a user that involves initializing the priority values of the advice objects for that user, and an update performed in accordance with the auto-log, the other device logs, and the overall user information that involves dynamically raising or lowering the priority. The initialization and update in the priority attachment are together termed priority setting.

The priority attachment by the priority attacher 45 is described in detail below, with reference to different drawings. FIG. 9A depicts an example of a formula for a priority calculation rule applied to the advice objects. In this formula, the basis for priority calculation is given on the right-hand side of the equal sign. The first term is an initial value of priority for the advice object. The second term is a summation operation. This summation operation takes the sum upon application of a weighting coefficient by a predetermined increment. The predetermined increment is the amount of change in priority. This value is added to the initial value of the priority according to the presence of information pertaining to the person who is to reference the advice object in the auto-log, the other device logs, and the overall user information. The third term is an increment value for the reference count by others, and the fourth term is an increment value for the reference count by the user.

The weighting applied to the second term of the formula is described next. The basis for the weighting by the aforementioned weighting coefficient is the presence of information indicating that information pertaining to the user who is to reference the advice object is found in any of the auto-log, the other device log, and the overall user information, or the relative newness of the creation date or update date of information in which the information pertaining to the user who is to reference the advice object is desired. A system administrator decides what basis for weighting will be used. As for the timing of the above-described weighting factor, it is applied when the advice object is displayed on the terminal 103. The above-described presence, creation date, and update date each change over time.

Referencing the creation date or the update date of the files storing the external information, namely the social media information, the blog information, and the website information making up the overall user information, enables the creation date or the update date of the social media information, the blog information, and the website information to be understood. Likewise, referencing the creation date or the update date of the log information file storing the log information also enables the date and time at which the log information was last accessed to be understood. In the storage format where each file stores one piece of log information, the creation date of a given piece of log information signifies the date and time at which the corresponding usage ended. In the storage format where each file stores a plurality of pieces of log information, the update date of a given piece of log information signifies the date and time at which the most recent usage among a plurality of usage instances ended. Accordingly, in the present Embodiment, the relative newness of the auto-log and the overall user information is determined by comparing the creation date or the update date of the file storing the external information to the creation date of the update date of the file storing the log information, and weighting is performed in accordance with determination results. The choice of whether to perform weighting according to presence or newness may be made dynamically by some sort of algorithm.

FIG. 9B schematically indicates the principles of weighting according to newness of the auto-log and the other device log. The ordering of the other device log, the auto-log. and the overall user information under the priority attacher 45 is reordered when the auto-log is updated, when the other device log is updated, and when the overall user information is updated, producing the order auto-log, other device logs, and overall user information, as stated. In FIG.

9B, the arrow ref1 schematically indicates the referencing of these types of information. Among these pieces of information, the other device log has a date of Jun. 1, 2013, which is the newest and thus most heavily weighted. The reasoning is that the newest log information is considered to more noticeably reflect the user's recent conditions.

FIG. 9C schematically indicates the principles of priority weighting according to the type of information among the auto-log, the other device logs, and the overall user information. The ordering of the overall user information, the auto-log, and the other device logs directly below the priority attacher 45 represents the weight evaluation of the overall user information contents. That is, the weighting reflects evaluation principles such that the social media information and the blog information more prominently represent the user's thoughts. As such, the priority attacher 45 works to understand the user circumstances and the usage conditions of the household appliance by weighting according to the newness of information or the type of information.

Figure 10A:
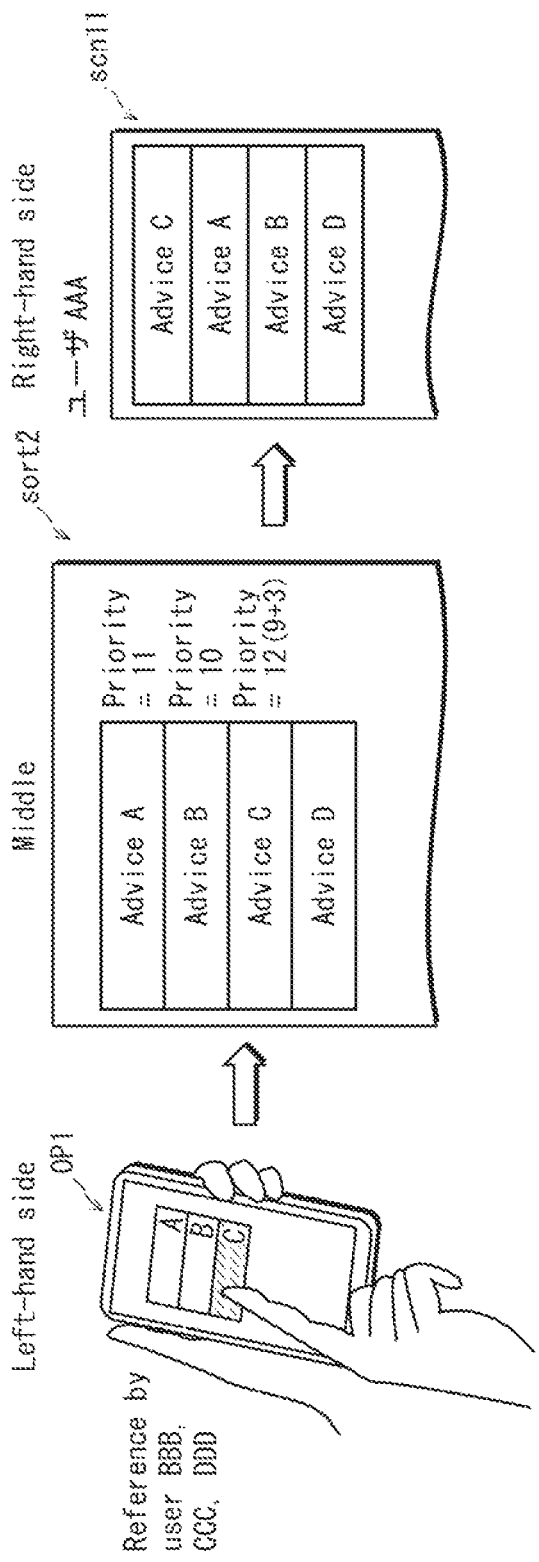
FIG. 10A illustrates priority attachment performed by calculating a reference count by others.
Figure 10B:
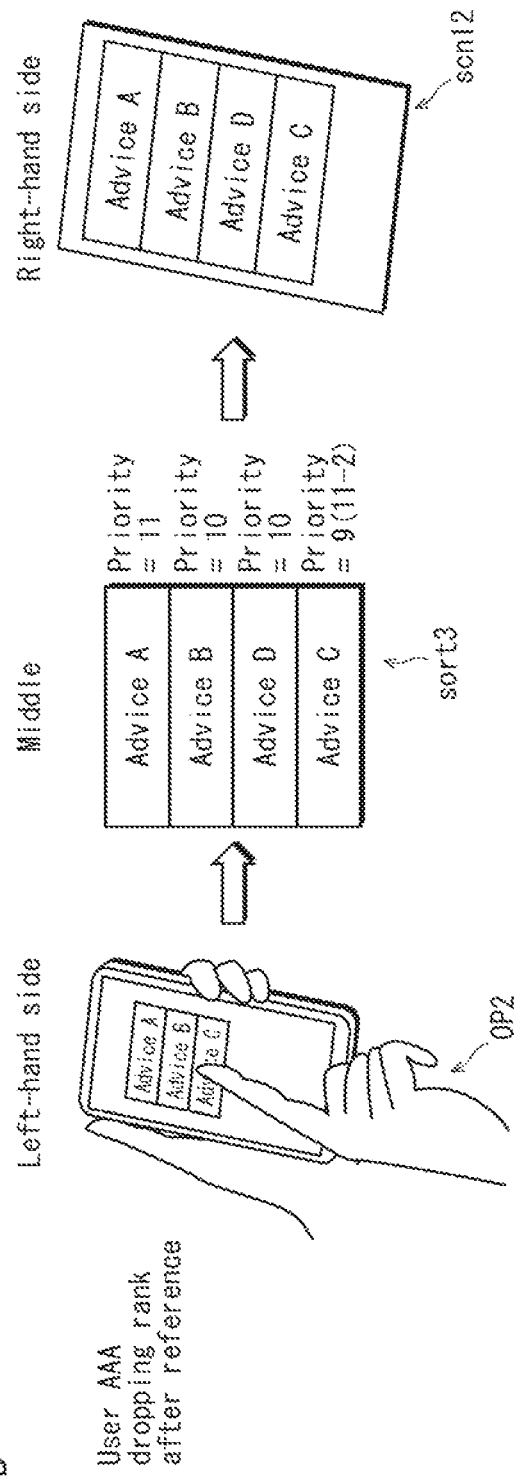
FIG. 10B illustrates priority attachment performed by changing the priority according to whether or not the user has performed referencing.

The change in priority applied by the priority attacher 45 in response to referencing the user advice object is described next. Referencing may occur on the level of browsing, in which case the user expresses interest in the advice object by displaying the details of the advice object, and on the level of applying, in which case the user actually operates the household appliance in accordance with the advice object. Here, applying includes accessing a relevant website through a link embedded in the advice object, as well as using a control command embedded in the advice object to apply a setting to the household appliance. An individual user applying the advice object is sufficient to lower the value of that advice object. Conversely, another person applying the advice object is sufficient to relatively raise the value of that advice object. FIGS. 10A and 10B schematically represent raising and lowering in response to referencing by the user and by another person.

FIG. 10A illustrates priority attachment performed by calculating a reference count by others. On the left-hand side, a situation is imagined where three users BBB, CCC, and DDD have performed referencing. Here, operation op1 represents a touch operation on advice C. The middle portion illustrates the change in priority caused by the referencing of advice C. The respective priorities of advice A, advice B, and advice C are originally 11, 10, and 9. However, given that advice C has been referenced by the three users BBB, CCC, and DDD, the priority thereof becomes 12 (=9+3). The arrow sort2 indicates sorting of the advice object according to priority after this change. On the right-hand side, the browser screen scn11 includes a list of the advice objects as reordered in accordance with the priority after the change.

FIG. 10B illustrates priority attachment performed by changing the priority according to whether or not the user has performed referencing. On the left-hand side, advice C is depicted as having been referenced twice by user AAA. Here, operation op2 represents a touch operation on advice C. The middle portion illustrates the change in priority caused by this touch operation. The respective priorities of advice A, advice B, advice C, and advice D are originally 11, 10, 11, and 10. However, given that advice C has been touched twice, the priority of thereof is decreased by the reference count and becomes 9 (=11−2). Here, sort3 indicates sorting in accordance with the priority after this change. Due to this sorting, advice C is now ranked fourth. On the right-hand side, the browser screen scn12 includes a list of the advice objects as reordered in accordance with the priority after the change.

This concludes the detailed explanation of the priority attachment by the priority attacher 45. The details of the advice object display operation by the priority attacher 45 are described next. When constructing the browser screen, the screen creator 46 displays the advice objects in a format suited to the priority thereof. Here, the display format suited to the priority is any format communicating to the user the intent of the provider regarding which of the advice objects should be viewed.

The recommendation screen area of the browser screen has properties. The priority attacher 45 is able to change the display format, set in accordance with the priority of the advice objects, according to the settings of these properties. Variations on the display format in accordance with property settings are depicted in FIGS. 11A-11E and 12A-12C. FIGS. 11A-11E illustrate screen configuration formats by the screen creator 46. FIG. 11A depicts the most basic display format, in which the advice objects are displayed in a list. In this example, the priority attacher 45 supplied a display list containing a predetermined number (here, four) of top-priority advice objects among those found as hits in the search. FIG. 11B depicts a cascade display. In the cascade display, the top four advice objects are cascaded in full text display. A touch on an advice object having lower priority brings that lower-ranked advice object to the front of the screen in detail view. FIG. 11C depicts a color-emphasis display. In this format, the screen creator 46 applies a bright color to a top-priority advice object while the lower-priority advice objects are grayed out for display. FIG. 11D depicts a combination of list display with audio readout. In this format, the abbreviated display of the advice object is combined with playback of the full text of the main data for that advice object as audio from a speaker. FIG. 11E depicts revolving display of a plurality of advice objects in a predetermined period. The horizontal axis of FIG. 11E is a chronological axis, and advice A through D is displayed in repetition over a fixed period on this chronological axis. Given that the advice objects are displayed for only a fixed display interval, the screen creator 46 starts a timer when creating the windows for detailed display. Full-text display of the highest-ranked advice object continues as long as the timer is counting. Once the timer times out, the window for full-text display of the advice object is closed and a window for the next highest-ranked advice object is displayed.

Next, FIGS. 12A-12C depict changes in display format according to category. The category of the advice object may be support advice or recommended advice. The support advice is an advice object for operating an appliance under normal conditions. For example, for the laundry machine, this includes cleaning the filter or tank washing. The recommended advice is for appropriate operation within a range of normal conditions for the household appliance. The difference between categories produces a large change in display format.

FIG. 12A depicts a display format combining full-text display of support advice with abbreviated display of recommended advice. In FIG. 12A, screen scn21 includes full text display of support advice and abbreviated display of recommended advice. On this screen, a touch operation made on the recommended advice (op11 in FIG. 12A) produces a transition to screen scn22 in the browser screen, where abbreviated display of the support advice and full text display of the recommended advice are displayed. That is, in this combination, touching the abbreviated display causes the screen creator 46 to switch the support advice, previously in full-text display, to abbreviated display, and to replace it with full-text display of the recommended advice.

FIG. 12B depicts a display format in which the highest-priority advice object among the plurality of advice objects is displayed with reasons attached to explain the high priority. FIG. 12C depicts a display format in which the priority of any advice objects that have been selected at least once by the user is lowered. The right-hand side screen scn24 depicts a provided list of advice A through advice E. In the middle portion, operation op12 represents a touch operation on advice C. The right-hand screen scn25 depicts a list for display once the priority of advice C has decreased.

Figure 13A:
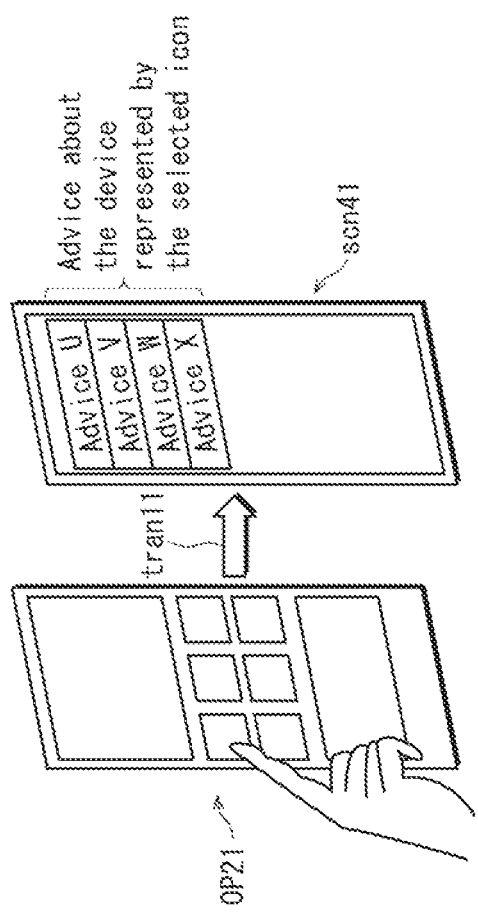
FIG. 13A depicts a situation where advice objects subject to display are unified using the category of the top-ranking advice object.

FIG. 13A depicts a situation where the advice objects subject to display are unified using the category of the top-ranking advice object. Here, the top-ranking advice object is advice A. When advice A is support advice, then advice P, Q, and R, each belonging to the same support advice category as advice A, are displayed instead of advice B, advice C, and advice D, which have the next-highest ranking after advice A.

Figure 13B:
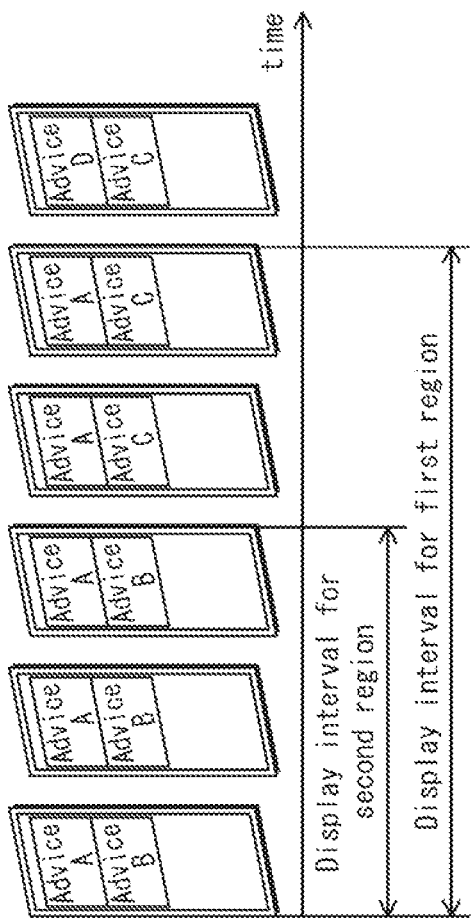
FIG. 13B depicts device-specific advice objects being displayed.
Figure 13C:
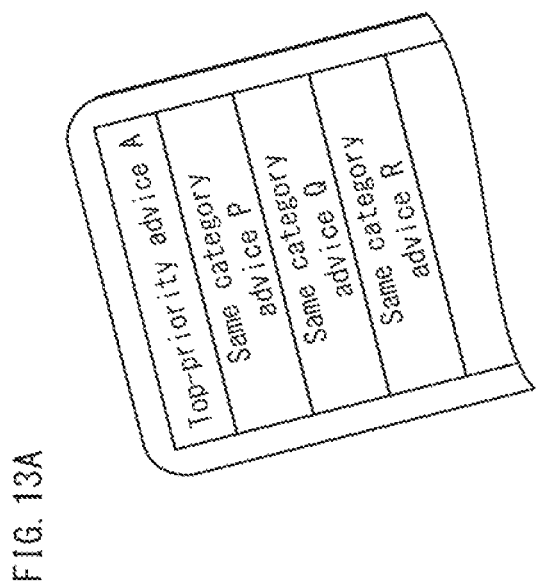
FIG. 13C depicts advice object display in two respective regions, where a first region and a second region have been provided within a new information region.
Figure 13D:
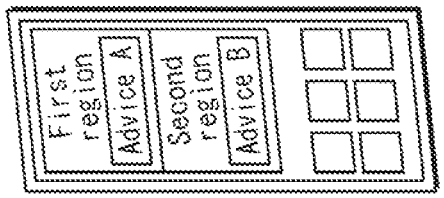
FIG. 13D depicts chronological distribution in the first region and the second region.

FIG. 13B depicts device-specific advice objects being displayed. The left-hand side of FIG. 13B depicts a touch being made to the top left of the device icon list, as indicated by arrow op21. Here, as indicated by screen scn41 on the right-hand side, advice U, V, and W are provided for display, as these advice objects are for the device that has been touched. FIG. 13C depicts advice object display in two respective regions, where a first region and a second region have been provided within a new information region. FIG. 13D depicts chronological distribution in the first region and the second region. In FIG. 13D, the horizontal axis is a chronological axis, the display interval for the first region and the second region being allocated along this chronological axis. Here, after the display interval for the second region has elapsed, the advice object in the second region, namely advice B, is changed to advice C. Advice A, allocated to the first region, is changed to advice D once the display interval for the first region has elapsed. The length of the display interval for the second region (three frames) is shorter than the interval for the first region (five frames), such that the display frequency is higher in the second region than in the first region.

FIG. 14A depicts advice objects split into support advice and recommended advice for display. The right-hand side of FIG. 14A depicts the display of the support advice and the recommended advice over time. With respect to the chronological axis in FIG. 14A, the display interval for the support advice is longer than the display interval for the recommended advice. With respect to the chronological axis of FIG. 14A, the support advice and the recommended advice are reach sequentially displayed in accordance with changing priority.

FIG. 14B depicts support advice and recommended advice displayed in a single display area by time-division. The horizontal axis of FIG. 14B is a chronological axis. The display interval for the support advice and the display interval for the recommended advice are allocated in alternation with respect to the chronological axis. Through this allocation, the support advice and the recommended advice is displayed in order of priority in individual display intervals. This concludes the explanation of the display formats used by the screen creator 46. Now that the explanation of display formats is complete, information referencing in connection with priority attachment for each piece of advice is provided next.

Given that supplying explanations for all of the display formats presented in FIGS. 11A-11E, 12A-12C, 13A-13D, and 14A-14B would be complex, the following explanation refers only to the list display format of FIG. 11A.

(Reference Source for Priority Attachment)

The reference source for priority attachment may be the log information, the the household appliances used by the logged-in user (i.e., the auto-log and the other device logs), and the overall user information. The information provision system of the present Embodiment comprehensively includes these reference sources. As such, reference information for priority attachment is available for each providable piece of advice. The reference information for reference attachment is configured from a reference source category and a description relating to the profile of the person who is to reference the advice at the reference source.

When the reference source for priority attachment includes the description of the profile of the person who is to reference the advice, i.e., when any of the auto-log, the other device logs, and the overall user information include the description of the profile of the person who is to reference the advice, the priority of each advice object is increased by a predetermined increment satisfying an advice-specific standard. This changes the priority of each advice object. Accordingly, the priority is changeable in accordance with the substance of the advice. The profile of the person who is to reference the advice is not restricted to one profile per advice object. Each advice object may correspond to a plurality of profiles in a one-to-many relationship.

FIGS. 15, 16A, 16B, 17A, and 17B indicate the descriptions associated with one or more profiles of people who are to reference the advice object, the reference source for priority attachment, the body of the advice, and the category. As shown, the following elements are commonly shared. The items in the horizontal direction of each table read Advice Category, Abbreviated Display, Priority Increment: High/Low Priority Person, and Reference Source for Priority Attachment. The vertical axis items each list pieces of advice. Here, the designations in the Reference Source for Priority Attachment are not restricted to indicating one of the auto-log, the other device logs, and the overall user information (internal information or external information). The reference source specifies information required as a key. As such, the information acting as a key for the reference source serves to identify whether or not a logged-in user is the person who should reference the advice. The description of the reference source for priority attachment depicted here explains signals for identifying a certain type of person.

(Advice Recommending a Night Course)

The first row of FIG. 15 indicates the details of advice recommending the use of a night course. The Advice Category entry indicates that this piece of advice recommends the use of an unused function, and is thus categorized as recommended advice. The Abbreviated Display entry indicates the format for abbreviated display is text about the night course recommendation. The Priority Increment: High/Low Priority Person entry indicates that the profile of a person who would increase the priority of this advice includes a person who does laundry at night, a person who is often sensitive to noise, a person living in an apartment building, and a person concerned with ambient noise. The profile of a person who would decrease the priority includes a person who prefers thorough washing or a person wanting to finish laundry immediately. In FIG. 15, increments a1 through a5 represent the increment added to the priority of the advice when the logged-in user fits the profile.

The Reference Source of Priority Attachment entry indicates that the reference source for priority attachment is an identification of a person fitting the profile. For this piece of advice, the reference source for priority attachment is the auto-log. A person who does laundry at night is identified as indicated in the Reference Source for Priority Attachment entry for increment a1, by finding whether or not the log information for the laundry machine in the auto-log gives a laundry time at night, which is defined as being from 11:00 PM to 4:00 PM. Given that doing laundry at night requires that attention be paid to noise, when the logged-in user fits the profile, the priority of this advice is increased by increment a1.

A person who is often sensitive to noise is identified as indicated in the Reference Source for Priority Attachment entry for increment a2, by determining whether or not the log information for a portable phone is usually set to silent mode and whether or not the external information (i.e., social media information and blog information for the logged-in user) describes sensitivity to noise. When the logged-in user fits the profile, the priority of this advice is increased by increment a2.

A person living in an apartment building and a person concerned with ambient noise is identified as indicated in the Reference Source for Priority Attachment entry for increment a3 by finding whether or not the log information for a television or audio device (i.e., other device logs) indicates a history of setting the volume low, finding whether or not headphones are used to listen to the television or to music, and finding whether or not the home address in the registered information for the user is the address of an apartment building. In such cases, the logged-in user may be identified as living in an apartment building and being concerned with ambient noise. When the logged-in user fits the profile, the priority of this advice is increased by increment a3.

The logged-in user is identified as preferring thorough washing as indicated in the Reference Source for Priority Attachment entry for increment a4, by finding whether or not the log information for the laundry machine includes a usage history of a powerful course. The powerful course is a laundry machine function that combines pre-washing of a garment surface with high-density detergent, wrap washing of garments with high-density suds, repeated jet shower cycles to cause the detergent to soak in, and final washing by using normal-density detergent to remove everything that has been washed away. The use of such a powerful course suggests that the logged-in user has a strong preference for cleanliness. When the logged-in user fits the profile, the need to make the recommendation with this advice is lower, such that the negative increment a4 is added to the priority value of the advice.

The logged-in user is identified as wanting to finish laundry immediately as indicated in the Reference Source for Priority Attachment entry for increment a5 by finding whether or not the log information for the laundry machine indicates a cleaning frequency that is daily or at least 2 to 3 times per week. A high frequency of laundry suggests that the need for this advice is low. When the logged-in user fits the profile, the negative increment a5 is added to the priority of the advice.

(Advice to Automate Washing and Drying)

The second row of FIG. 15 indicates the details of advice to automate washing and drying. This advice is intended to fully utilize the laundry machine 31, and as such this advice is classified as recommended advice (for full utilization). The content of the abbreviated display communicates to the user that automatic washing and drawing saves time and reduces electricity costs and is therefore worthwhile.

The Priority Increment: High/Low Priority Person entry for the advice to automate washing and drying indicates that the profile of a user who would increase the priority includes a person who does not want to hang laundry outside, a person concerned with the electricity bill, an ecologically-conscious person, a person wanting to finish quickly, a person who does not know about this function, a person living in an area that will have bad weather the next day, a working person (active at night), and a sloppy person. In FIG. 15, increments b1 through b9 represent the increments added to the priority of the advice when the logged-in user fits the profile.

Conversely, the profile of a user who would decrease the priority includes a person wanting to separate washing and drying for clothing that shrinks, and a person living in an area that will have nice weather the next day. In FIG. 15, increments b10 and b11 represent the increment added to the priority of the advice when the logged-in user fits the profile. A person who does not want to hang clothes outside is identified as indicated in the Reference Source for Priority Attachment entry for increment b1, by determining whether a high-pollen period is currently in effect and whether or not the external information for the logged-in user suggests a pollen allergy.

A person concerned with the electricity bill is identified as indicated in the Reference Source for Priority Attachment entry for increment b2, by checking whether the other device logs indicate a lower than average electricity cost given equivalent conditions. An ecologically-conscious person is identified as indicated in the Reference Source for Priority Attachment entry for increment b3 by finding whether or not the auto-log, namely the log information for the laundry machine 31, indicates a usage history for drying. That is, a person who does not use the drying function is likely to be concerned with the electricity bill.

A person who does not know about the automatic washing and drying function is identified as indicated in the Reference Source for Priority Attachment entry for increment b5 by determining whether or not the auto-log indicates a usage history of the home cleaning function. The home cleaning function is a laundry machine function that combines water circulation washing by circulating water in the washing tank through centrifugal force caused by the rotation of the laundry tank and scrubbing through the rotation of a pulsator (a water wheel provided at the bottom of the tank). The home cleaning function is very similar to automatic washing and drying. As such, the auto-log indicating a usage history for this function suggests that the home cleaning function has been confused the automatic washing and drying function. Thus, when there is a usage history of the home cleaning function in the auto-log, increment b5 is added to the priority of this advice.

A user living in an area that will have good or bad weather the next day is identified as indicated in the Reference Source for Priority Attachment entry for increments b6 and b11, by determining whether or not a weather report for the next day at the home address of the logged-in user indicates sunshine, rain, or similar. A working person (active at night) is identified as indicated in the Reference Source for Priority Attachment entry for increment b7, by determining whether or not the registered information for the user indicates an occupation and whether the external information for the user indicates anything relevant.

A person who does laundry at night is identified by determining whether or not the auto-log indicates a history of doing laundry at night. A sloppy person is identified by determining whether or not the external information indicates anything relevant. A person wanting to separate washing and drying for clothing that shrinks is identified as indicated in the Reference Source for Priority Attachment entry for increment b10, by finding whether or not the auto-log indicates a change in volume between washing and drying. The appropriate increment is added to the priority of the advice when the logged-in user fits the profile.

(Use of Jet Drying Function)

The third row of FIG. 15 indicates the details of jet drying advice to recommend the use of a jet drying function. The jet drying function involves rotating the drum of the laundry machine 31 left and right while the heat pump engine blows a jet wind through the drum while reversing. This advice is classified as recommended advice (a recommendation to use an unused function) as per the Category entry. The content of the Abbreviated Display entry for this advice indicates that jet drying can reduce wrinkles in loads that are 3 kg and under. This indicates the volume restriction for the jet drying function while also promoting the advantage of the jet drying function, namely reducing wrinkles, to the logged-in user. The Priority Increment: High/Low Priority Person entry for the advice indicates the profile of a user who would increase the priority includes a working person, a person who does not own or does not use an iron, a person in a dormitory, a person living alone, and a person working away from home. In FIG. 15, increments c1 through c5 represent the increment added to the priority of the advice when the logged-in user fits the profile. The profile of a person who would lower the priority includes a person concerned with noise, a person with a large family, a person concerned with the electricity bill, and a person who is highly ecologically conscious. In FIG. 15, increments c6 through c9 represent the increment added to the priority of the advice when the logged-in user fits the profile.

A working person is identified as indicated in the Reference Source for Priority Attachment entry for increment c1 by determining whether or not there is a usage history for the laundry machine at night. A person who does not own or does not use an iron, a person in a dormitory, a person living alone, and a person working away from home ate identified as indicated in the Reference Source for Priority Attachment entry for increments c2 through c6 in accordance with the registered information for the user.

A person who does not own or does not use an iron is identified by determining whether or not the registered information for the user describes the occupation of the logged-in user. A person in a dormitory is identified by determining whether or not the registered information for the user describes the occupation of the logged-in user but does not list any dependents. A person living alone is identified by determining whether or not the registered information for the user lists any dependents A person working away from home is identified by determining whether or not the registered information for the user lists an occupation and dependents but also indicates a work assignment away from home. A person with a large family is identified as indicated in the Reference Source for Priority Attachment entry for increment c7 by determining whether or not the volume and frequency of laundry loads correspond to a large family. A person concerned with the electricity bill and a person who is highly ecologically conscious are identified as indicated in the Reference Source for Priority Attachment entry for increments c8 and c9 by checking whether the other device logs indicates energy-saving settings.

The appropriate increment is added to the priority of the advice when the logged-in user fits the profile.

(Notification Advice on Weather Forecast and Pollen Information)

The first row of FIG. 16A indicates the details of notification advice on weather forecast and pollen information (i.e., notifications regarding the weather forecast and pollen information). This advice is closely connected to the usage of the household appliances and should be associated with any use of the household appliances. As such, this advice is described as recommended advice (appliance-related external information). The Abbreviated Display content of the advice indicates a notification of the weather forecast or pollen information. The Priority Increment: High/Low Priority Person entry for the advice indicates that the profile of a person who would raise the priority includes a person who performs drying outdoors and a person with a pollen allergy. The profile of a person who would lower the priority includes a person who performs drying indoors and a person who uses the automatic drying mode. In FIG. 16A, increments d1 through d4 represent the increment added to the priority of the advice when the logged-in user fits the profile.

A person who performs drying outdoors is identified as indicated in the Reference Source for Priority Attachment entry for increment d1 by determining whether or not the auto-log indicates laundry performed in the morning or between noon and 5:00 PM or indicates that only washing is performed, and determining whether or not the registered information for the user indicates a brand of detergent for outdoor drying. A person who uses the automatic drying mode is identified by the presence of a usage history for the automatic drying mode or a usage history of a dehumidifying mode in the auto-log.

A person with a pollen allergy is identified as indicated in the Reference Source for Priority Attachment entry for increment d1 by determining whether or not the other device logs indicate a usage history of an air purifier. A person who performs drying indoors is identified as indicated for increment d3 by determining whether the registered information for the user indicates a brand of detergent for indoor drying, and whether or not the other device logs include a usage history of a laundry drying mode or a dehumidifying mode on an air conditioner.

The appropriate increment is added to the priority of the advice when the logged-in user fits the profile.

(Advice to Clean the Filter)

The second row of FIG. 16A indicates the details of advice to clean the filter. The Category entry for the advice indicates that this advice is support advice. The content of the Abbreviated Display entry indicates a reminder to perform filter cleaning, specifically indicating that cleaning the filter reduces drying time. The Priority Increment: High/Low Priority Person entry indicates that the profile of a person who would increase the priority of this advice includes a person who has never cleaned the filter, a person who uses the drying function, and a person who does not know that cleaning is necessary. In FIG. 16A, increments e1 through e3 represent the increment added to the priority of the advice when the logged-in user fits the profile. Given that this piece of advice is support advice, the increment greatly exceeds the value of other pieces of advice. The profile of a user who would decrease the priority includes a person who has cleaned the filter and a person who does not use the drying function. In FIG. 16A, increments e4 and e5 represent the increment added to the priority of the advice when the logged-in user fits the profile.

A person who has never cleaned the filter is identified as indicated in the Reference Source for Priority Attachment entry for increment e1 by determining whether or not the auto-log indicates an obstruction occurring in at least three continuous days. A person is identified as using or not using the drying function as indicated for increment e2, by determining whether or not the auto-log indicates a usage history of automatic drying or of drying alone. The appropriate increment is added to the priority of the advice when the logged-in user fits the profile.

A person who does not know that cleaning is required is identified as indicated for increment e3 by determining whether or not the external information for the user suggests as much. The user is identified as cleaning the filter or not as indicated for increment e4, by determining whether or not the usage information indicates a history of cleaning the filter. A person is identified as using or not using the drying function as indicated for increment e5, by determining whether or not the auto-log indicates a usage history of using the drying function.

The appropriate increment is added to the priority of the advice when the logged-in user fits the profile.

(Advice on Excessive Detergent)

The third row of FIG. 16A indicates the details of advice on excessive detergent. The advice Category entry indicates that this advice is recommended advice for suggesting full utilization. The content of the Abbreviated Display entry for this advice shows the text "Too much detergent. You only need xx cups of detergent for the x kg of the previous load" where the values for volume and for the appropriate volume of detergent therefor being calculated from the previous load. The Priority Increment: High/Low Priority Person entry for the advice on excessive detergent indicates that the profile of a person who would increase the priority includes a person concerned with darkening, a person who uses too much detergent, a person who has changed detergents, and a person using the laundry machine for the first time. In FIG. 16A, increments f1 through f4 represent the increment added to the priority of the advice when the logged-in user fits the profile.

Turning to the Reference Source for Priority Attachment entry, a person concerned with darkening is identified as indicated in the Reference Source for Priority Attachment entry for increment f1, by determining whether or not the log information for the laundry machine includes a usage history of a course for washing fancy clothing. A person who uses too much detergent is identified as indicated for increment f2, by determining whether or not de-sudsing has been performed consecutively three or more times and whether or not the volume of detergent is equal to or greater than a threshold.

A person who has changed detergents is identified as indicated for increment f3, by determining whether or not the registered information for the user indicates a change in registered detergent. A person using the laundry machine for the first time is identified is indicated for increment f4, whether or not there is a usage history for the laundry machine 31 in the auto-log within the past week. The appropriate increment is added to the priority of the advice when the logged-in user fits the profile.

(Advice on Extensive Drying Time)

The first row of FIG. 16B indicates the details of advice on extensive drying time. The advice on extensive drying time indicates the reason why the drying time is extended as well as a solution to the issue. This advice is classified as recommended advice (for full utilization) as per the Category entry. The content of the Abbreviated Display entry shows the text "Drying time has been extended due to xxx. Please follow the guide for a solution" telling the user that too much detergent is being used and reminding the user to use an amount of detergent appropriate to the previous load. The Priority Increment: High/Low Priority Person entry for the advice indicates that the profile of a person who would increase the priority includes a person performing drying and a person performing drying for a long time. In FIG. 16B increments g1 and g2 represent the increment added to the priority of the advice when the logged-in user fits the profile.

A user is identified as a person who performs drying as indicated in the Reference Source for Priority Attachment entry for increment g1, by determining whether or not the auto-log indicates a history of at least three consecutive instances of washing or drying. A person performing drying for a long time is identified as indicated in the Reference Source for Priority Attachment entry for increment g2 by determining whether or not a drying interval exceeds a predetermined threshold.

The priority of the advice on extensive drying time is incremented by g1 or g2 when the user fits the profile.

(Recommended Advice for a Frequently-Used Course by Similar Users)

The second row of FIG. 16B indicates the details of recommended advice for a frequently-used course for similar users. The advice Category entry indicates that this advice is recommended advice for suggesting full utilization. The content of the Abbreviated Display entry indicates a recommendation of a course frequently uses by other users who are found to be similar due to having the same family structure and living in the same area. The Priority Increment: High/Low Priority Person entry for the recommended advice for a course frequently used by similar users indicates that the profile of a person who would increase the priority includes a person concerned with others, a person unsure about their laundry, a person loosely connected to others on social media and the like, a person wanting to be more efficient with laundry, and a person seeking self-improvement. In FIG. 16B, increments h1 through h4 represent the increment added to the priority of the advice when the logged-in user fits the profile.

A person concerned with others is identified as indicated in the Reference Source for Priority Attachment entry for increment h1 by determining whether or not the age of the user, as indicated in the registered information for that user, is an age at which lifestyle changes such as starting school or getting a first job are common. When the logged-in user fits the profile, the priority of this advice is increased by increment h1. A person unsure about their laundry is identified as indicated in the Reference Source for Priority Attachment entry for increment h2, by determining whether or not the registered information for the user indicates a subscription to a mailing list. When the logged-in user fits the profile, the priority of this advice is increased by increment h2.

A person loosely connected to others on social media and the like is identified as indicated for increment h3 by determining whether a usage history of social media is indicated in the external information. That is, such a person is identifiable by a predetermined number of friends, posts, views, likes, and comments. When the logged-in user fits the profile, the priority of this advice is increased by increment h3.

A person wanting to be more efficient with laundry and a person seeking self-improvement are identified as indicated in the Reference Source for Priority Attachment entry for increment h4, by determining whether or not the other device logs indicate a usage history for various menus, not limited to the laundry machine. When the logged-in user fits the profile, the priority of this advice is increased by increment h4.
(Detergent Ranking Advice)

The third row of FIG. 16B indicates the details of detergent ranking advice. This advice displays a ranking of popular detergents on the terminal 103. The advice Category entry indicates that this advice is recommended advice for full utilization. The content of the Abbreviated Display indicates a ranking of popular detergents currently on the market. The Priority Increment: High/Low Priority Person entry for the advice indicates that the profile of a person who would raise the priority includes a person concerned with others, a person dissatisfied with their current detergent, a person who frequently changes detergents, and a detergent manufacturer. When the user fits any of these profiles, the corresponding increment i1 through i4 from FIG. 16B is added to the priority of the advice.

A person concerned with others is identified as indicated in the Reference Source for Priority Attachment entry for increment i1 by determining whether or not the external information indicates as much.

A person dissatisfied with their current detergent is identified as indicated for increment i2, by determining whether or not the auto-log indicates water washing time in one-hour units. When the tank is repeatedly cleaned and the detergent used is a commercial non-chlorine type, more time is required for water washing as suds are produced in large volumes. When the auto-log indicates washing time in one-hour units, the advice should recommend using a chlorine detergent. For this recommendation, increment i2 is added to the priority of the advice when the user fits the profile of a person dissatisfied with their current detergent.

A person who frequently changes detergents is identified as indicated in the Reference Source for Priority Attachment entry for increment i3, by determining whether or not the registered information for the user indicates a change in registered detergent. When such a change occurs, increment i3 is added to the priority of the advice. A detergent manufacturer is identified as indicated in the Reference Source for Priority Attachment entry for increment i4 by determining whether the registered information for the user lists an occupation as working for a detergent manufacturer. When this applies, increment i4 is added to the priority of the advice.
(Tank Washing Advice)

The fourth row of FIG. 16B indicates the details of advice to use tank washing. The Category entry for this advice indicates support advice, categorized as being for maintenance. The content of the Abbreviated Display entry indicates that the advice to use tank washing is given in connection with a promotional campaign. The Priority Increment: High/Low Priority Person entry for the advice to use tank washing indicates that the profile of a user who would increase the priority includes a person who has never used tank washing and a person who has done laundry for a cumulative total that at least meets a threshold. The profile of a person who would decrease the priority includes a person who has done laundry for a cumulative total that does not meet the threshold.

This concludes the explanation of the advice objects for the laundry machine 31. The details of advice objects pertaining to the cooking device 32 are described next. The first row of FIG. 17A indicates the details of advice recommending the use of an automatic cooking menu, adapted to resent usage trends. This advice is categorized as recommended advice (recommendation to use an unused function). The content of the Abbreviated Display entry indicates a reminder to select a title from an automatic cooking menu performable by the cooking device 32 for use as an automatic cooking menu adopted to recent usage trends. The profile of a person who would increase the priority of this advice includes a person wanting to learn more about microwave functions, and a person who performs similar cooking without using the automatic cooking function. The profile of a person who would lower the priority includes a person who has decided on functions for ordinary use. In FIG. 17A, increments k1 through k3 represent the increment added to the priority of the advice when the logged-in user fits the profile.

A person wanting to learn more about microwave functions is identified as indicated in the Reference Source for Priority Attachment entry for increment k1 by determining whether or not the external information indicates as much. When the logged-in user fits the profile, the priority of this advice is increased by increment k1. A person who performs similar cooking without using the automatic cooking function is identified as indicated in the Reference Source for Priority Attachment entry for increment k2, by determining whether or not the auto-log indicates microwave setting times that exceed a threshold. A lengthy microwave setting time suggests repeated attempts to cook through trial and error. When the logged-in user fits the profile, the priority of this advice is increased by increment k2.

A person who has decided on functions for ordinary use is identified as indicated in the Reference Source for Priority Attachment entry for increment k3, by determining whether or not the auto-log indicates a usage history to this effect. When the logged-in user fits the profile, the priority of this advice is increased by increment k3.
(Advice for Microwave Maintenance)

The second row of FIG. 17A indicates the details of advice for microwave maintenance. This advice is categorized as recommended advice (recommendation to use an unused function). The content of the Abbreviated Display simply states that using a maintenance function is recommended. The Priority Increment: High/Low Priority Person entry for the advice indicates that the profile of a person who would increase the priority includes a person cooking smelly food, a person concerned with odors, a person cooking with oil, a person who does not want to spend time on maintenance, a person approaching a major cleaning period, a person approaching a regular cleaning period, and a person who has just used the microwave. In FIG. 17A, increments l1 through l7 represent the increment added to the priority of the advice when the logged-in user fits the profile. In contrast, the profile of a user who would decrease the priority includes an ecologically-conscious person and a person who cleans the microwave every day. The priority is increased by increments l8 and l9 when the logged-in user fits the profile.

A person cooking smelly food and a person cooking with oil are identified as indicated in the Reference Source for Priority Attachment entry for increments l1 and l3, by determining whether or not the auto-log, i.e., the log information for the microwave, indicates a usage history of a mode for cooking fish. The appropriate increment is added to the priority of the advice when the logged-in user fits the profile. A person concerned with odors is identified as indicated in the Reference Source for Priority Attachment entry for increment l2, by determining whether or not there is a usage history for an air purifier immediately after using the microwave.

A person who does not want to spend time on maintenance is identified as indicated in the Reference Source for Priority Attachment entry for increment l4 by determining whether or not the external information indicates as much. A person approaching a major cleaning period or a regular cleaning period is identified as indicated in the Reference Source for Priority Attachment entry for increments l5 and l6, by determining whether or not the external information indicates as much.

A person who has just used the microwave is identified as indicated in the Reference Source for Priority Attachment entry for increment l7 by determining whether or not the usage history indicates that the microwave has just been used.

An ecologically-conscious person is identified as indicated in the Reference Source for Priority Attachment entry for increment l8, by determining whether or not the external information indicates as much.

A person who cleans the microwave every day is identified by determining whether or not the log information for a vacuum cleaner (in the other device logs) indicates a daily usage history for the vacuum cleaner.

The appropriate increment is added to the priority of the advice when the logged-in user fits the profile.
(Monthly Most Frequently-Used Cooking Menu)

The first row of the top tier of FIG. 17B indicates the details of advice presenting a top menu related to monthly most-frequently used cooking menus and a referral for a cooking class. These pieces of advice are classified as recommended advice (appliance-related external information). The content of the Abbreviated Display indicates that top menus pulled from Cookpad™, ABC Cooking™, and so on, along with a referral for a specific cooking class. The Priority Increment: High/Low Priority Person entry for the advice indicates that the profile of a person who would increase the priority of the advice includes a person facing difficulty in daily meal planning. The profile of a person who would decrease the priority includes a person who only uses the microwave for reheating and a person who does not use the microwave for cooking. When the profile of the user fits these conditions, increments m1 and m2 are added to the priority for the advice.

A person facing difficulty with daily meal planning is identified as indicated in the Reference Source for Priority Attachment entry for increment m1, by external information for the user indicating as much, by the auto-log and other device logs indicating appliance operation conditions during the day specific to a homemaker, and by finding whether or not the log information for a video recording device, i.e., another device log, indicates a recording history of cooking programs.

A person who only uses the microwave for reheating and a person who does not use the microwave for cooking are identified as indicated in the Reference Source for Priority Attachment entry for increment m2, by determining whether or not the log information for the microwave only lists a usage history for an automatic warming mode. The second row of the top tier of FIG. 17B indicates the details of advice presenting recommended operations performed manually and with the microwave. The advice Category entry indicates that this advice is recommended advice. The content of the Abbreviated Display integrates the names of the processes performed manually and with the microwave oven, and reminds the user to use them. The profile of a person who would increase the priority of this advice includes a foodie and a person sensitive to taste differences. The profile of a person who would decrease the priority of this advice includes a person who is not sensitive to taste differences and a person who prefers simple cooking.

A foodie and a person sensitive to taste differences are identified as indicated in the Reference Source for Priority Attachment entry for increment n1, by determining whether the log information for a video recording device serving as other log information indicates a recording history of foodie programs. Recording foodie-oriented programs suggests that this person has strong preferences in terms of taste. When the logged-in user fits the profile, the priority of this advice is increased by increment n1.

A person who is not sensitive to taste differences is identified as indicated in the Reference Source for Priority Attachment entry for increment n2, by determining whether or not the external information indicates as much. When the logged-in user fits the profile, the priority of this advice is increased by increment n2. A person who prefers simple cooking is identified as indicated in the Reference Source for Priority Attachment entry for increment n3, by determining whether the registered information for the user includes child-oriented settings. Such a profile suggests that the user is raising a child and is unable to spend much time on cooking. When the logged-in user fits the profile, the priority of this advice is increased by increment n3.

This concludes the explanation of the advice objects for the cooking device 32. For reference, advice objects intended for the jar rice cooker 34 are also provided.
(Jar Rice Cooker Advice)

The advice for the jar rice cooker 34 is described as indicated in the lower tier of FIG. 17B. For the recommendation for keep-warm time that preserves flavor, the profile of a person who would increase the priority includes a person who uses the keep-warm function for long periods, and the profile of a person who would decrease the priority includes a person who only briefly uses the keep-warm function.

A person who uses the keep-warm function for long periods is identified as indicated in the Reference Source for Priority Attachment entry for increment o1, by determining whether or not the auto-log indicates that the keep-warm function of the rice cooker has been used at least as long as a threshold. A person who uses the keep-warm function only for short periods is identified as indicated in the Reference Source for Priority Attachment entry for increment o2, by determining whether or not the auto-log indicates that the keep-warm function of the rice cooker has been used for less time than the threshold.

The appropriate increment is added to the priority of the advice when the logged-in user fits the profile. The tables of FIGS. 15, 16A, 16B, 17A, and 17B are defined for profiles of persons who would reference the advice. The descriptions may vary provided that some characteristic of the profile is included. The determinations may also be corrected after the fact by the provider of the advice provision method.

This concludes the explanation of the reference source for priority attachment relating to changing the priority of the advice. Next, a specific example is used to describe the changes in priority for the pieces of advice, thereby providing deeper technical understanding. Here, the specific example involves determining the most appropriate order of advice for a user having the profile on the left-hand side of FIG. 18A (namely user AAA). The right-hand side of FIG. 18A lists the auto-log, the other device log, and the overall user information for user AAA. The auto-log, the other device log, and the overall user information are subject to the advice-specific standards given in FIGS. 15, 16A, 16B, 17A, and 17B. The left-hand side of FIG. 18B indicates five pieces of advice to be provided to the user (namely advice recommending the use of a night course, advice to automate washing and drying, advice to use jet drying, advice making a notification about weather forecast and pollen information, and advice to clean the filter).

The priority for the advice recommending the use of a night course is set as follows. The auto-log for user AAA includes a usage history for the laundry machine in the time slot from 11:00 PM to 11:30 PM on Jun. 1, 2013, again in the time slot from 11:45 PM on Jun. 2, 2013 to 12:15 AM the next day, and again from 11:15 PM to 11:45 PM on Jun. 3, 2013. As such, increment a1 is added to the priority of the advice recommending the use of the night course. The log information for the television, serving as the other device log, indicates a history of using headphones to watch television. As such, increment a2 is added to the priority of the advice recommending the use of the night course. Also, the overall user information for user AAA lists a home address that is an apartment building. As such, increment a3 is added to the priority of the advice recommending the use of the night course. With the addition of the above increments, the priority of the advice recommending the use of the night course becomes a1+a2+a3.

The priority for the advice to automate washing and drying is set as follows. The overall user information for user AAA indicates employment at a corporation. As such increment b7 is added to the priority of the advice to automate washing and drying. Also, there is a history of doing laundry at night, and as such increment b8 is added. With the addition of the above increments, the priority of the advice to automate washing and drying becomes b7+b8. The priority for the advice to use jet drying is set as follows. The overall user information for user AAA indicates employment at a corporation and living alone. As such, increments c1 and c4 are added to the priority of the advice to use jet drying. The overall user information also indicates a concern with noise, and as such increment c6 is added. With the addition of the above increments, the priority of the advice to use jet drying becomes c1+c4+c6.

The priority for the advice making a notification about weather forecast and pollen information is set as follows. The overall user information for user AAA indicates a pollen allergy. As such, increment d1 is added to the priority of the advice making a notification about weather forecast and pollen information. With the addition of the above increment, the priority of the advice making a notification about weather forecast and pollen information becomes d1. The priority of the advice to clean the filter is set as follows. The auto-log for user AAA indicates that filter obstructions have occurred for three continuous days from Jun. 1, 2013, to Jun. 3, 2013. As such, increment e1 is added to the priority of the advice to clean the filter.

As a result of the above, and as depicted in FIG. 18C, the cumulative values of the priority for each piece of advice are respectively: a1+a2+a3 for the advice recommending the use of the night course, b7+b8 for the advice to automate washing and drying, c1+c4+c6 for the advice to use jet drying, d1 for the advice making a notification about weather forecast and pollen information, and e1 for the advice to clean the filter. Here, these increments have respective values of 5 for increments a1 through a3, 7 for b7 and b8, 4 for c1, c4, and c6, and 100 for e1. Increment e1 has a three-digit value, which is remarkably large among priority increments, because the advice to clean the filter is classified as support advice. Accordingly, the total advice increments are as given in FIG. 18B: e1>a1+a2+a3>c1+c4+c6>b7+b8>d1. Sorting the advice according to the priority as obtained from these totals produces the order indicated in FIG. 18D. That is, the pieces of advice are ordered as advice to clean the filter→advice recommending the use of a night course→advice to use jet drying→advice to automate washing and drying→advice making a notification about weather forecast and pollen information. The advice is sorted in accordance with the particular circumstances of the user and provided as a list, which provides support to the user of the household appliances in a more user-friendly format.

(Specific Process of Advice Provision Method)

The processing involved in the advice provision method is generalizable as a process applicable to the content of the above-described auto-log, other device logs, and overall user information, in accordance with the advice-specific standards. The generalized processing is indicated in the flowcharts of FIGS. 19 through 35. These flowcharts are described below.

Figure 19:
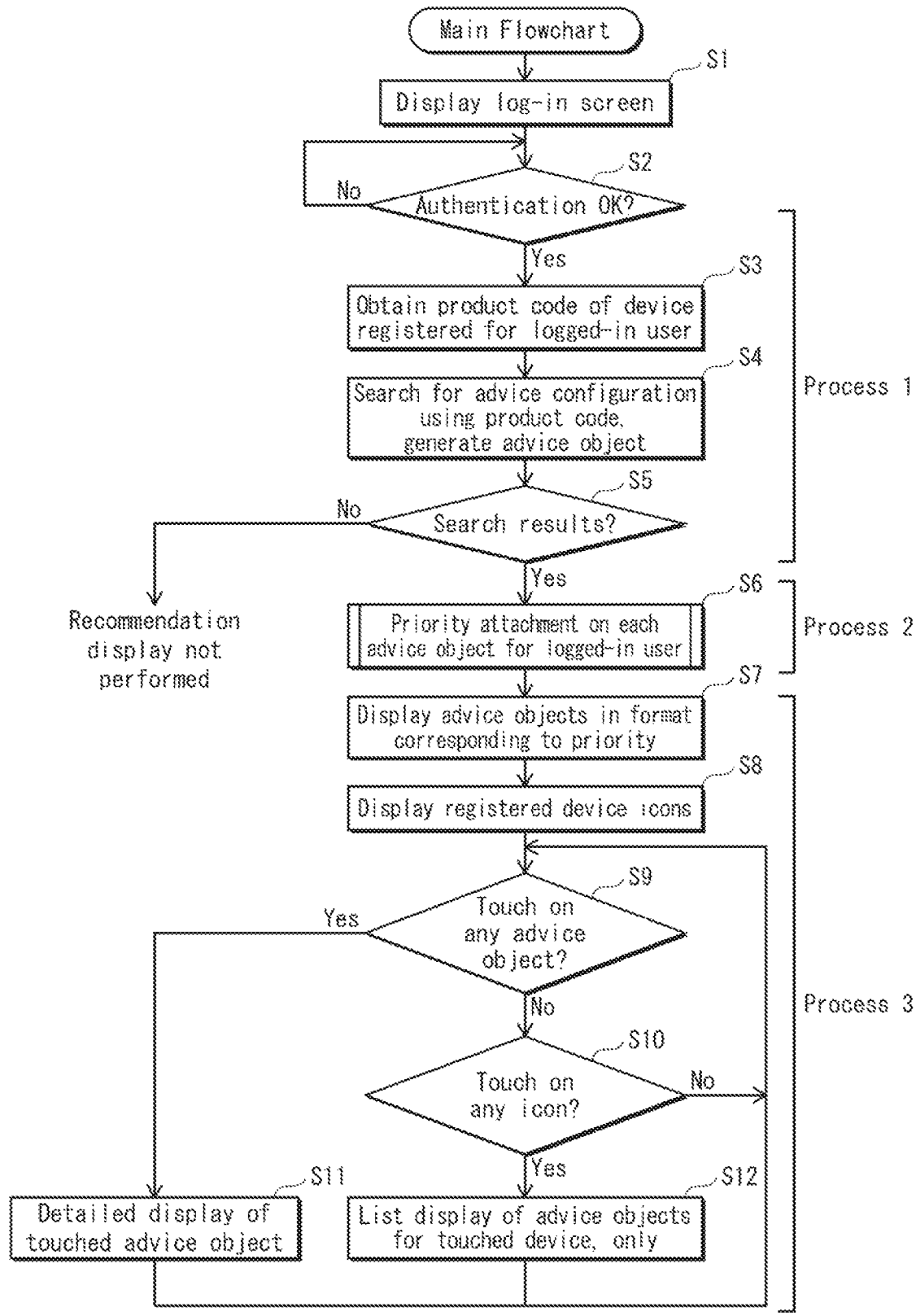
FIG. 19 is a main flowchart for the processing of the advice provision method.

FIG. 19 depicts the main flowchart. In step S1, the log-in screen is displayed (step S1). In step S2, a determination is made regarding whether or not the user has been authenticated as valid. When the user has been authenticated as valid, then in step S3, a product code is acquired for a device registered to the logged-in user, a search is performed for an advice configuration using the product code, and an advice object is generated as an instance of the advice configuration for each hit found in the search (step S4). In step S5, a determination is made regarding whether or not any advice has been found in the search. In step S6, priority is attached to each advice object in accordance with the reference source for priority attachment, namely whether or not the logged-in user is to reference the advice. In step S7, a plurality of advice objects are displayed in accordance with priority. In step S8, a list of registered device icons based on the registered information for the logged-in user is displayed under the list of advice. Steps S9 and S10 are then executed in a loop. This loop involves determining whether a touch operation has been performed on any of the advice objects (step S9) and whether a touch operation has been performed on any of the device icons (step S10). Upon a determination of Yes in step S9, then in step S11, full-text display of the relevant advice object is performed and the process returns to the loop of step S9 and step S10. Upon a determination of Yes in step S10, then in step S12, display is performed of a list containing only advice objects pertaining to the device that has been touched.

Figure 20:
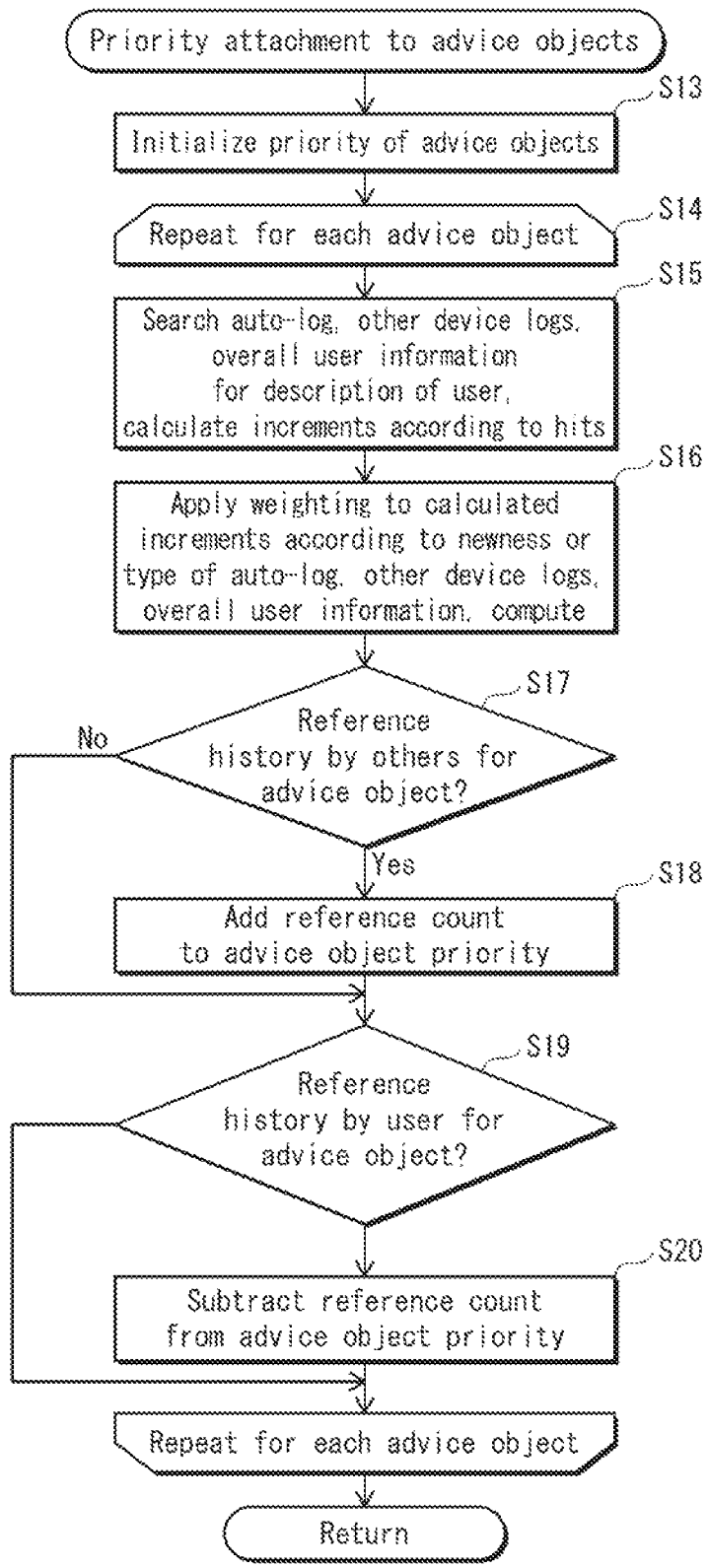
FIG. 20 is a flowchart of the processing for attaching priority to each piece of advice.

In step S6, a determination is made regarding whether or not the advice-specific standards are satisfied. The flowcharts of FIGS. 20 through 33 indicate subroutines defining the details of step S6. FIG. 20 depicts a flowchart of the processing for attaching priority to each piece of advice. In this flowchart, the priority of the advice objects is initialized in step S13, and a loop occurs at step S14. The loop applies the processing of steps S15 through S20 to each of the advice objects. In step S15, a search is performed in the auto-log, the other device logs, and the overall user information for information pertaining to the profile of the person who should reference the advice, and an increment is calculated in accordance with the number of hits. In step S16, each increment is weighted according to the newness and type of the auto-log, the other device log, and the overall user information, and then summed. In step S17, a determination is made regarding whether or not the advice has been referenced by another person. In the affirmative case, the reference count is added to the priority of that advice in step S18. In step S19, a determination is made regarding whether or not the advice object has been referenced by the logged-in user. In the affirmative case, the reference count is added to the priority of that advice object in step S20. The priority attachment is performed by applying this process to each of the advice objects generated from the hits in the search for the product code.

Figure 21:
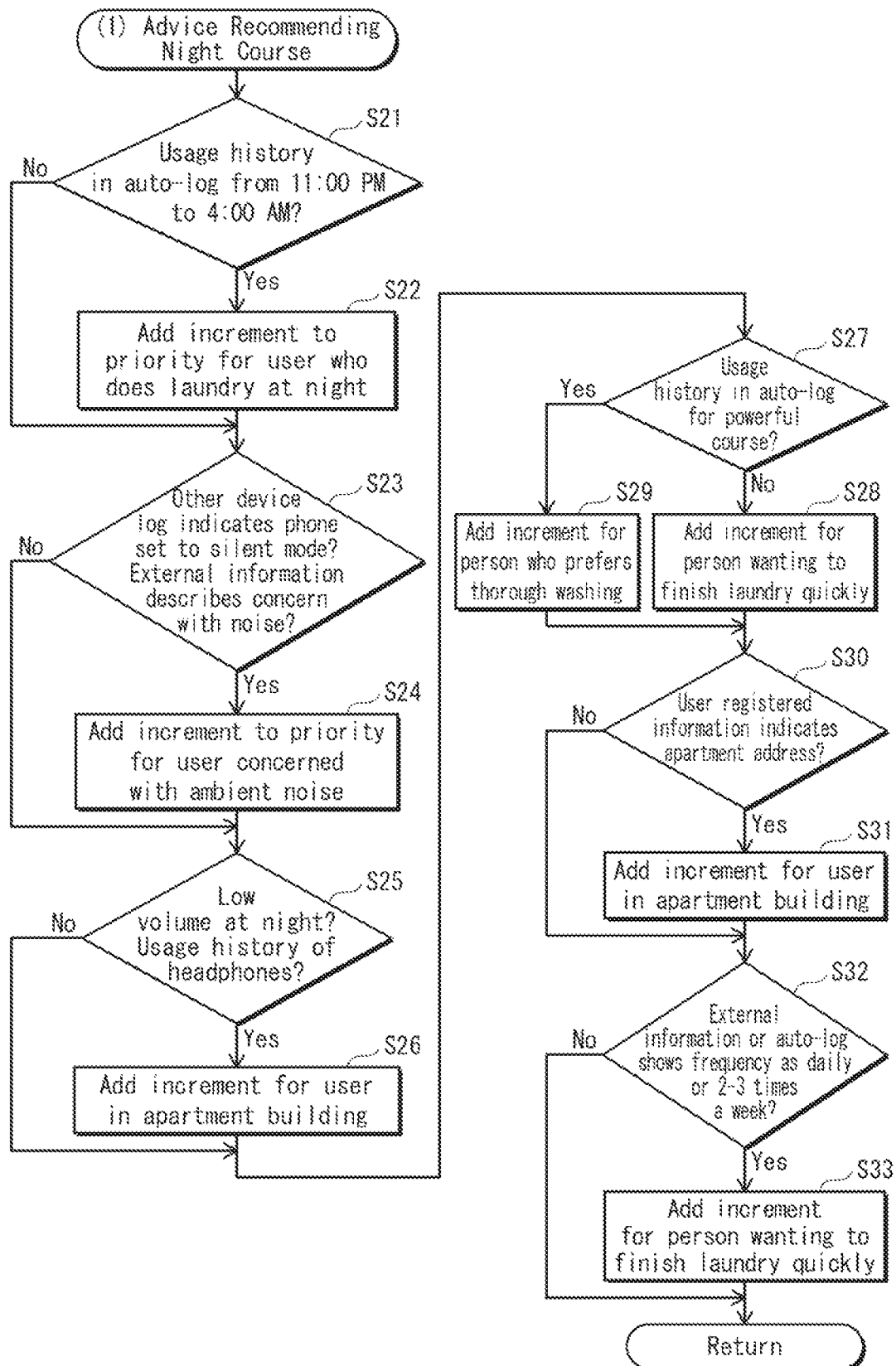
FIG. 21 is a flowchart indicating the processing for the advice recommending the use of a night course.

FIG. 21 depicts a flowchart indicating the process for the advice recommending the use of a night course. In step S21 a determination is made regarding whether or not the auto-log indicates a usage time from 11:00 PM and 4:00 AM. When the result of step S21 is Yes, then in step S22, an increment is added to the priority of the advice recommending the use of a night course for the person who does laundry at night. When the result of step S21 is No, then step S22 is skipped.

In step S23, a determination is made regarding whether the mode setting indicated in the log information for a portable phone is silent mode, and whether or not the external information indicates being concerned with noise. When the result is Yes, then in step S24, an increment is added to the priority of the advice recommending the use of a night course for the person concerned with ambient noise. In step S25, a determination is made regarding whether the television volume is lower at night, or whether there is a usage history of headphones. In the affirmative case, then in step S26, an increment is added to the priority of the advice recommending the use of a night course for the person living in an apartment building.

In step S27, a determination is made regarding whether or not the auto-log indicates a usage history of a powerful course. In the affirmative case, then in step S29, an increment as added for the person who prefers thorough washing. When the result is No, then in step S28, an increment as added for the person who prefers immediate washing. In step S30, a determination is made regarding whether or not the registered information for the user gives a home address that is an apartment building. In the affirmative case, then in step S31, an increment is added to the priority of the advice recommending the use of a night course for the person living in an apartment building.

Figure 22:
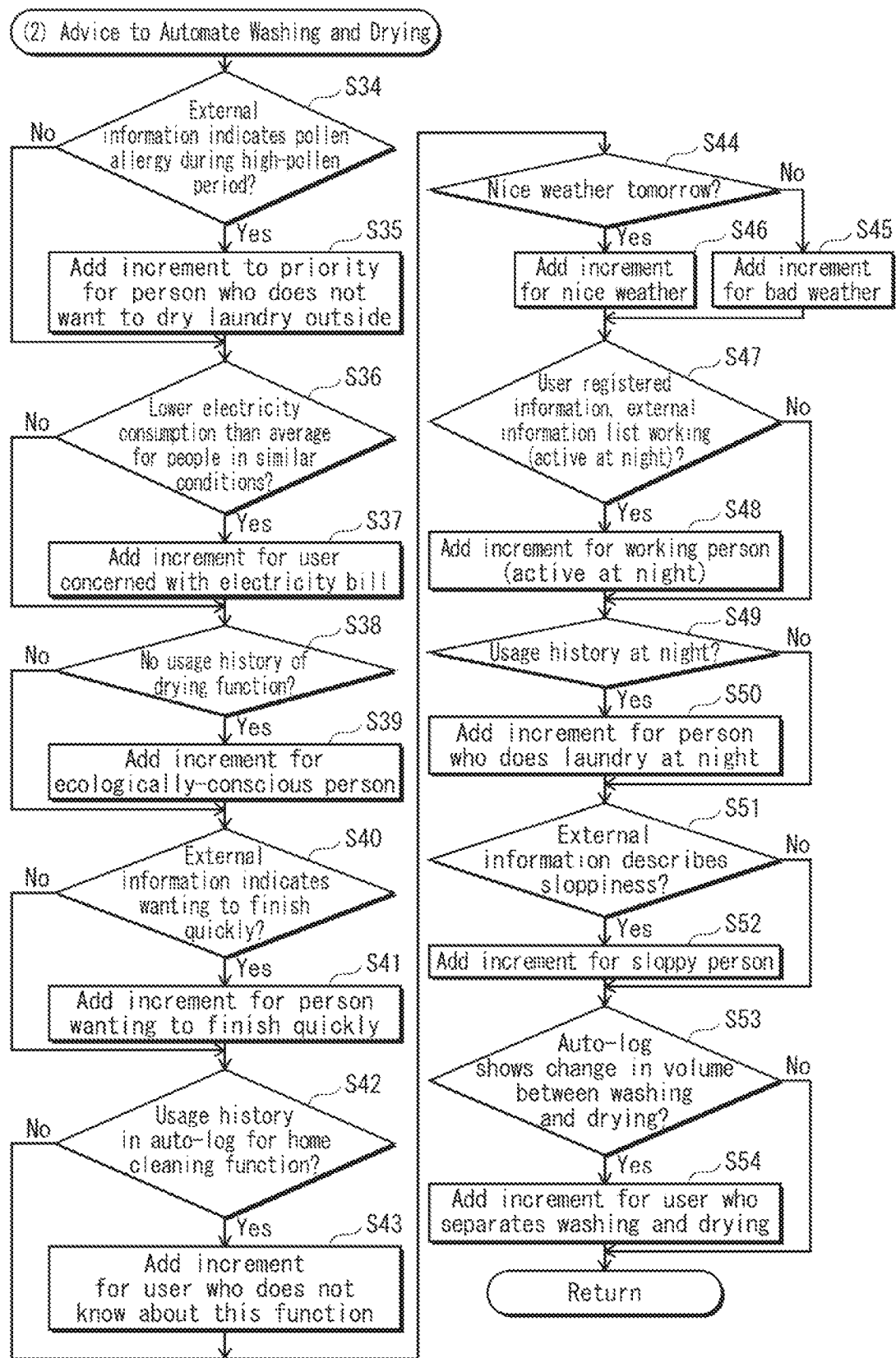
FIG. 22 is a flowchart indicating the priority attachment processing for the advice to automate washing and drying.

In step S32, a determination is made regarding whether the external information or the auto-log indicates a frequency that is daily or two to three times per week. In the affirmative case, then in step S33, an increment is added for a person wanting to finish laundry immediately. In the negative case, this step is skipped. FIG. 22 depicts a flowchart indicating the priority attachment process for the advice to automate washing and drying. In step S34, a determination is made regarding whether or not this is a high-pollen period, and whether the external information indicates a pollen allergy. In the affirmative case, then in step S35, an increment is added to the priority of the advice to automate washing and drying for the person who does not want to dry laundry outdoors.

In step S36, a determination is made regarding whether or not electricity consumption is below average for people under equivalent conditions. In the affirmative case, then in step S37, an increment is added to the priority of the advice to automate washing and drying for the user who is concerned with the electricity bill. In step S38, a determination is made regarding whether there is an absence of usage history for a drying function. In the affirmative case, then in step S39, an increment is added for the ecologically-conscious person.

In step S40, a determination is made regarding whether or not the external information indicates a preference to finish laundry quickly. In the affirmative case, then in step S41, an increment is added to the priority of the advice to automate washing and drying for the user who prefers to finish laundry quickly. In step S42, a determination is made regarding whether or not the auto-log indicates a usage history of the home cleaning function. In the affirmative case, then in step S43, an increment is added to the priority of the advice to automate washing and drying for the user who does not know about that function.

In step S44, a determination is made regarding whether or not the region where the user lives will have nice weather the next day. In the negative case, then in step S45, an increment is added to the priority of the advice to automate washing and drying when the weather will be bad. In the affirmative case, then in step S46, an increment is added to the priority of the advice to automate washing and drying when the weather will be nice. In step S47, a determination is made regarding whether or not the external information indicates a working person (active at night). In the affirmative case, then in step S48, an increment is added for the user who is working (and is active at night). In the negative case, step S49 is skipped.

In step S49, a determination is made regarding whether or not the log information for the laundry machine 31 indicates a usage history at night. In the affirmative case, then in step S50, an increment is added for the user who does laundry at night. In the negative case, step S50 is skipped. In step S51, a determination is made regarding whether or not the external information indicates a sloppy person. When such an indication is found, then in step S52, an increment is added to the advice to automate washing and drying for that user. When the result of step S51 is No, then step S52 is skipped. In step S53, a determination is made regarding whether the auto-log indicates differences in volume between washing and drying. Inn the affirmative case, then in step S54, an increment is added to the advice to automate washing and drying for the user who prefers to separate washing and drying. When the result of step S53 is No, then step S53 is skipped.

Figure 23:
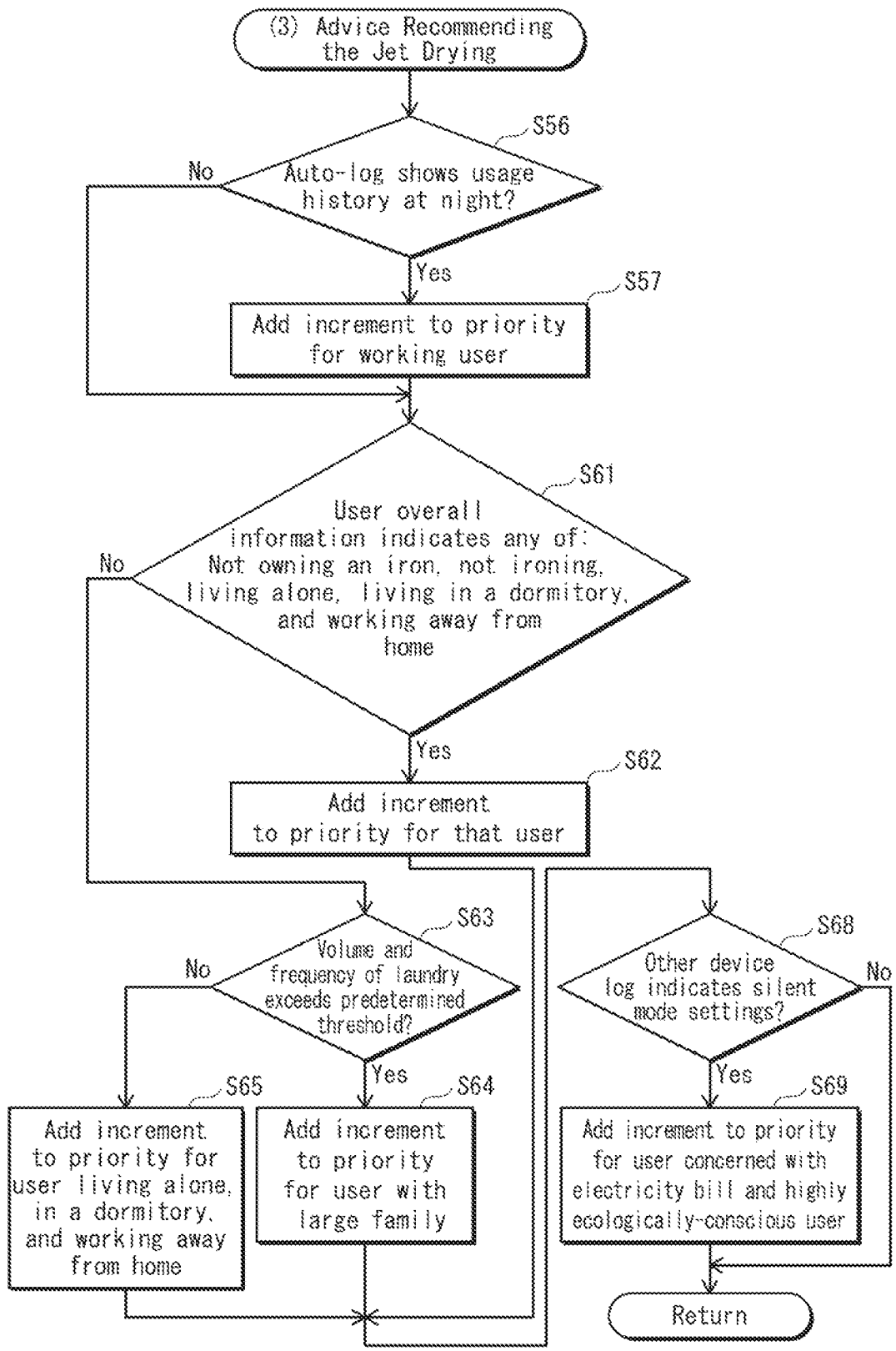
FIG. 23 is a flowchart indicating the priority attachment processing for the advice to use jet drying.

FIG. 23 depicts a flowchart indicating priority attachment for the advice to use jet drying. In step S56, a determination is made regarding whether or not the auto-log indicates a usage history at night. In the affirmative case, then in step S57, an increment is added to the priority of the advice to use jet drying for the working user. In the negative case, step S57 is skipped.

In step S61, a determination is made regarding whether or not the overall user information indicates a person who does not own or does not use an iron, a person living alone, a person in a dormitory, or a person working away from home. In the affirmative case, then in step S62, an increment is added to the priority of the advice to use jet drying for this user. In the negative case, step S62 is skipped. In step S63, a determination is made regarding whether or not the volume of a single laundry load and the frequency of laundry are equal to or greater than a threshold. In the affirmative case, an increment is added to the priority of the advice to use jet drying for the user with a large family. In the negative case, then in step S65, the increment is added to the priority for the person living alone, in a dormitory, or working away from home.

Figure 24:
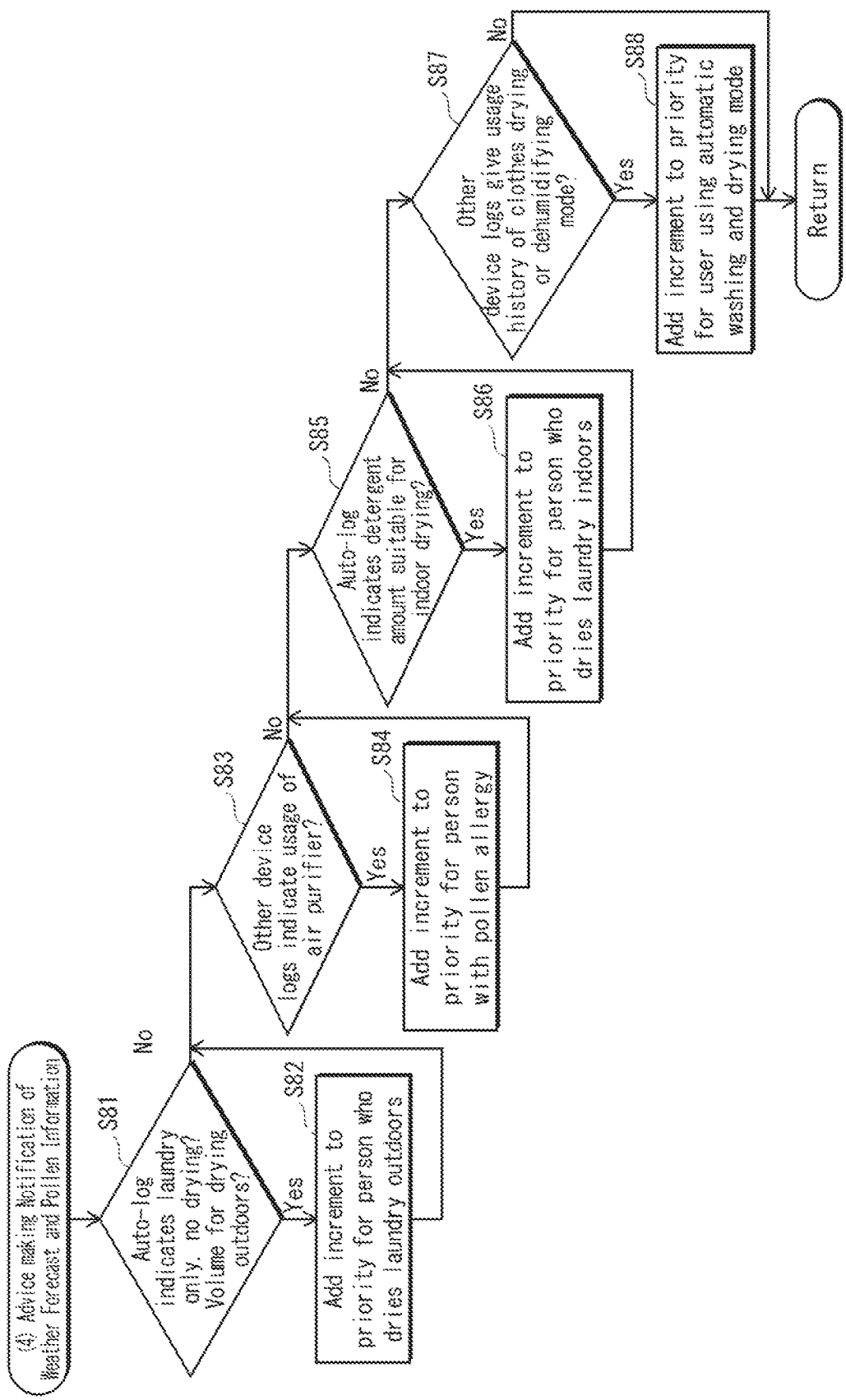
FIG. 24 is a flowchart indicating the priority attachment processing for the advice making a notification of weather forecast and pollen information.

In step S68, a determination is made regarding whether or not the other device logs indicate energy-saving mode settings. In the affirmative case, then in step S69, an increment is added to the priority of the advice to use jet drying for the person concerned with the electricity bill and the person who is highly ecologically conscious. In the negative case, step S69 is skipped. FIG. 24 depicts a flowchart of the priority attachment processing for the advice making a notification of weather forecast and pollen information. In step S81, a determination is made regarding whether or not the auto-log indicates that washing is used but drying is not, and whether the detergent used is appropriate for outdoor drying. In the affirmative case, then in step S82, an increment is added to the priority for the advice making a notification of weather forecast and pollen information for a person who dries laundry outdoors. In the negative case, step S82 is skipped. In step S83, a determination is made regarding whether the other device logs indicate a usage history for an air purifier. In the affirmative case, then in step S84, an increment is added to the priority for the advice making a notification of weather forecast and pollen information for a person with a pollen allergy. In the negative case, step S84 is skipped. In step S85, a determination is made regarding whether the amount of detergent used is appropriate to indoor drying. In the affirmative case, then in step S86, an increment is added to the priority for the advice making a notification of weather forecast of pollen information for a person who dries laundry indoors. In the negative case, step S86 is skipped. In step S87, a determination is made regarding whether or not the log information for an air conditioner serving as the other device log indicates a usage history of a laundry drying mode or of a dehumidifying mode. In the negative case, then in step S88, an increment is added to the priority of the advice making a notification of weather forecast and pollen information for the person who uses automatic washing and drying.

Figure 25:
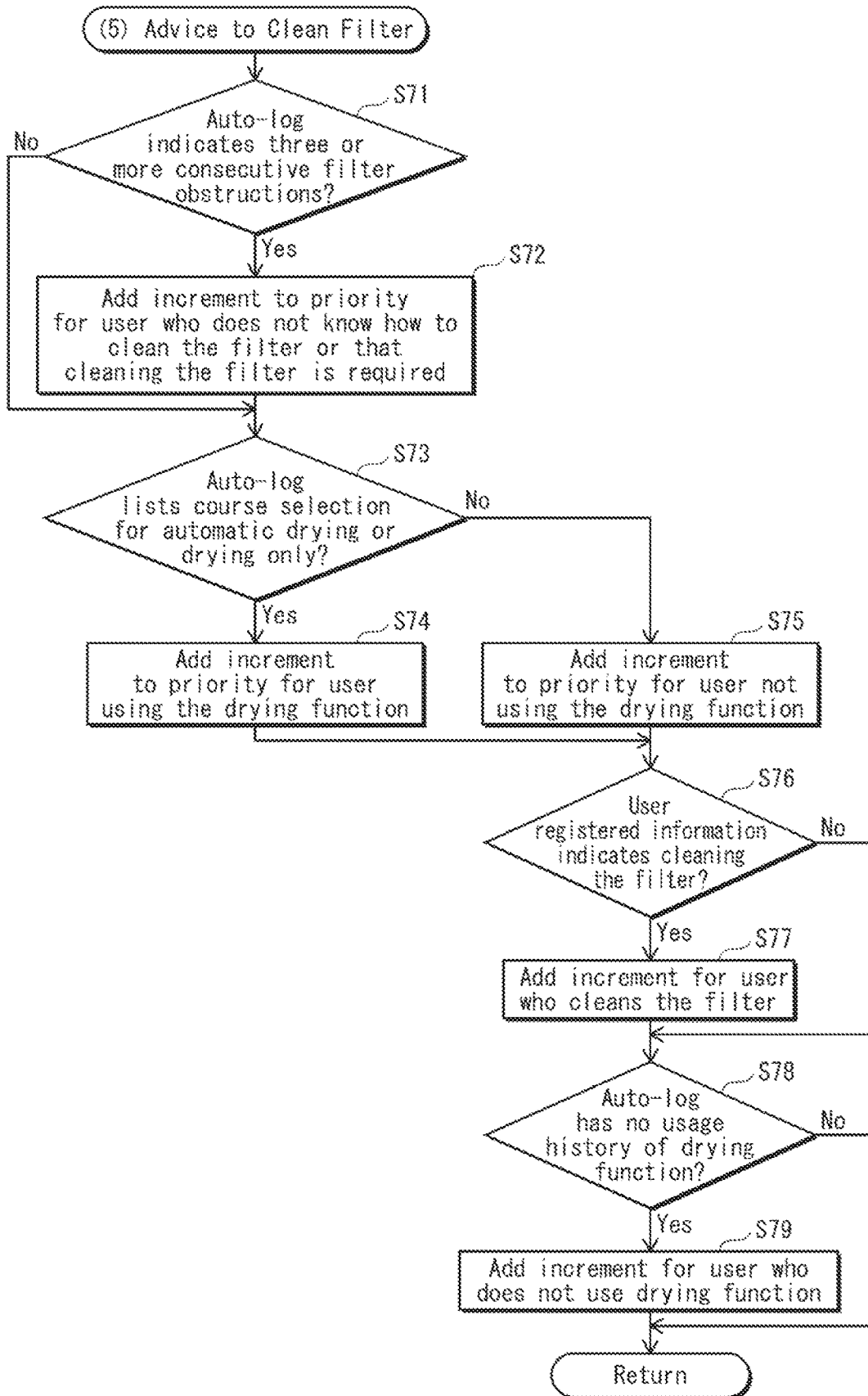
FIG. 25 is a flowchart of the processing for attaching priority to the advice to clean the filter.

FIG. 25 depicts a flowchart of the processing for attaching priority to the advice to clean the filter. In step S71, a determination is made regarding whether or not there is a history of filter obstructions occurring three or more times in succession. In the affirmative case, then in step S72, an increment is added to the priority of the advice to clean the filter for the person who does not know about cleaning the filter, and for the person who does not know that the filter needs cleaning.

In step S73, a determination is made regarding whether or not a course selection in the auto-log indicates automatic drying or drying only. In the affirmative case, then in step S74, an increment is added to the priority of the advice to clean the filter for the person who uses the drying function. In the negative case, then in step S75, an increment is added to the priority of the advice to clean the filter for the person who does not use the drying function.

In step S76, a determination is made regarding whether or not the registered information for the user indicates cleaning the filter. In the affirmative case, then in step S77, an increment is added to the priority of the advice to clean the filter for the person who cleans the filter. When the result of step S76 is No, then step S77 is skipped. In step S78, a determination is made regarding whether the auto-log indicates no usage history for the drying function. In the affirmative case, then in step S79, an increment is added to the priority of the advice to clean the filter for the person who does not use the drying function. When the result of step S78 is No, then step S79 is skipped.

Figure 26:
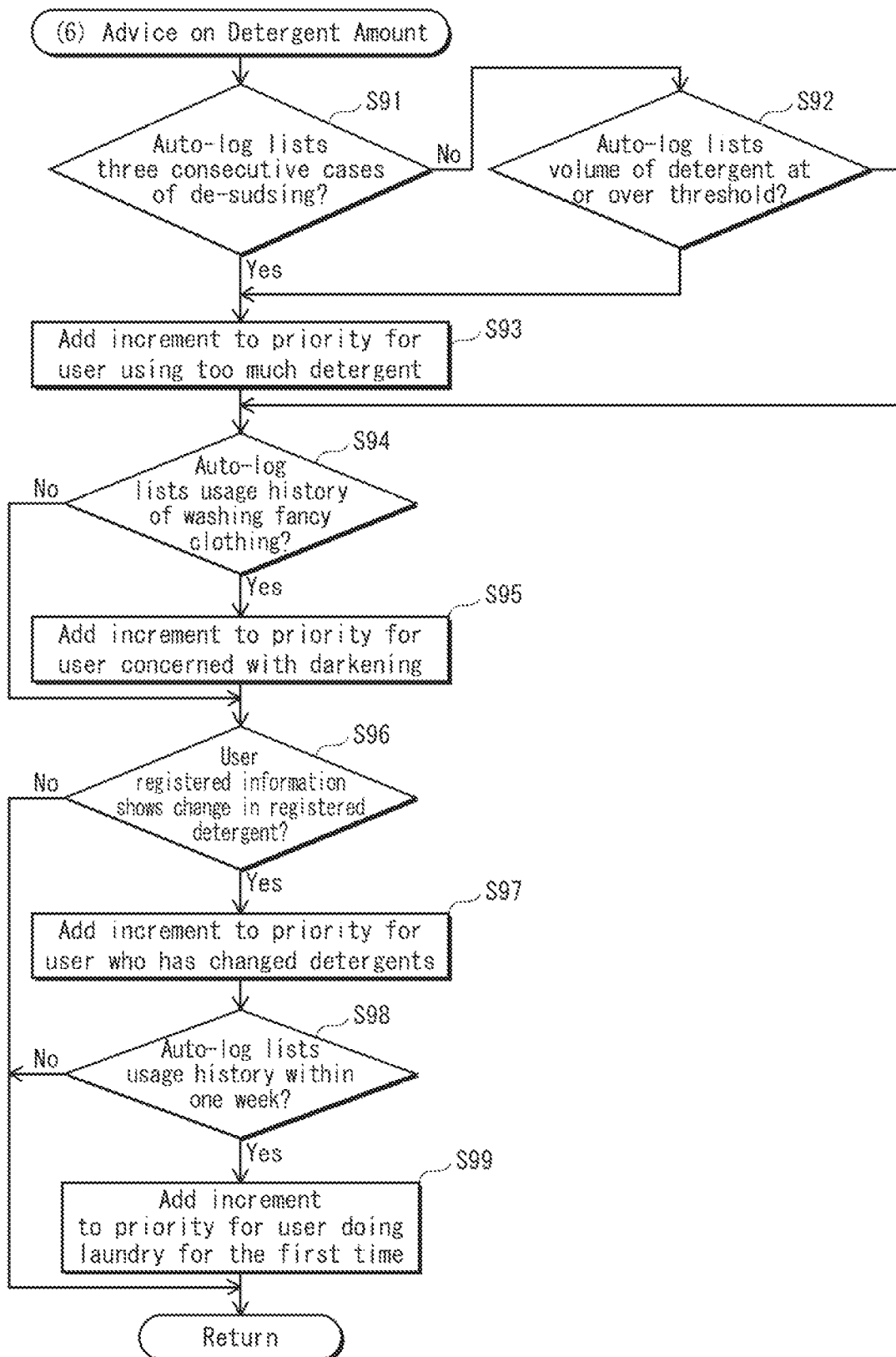
FIG. 26 is a flowchart of the processing for attaching priority to the advice on detergent amount.

FIG. 26 depicts a flowchart of the processing for attaching priority to the advice on detergent amount. In step S91, a determination is made regarding whether or not the auto-log indicates that de-sudsing has been used three or more times consecutively. In step S92, a determination is made regarding whether or not the amount of detergent is equal to or greater than a threshold. When the result of either one of steps S91 and S92 is Yes, then in step S93, an increment is added to the priority of the advice on detergent amount for the person who uses too much detergent. When the result of both step S91 and S92 is No, then step S93 is skipped. In step S94, a determination is made regarding whether or not the auto-log indicates a usage history of washing fancy clothing. In the affirmative case, then in step S95, an increment is added to the priority of the advice on detergent amount for the person concerned with darkening. In the negative case, step S95 is skipped. In step S96, a determination is made regarding whether or not the registered information for the user indicates a change in registered detergent. In the affirmative case, then in step S97, an increment is added to the priority of the advice on detergent amount for the person who has changed detergents. In the negative case, step S98 is skipped. In step S98, a determination is made regarding whether or not the auto-log indicates a usage history entirely within the past week. In the affirmative case, then in step S99, an increment is added to the priority of the advice on detergent amount for the person using laundry machine for the first time. In the negative case, step S99 is skipped.

Figure 27:
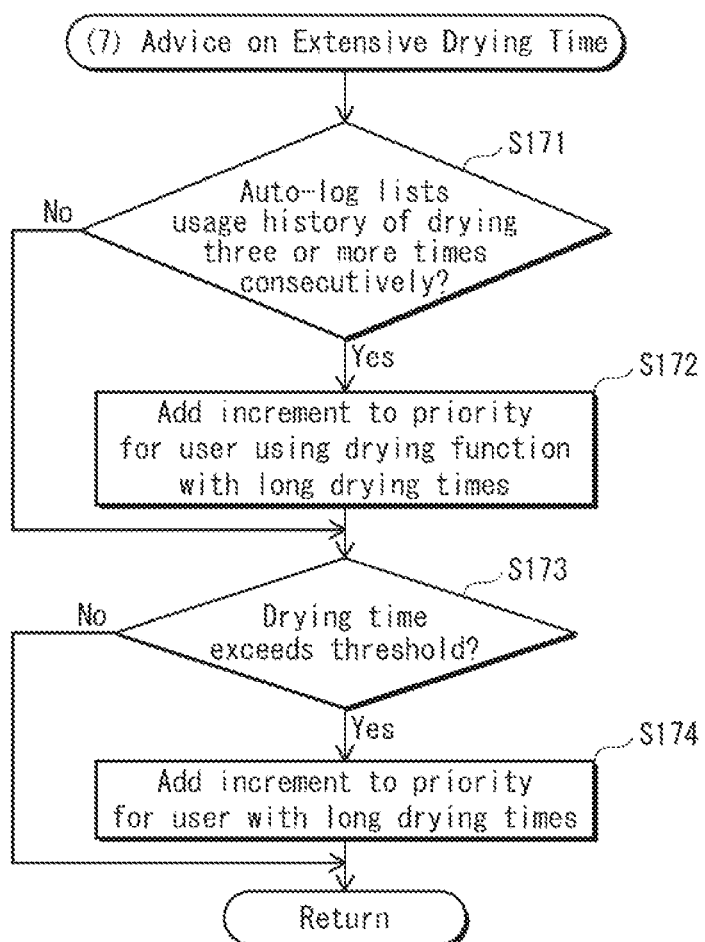
FIG. 27 is a flowchart indicating the processing for priority attachment for the advice on extensive drying time.

FIG. 27 depicts a flowchart indicating the processing for priority attachment for the advice on extensive drying time. In step S171, a determination is made regarding whether or not the auto-log includes a history of the drying function being used three or more times consecutively. In the affirmative case, then in step S172, an increment is added to the priority of the advice on extensive drying time for the user who performs drying. In step S173, a determination is made regarding whether or not the drying time in the auto-log exceeds a threshold. In the affirmative case, then in step S174, an increment is added to the priority of the advice on extensive drying time for the user who performs extensive drying.

Figure 28:
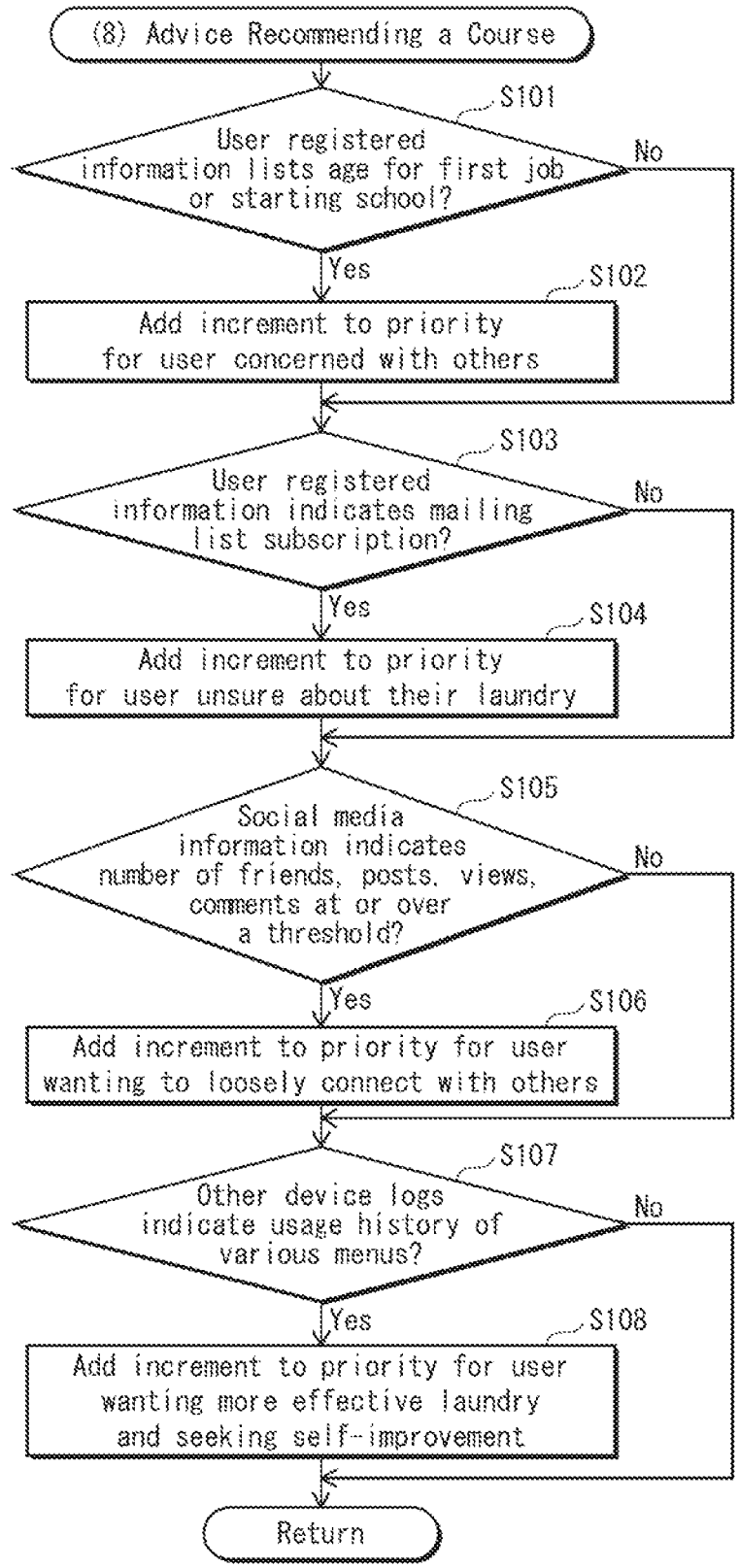
FIG. 28 is a flowchart indicating the details of priority attachment for advice recommending a course.

FIG. 28 depicts a flowchart indicating the details of priority attachment for advice recommending a frequently used course. In step S101, a determination is made regarding whether the registered information for the user indicates a typical of age for entering the workforce or becoming a student. In the affirmative case, then in step S102, an increment is added to the priority of the advice recommending a frequently-used course for the user concerned with others. In the negative case, step S102 is skipped.

In step S103, a determination is made regarding whether or not the user subscribes to a mailing list. In the affirmative case, then in step S104, an increment is added to the priority of the advice recommending a frequently-used course for the user lacking confidence in their own laundry. In the negative case, step S104 is skipped. In step S105, a determination is made regarding whether a number of friends, posts, page views, comments, and so on in the social media information are equal to or greater than a predetermined threshold. In the affirmative case, then in step S106, an increment is added to the priority of the advice recommending a frequently-used course for the user loosely connected with others. In step S107, a determination is made regarding whether or not the other device logs indicate a usage history of many different menus. In the affirmative case, then in step S108, an increment is added to the priority of the advice recommending a frequently-used course for the user wanting to do laundry more efficiently and the user seeking self-improvement. In the negative case, step S108 is skipped.

Figure 29:
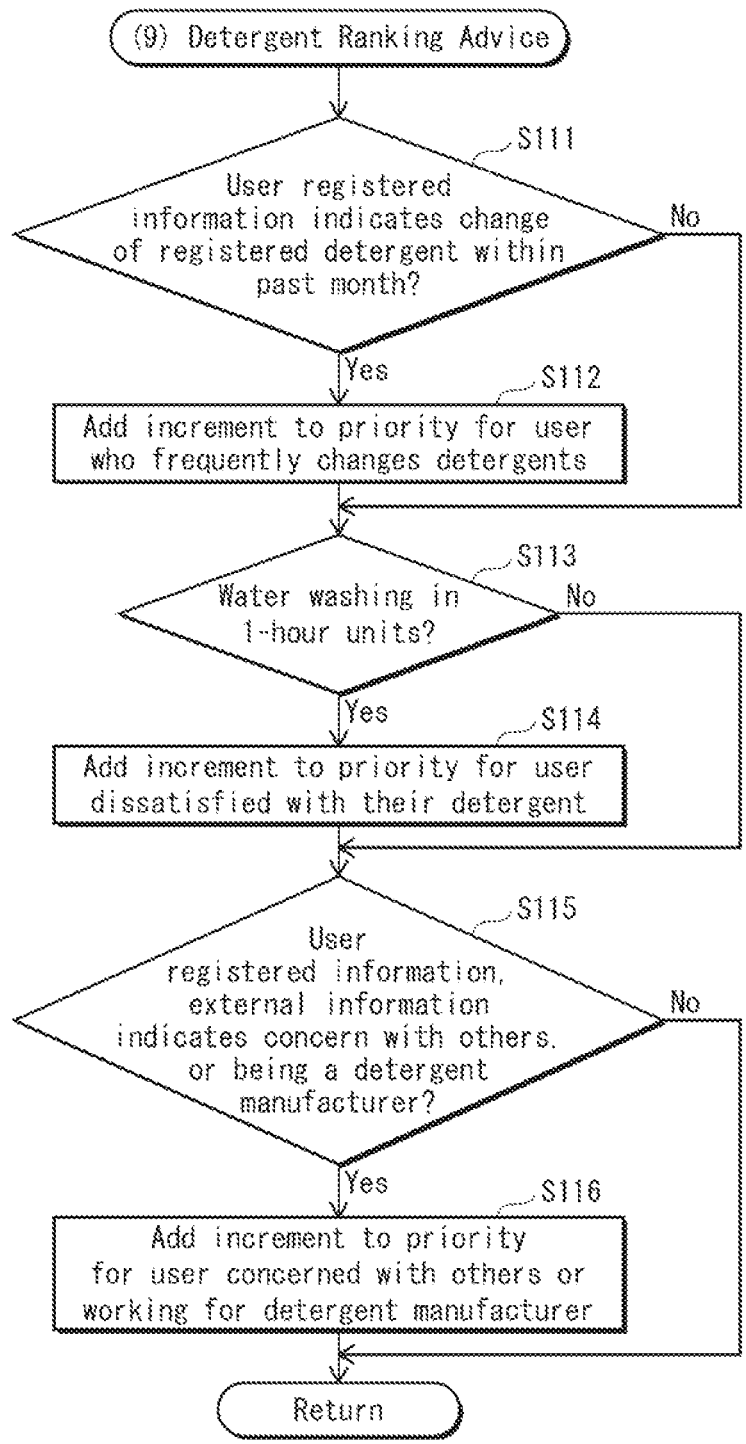
FIG. 29 is a flowchart indicating the details of priority attachment for advice recommending a detergent ranking.

FIG. 29 depicts a flowchart indicating the details of priority attachment for advice recommending a detergent ranking. In step S11, a determination is made regarding whether or not the registered information for the user indicates a change in registered detergent within the past month. In the affirmative case, then in step S112, an increment is added to the advice recommending a detergent ranking for the person who frequently changes detergents. In step S113, a determination is made regarding whether or not rinsing is performed in one-hour units. In the affirmative case, then in step S114, an increment is added to the priority for the detergent ranking for the person dissatisfied with their current detergent. In the negative case, step S114 is skipped. In step S115, a determination is made regarding whether or not the registered information or the external information for the user indicate a person concerned with others or a person working for a detergent manufacturer. In the affirmative case, then in step S116, an increment is added to the priority of the detergent ranking for the person concerned with others and the person working for a detergent manufacturer. In the negative case, step S116 is skipped.

Figure 30:
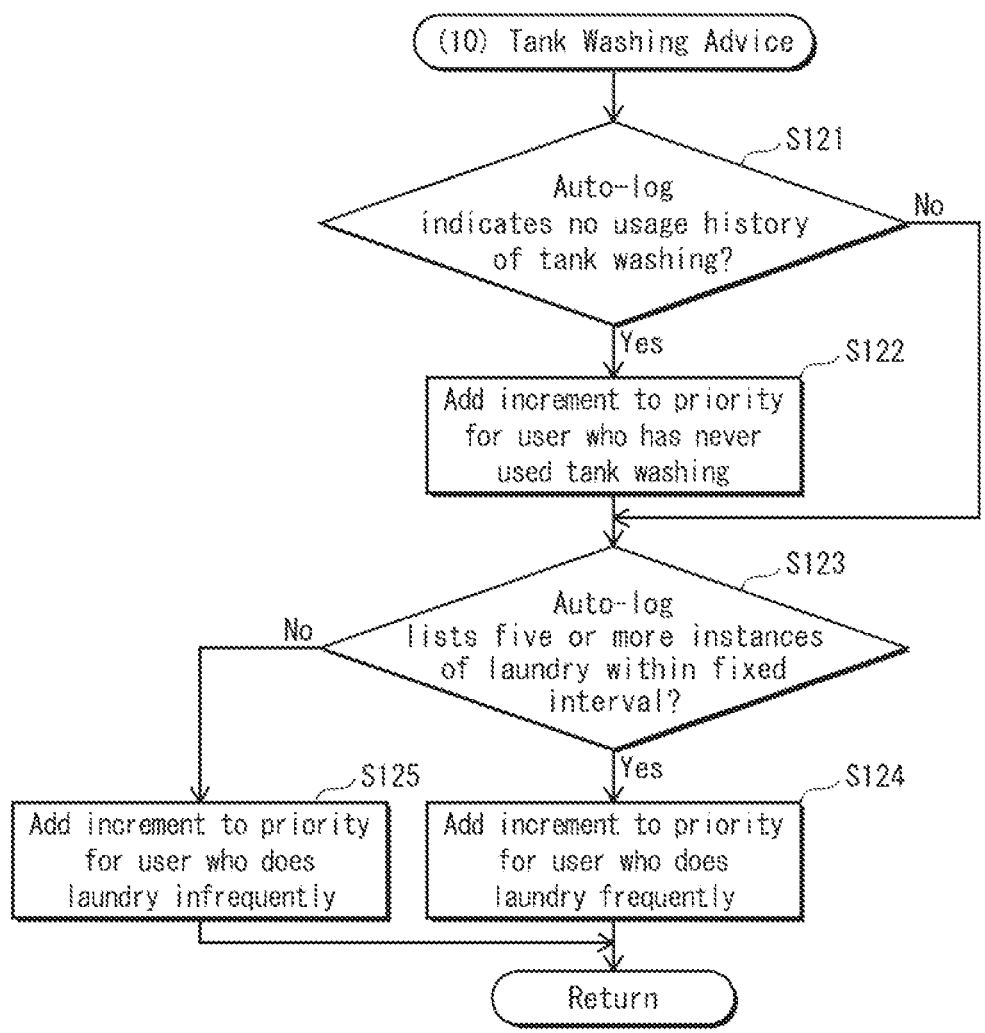
FIG. 30 is a flowchart indicating details of advice recommending tank washing.

FIG. 30 depicts a flowchart indicating details of advice recommending tank washing. In step S121, a determination is made regarding whether or not the auto-log indicates a usage history of tank washing. In the affirmative case, then in step S122, an increment is added to the priority of the advice recommending tank washing for the user who does not wash the tank. In the negative case, step S122 is skipped. In step S123, a determination is made regarding whether or not the auto-log indicates tank washing five times or more within a predetermined period. In the affirmative case, then in step S124, an increment is added to the priority of the advice recommending tank washing for the user who frequently performs tank washing. In the negative case, then in step S125, an increment is added to the priority of the advice recommending tank washing for the person who rarely performs tank washing.

Figure 31:
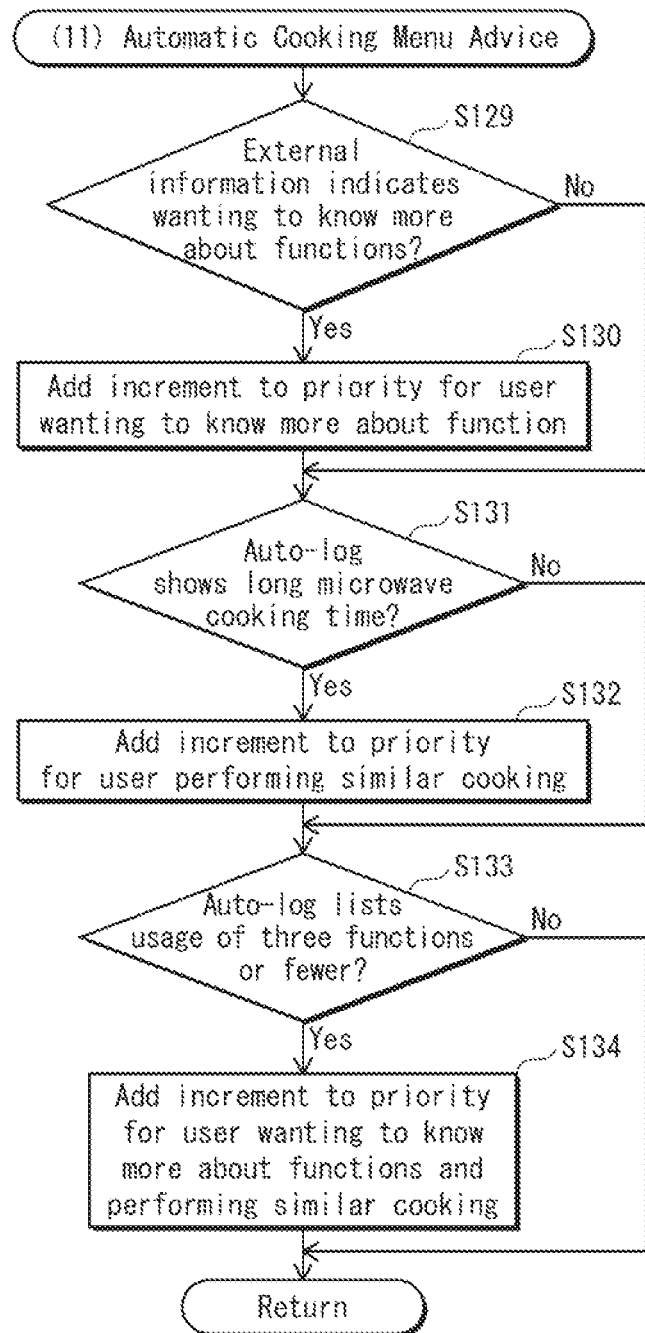
FIG. 31 is a flowchart indicating the details of priority attachment for advice on automated cooking menus.

FIG. 31 depicts a flowchart indicating the details of priority attachment for advice on automated cooking menus. In step S219, a determination is made regarding whether or not the external information suggests wanting such a function but not being aware of it. In the affirmative case, then in step S130, an increment is added to the priority for the person who wants but does not know about the function. In the negative case, step S130 is skipped. In step S131, a determination is made regarding whether or not the auto-log indicates microwave setting times that exceed a threshold. In the affirmative case, then in step S132, an increment is added to the priority of the advice on automated cooking menus for the person performing similar cooking. In the negative case, step S132 is skipped. In step S133, a determination is made regarding whether or not the auto-log indicates a usage history for three or more functions. In the affirmative case, then in step S134, an increment is added to the priority of the advice on automated cooking menus for the person who wants but does not know the function and for the person performing similar cooking. In the negative case, step S134 is skipped.

Figure 32:
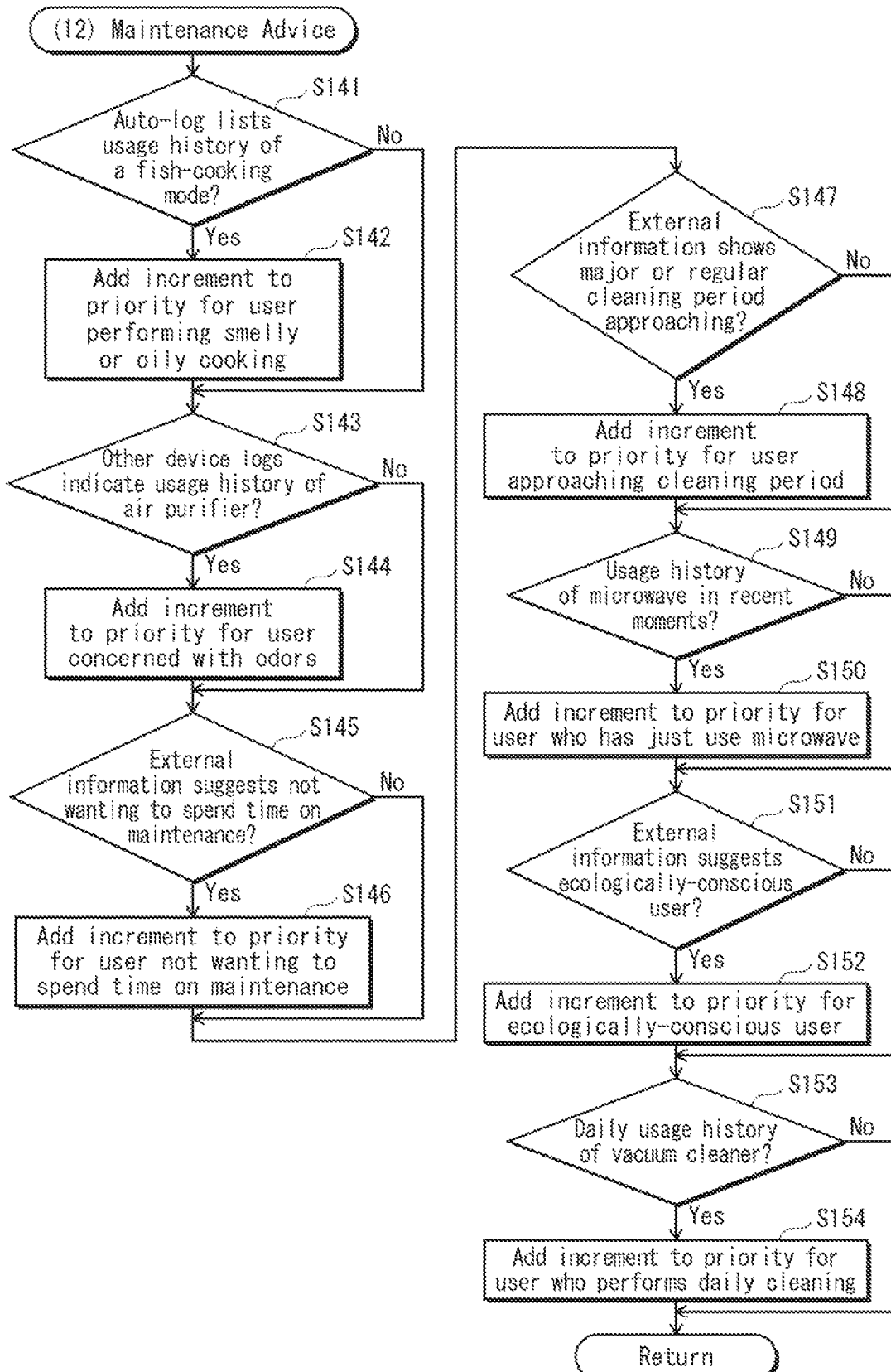
FIG. 32 is a flowchart of the processing for attaching priority to advice on maintenance.

FIG. 32 depicts a flowchart of the processing for attaching priority to advice on maintenance. In step S14, a determination is made regarding whether or not the auto-log indicates a usage history for a fish cooking mode. In the affirmative case, then in step S142, an increment as added to the priority of advice on maintenance for the person cooking food with strong orders and the person cooking oily food. In step S143, a determination is made regarding whether the other device logs indicate a usage history for an air purifier. In the affirmative case, then in step S144, an increment as added to the priority of advice on maintenance for the person cooking food with strong orders and the person cooking oily food. In the negative case, step S114 is skipped.

In step S145, a determination is made regarding whether or not the external information indicates that the user does not want to spend time on maintenance. In the affirmative case, then in step S146, an increment is added for the person who does not want to spend time on maintenance. In the negative case, step S146 is skipped. In step S147, a determination is made regarding whether or not the current date in the external information indicates that a major cleaning or regular cleaning period is approaching. In the affirmative case, then in step S148, an increment is added to the advice on maintenance for the person approaching a major cleaning or regular cleaning period. In the negative case, step S148 is skipped. In step S149, a determination is made regarding whether or not the usage history indicates that the microwave has just been used. In the affirmative case, then in step S150, an increment is added to the priority of the advice on maintenance for the person who has just used the microwave. In the negative case, step S150 is skipped.

Figure 33:
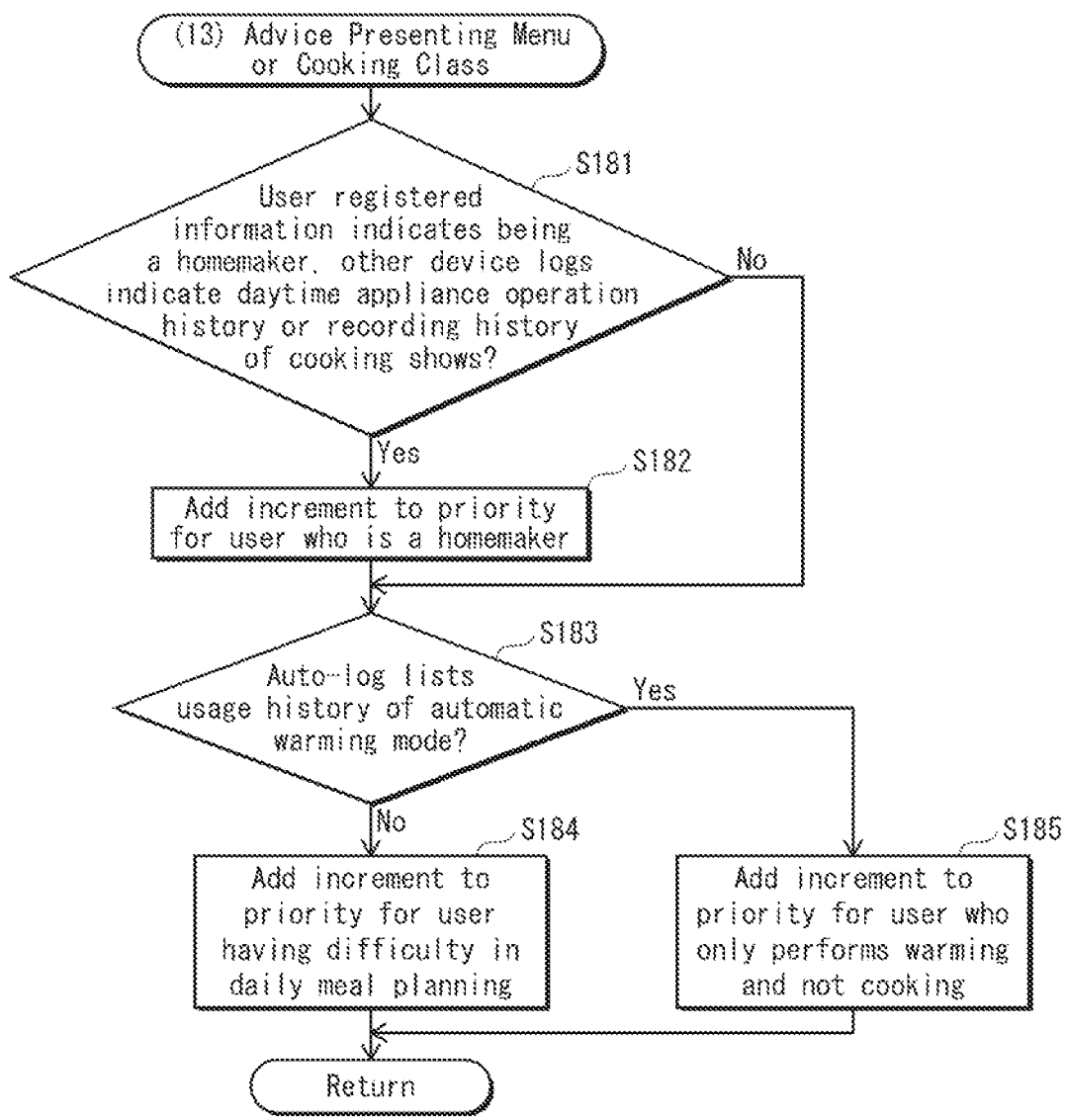
FIG. 33 is a flowchart of processing for advice presenting a menu or a cooking class.
Figure 34:
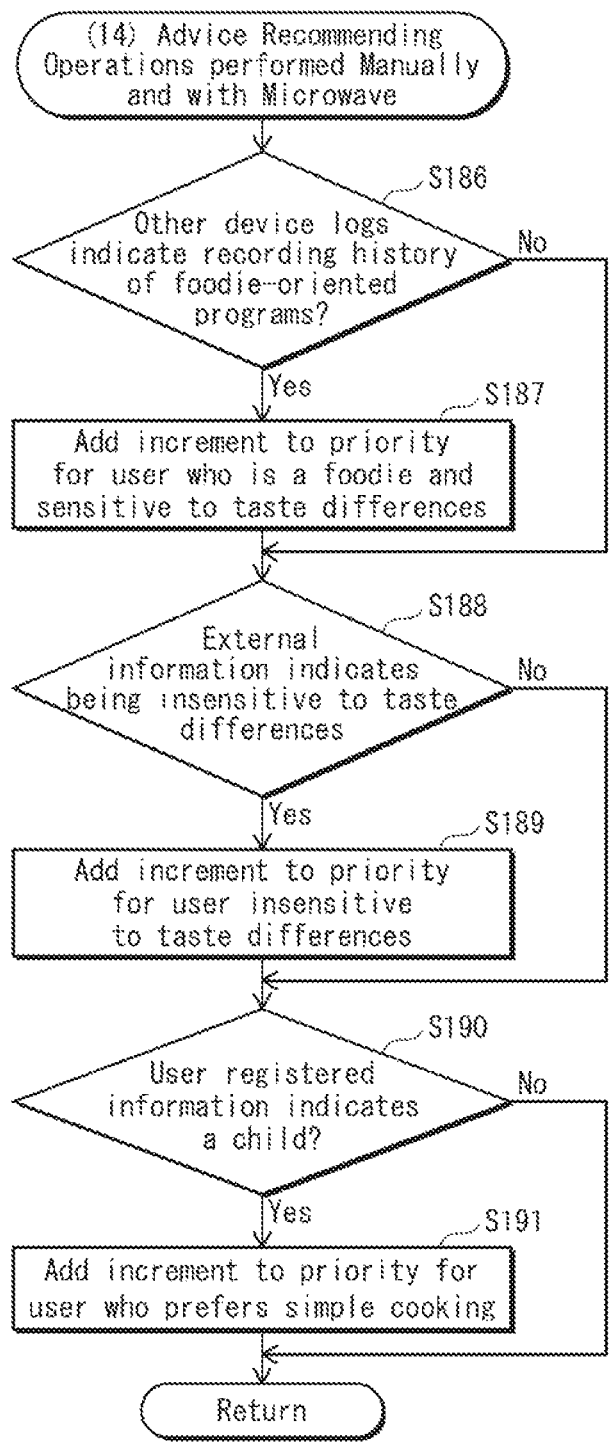
FIG. 34 is a flowchart indicating details of advice recommending operations performed manually and with the microwave.

In step S153, a determination is made regarding whether or not the usage history indicates daily vacuuming. In the affirmative case, then in step S154, an increment is added for the person who performs daily vacuuming. In the negative case, step S154 is skipped. FIG. 33 depicts a flowchart indicating the processing for the advice presenting a menu or a cooking class. In step S181, a determination is made regarding whether or not the registered information for the user indicates that the user is a homemaker, whether or not the other device logs indicate a history of operating devices during the day, and a history of recording cooking classes. In the affirmative case, then in step S182, an increment is added to the priority of the advice presenting a menu or cooking class for the user who is a homemaker. In the negative case, step S182 is skipped. In step S183, a determination is made regarding whether or not the auto-log indicates a usage history for a warming mode. In the negative case, then in step S184, an increment is added to the priority of the advice presenting a menu or cooking class for the user who faces difficulty in daily meal planning. In the affirmative case, then in step S185, an increment is added to the priority of the advice presenting a menu or cooking class for the user who only cooks by warming things up.

Figure 35:
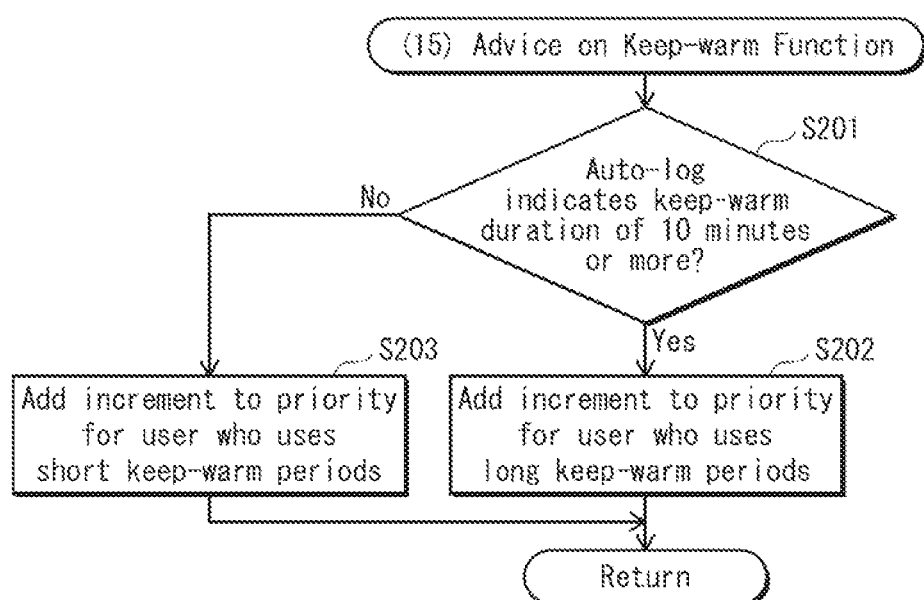
FIG. 35 is a flowchart indicating details of advice on a keep-warm function.

FIG. 35 depicts a flowchart indicating details of advice recommending operations performed manually and with the microwave. In step S186, a determination is made regarding whether or not the other device logs indicate a history of recording foodie-oriented programs. In the affirmative case, then in step S187, an increment is added to the priority of the advice recommending operations performed manually and with the microwave for the person who is a foodie and the person sensitive to taste differences. In the negative case, step S187 is skipped.

In step S188, a determination is made regarding whether or not the external information indicates that the user does not notice taste differences. In the affirmative case, then in step S189, an increment is added to the priority of the advice recommending operations performed manually and with the microwave for the person who is not sensitive to taste differences. In step S190, a determination is made regarding whether or not the registered information for the user indicates a history of recording child-oriented programs. In the affirmative case, then in step S191, an increment is added to the priority of the advice recommending operations performed manually and with the microwave for the person who prefers simple cooking. In the negative case, step S159 is skipped.

FIG. 35 depicts a flowchart indicating details of advice on a keep-warm function. In step S201, a determination is made regarding whether or not the auto-log indicates using the keep-warm function for 10 minutes or longer. In the affirmative case, then in step S202, an increment is added to the priority of the advice on the keep-warm function for the user who uses the keep-warm function for long periods. In the affirmative case, then instep S203, an increment is added to the priority of the advice on the keep-warm function for the user who uses the keep-warm function for short periods.

According to the above-described Embodiment, advice is provided to the user through the terminal 103 in an environment that includes various household appliances such as the laundry machine 31 and the cooking device 32 to indicate which device to use in what manner. As such, the various household appliances are fully utilized without leaving any functions unused.

Embodiment 2

The present Embodiment clarifies the network configuration between the device group, the service provision center, and the service administration center discussed in Embodiment 1.

Figure 36:
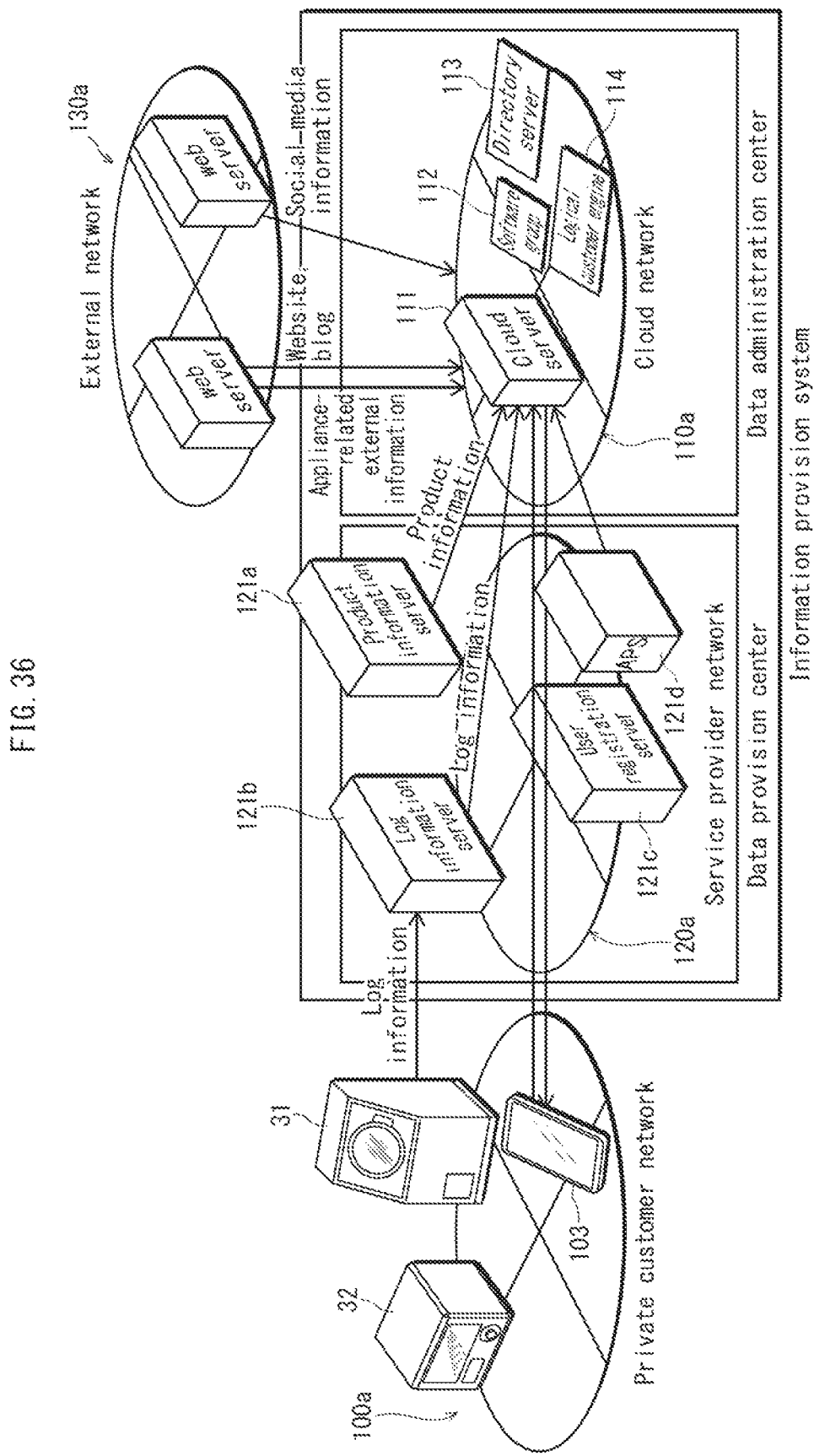
FIG. 36 depicts the network configuration of the information provision system.

FIG. 36 depicts the network configuration of the information provision system. As illustrated, the network configuration of the information provision system includes a private customer network 100a, a service provider network 110a, and a service provider 120a.

The private customer network 100a is an internal network configured from the household appliances that are the subject of the log information and the terminal for advice browsing. FIG. 36 depicts the laundry machine 31, the cooking device 32 and the terminal 103.

The service provider network 110a is the network in the data administration center described in Embodiment 1, running on integrated Elastic Cloud Computing (iEC2) architecture or similar, and being a virtual local area network (hereinafter, VLAN) treated as integral to the service provider network in the data administration center. The service provider network 110a is configured from one or more cloud servers 111, a switch group 112 for connecting among the cloud servers, a directory server 113 managing instances on the cloud servers and switches connecting to the cloud servers in association with a paired IP address and MAC address for a requesting node and a destination node, and a logical customer edge 114 serving as a requesting node in the cloud network (i.e., as the requester for the private customer network).

The service provider network 120a is a network at the service provision center serving as the point of contact for the user. Specifically, the service provider network 120a is an intranet at the service operator, who is a household appliance manufacturer or related service provider, and includes a product information server 121a storing product information for the household appliances and supplying the product information in response to a request from the terminal, a log information server 121b accumulating log information collected from the private customer network and supplying the log information in response to a request from the terminal, a user registration server 121c performing user registration for a user receiving remote service and supplying the registered information obtained from the user registration, and an application provision server (hereinafter, APS) 121d supplying an application to the cloud network. The product information server 121a corresponds to the product data storage 41 of FIG. 7, and the log information server 121b corresponds to the remote support storage 42 of FIG. 7. The user registration server 121c manages the registered user information within the network, as part of the overall user information.

The cloud server 111 receives the log information and product information supplied from the log information server and the product manual server in the service provider network, receives website information, blog information, social media information, and appliance-related external information from a web server of an external network 130a, and supplies the product information and the appliance-related external information to the terminal as one or more pieces of advice.

When a given user logs in, a hypervisor of the cloud server generates an instance of guest operating system (hereinafter, guest OS) corresponding to the logged-in user. As such, the generation of advice objects for that logged-in user, the priority attachment in response to usage conditions and the like for the household appliances of that logged-in user, and the screen construction for that logged-in user are performed using the functions of the guest OS instance. In such cases, the advice object manager 44, the priority attacher 45, and the screen creator 46 are configured as applications running on the guest OS instance.

Figure 37:
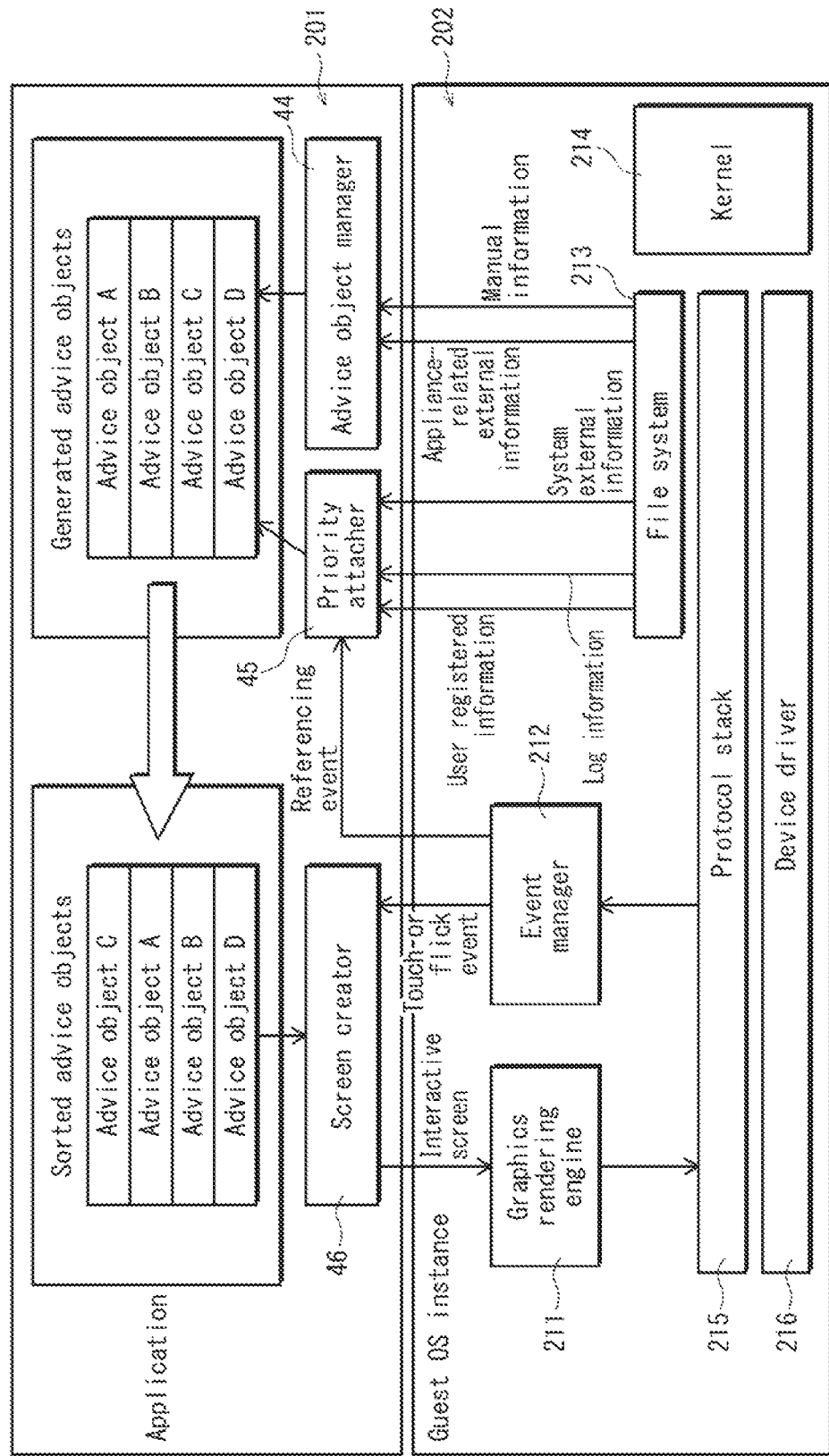
FIG. 37 depicts the internal configuration of the guest OS instance running on the cloud server 111 and the application loaded by the guest OS instance.

FIG. 37 depicts the internal configuration of the guest OS instance running on the cloud server 111 and the application loaded by the guest OS instance.

The guest OS instance 202 monitors for operations made on a GUI and an instance of a graphics rendering engine 211 rendering the GUI menus and windows and so on in response to an API call from the application. When such an operation is made, the guest OS instance 202 makes an instance of an event manager 212 that outputs an event indicating the operation, an instance of a file system 213 for acquiring various files from a network drive or a local drive, an instance of a kernel 214 performing application status management, an instance of a protocol stack 215 executing various protocols for server connection, and an instance of a device driver 216. In the cloud network configured as described above, library program functions taking on the load of middle-ware processing are supplied by the cloud server and not by the terminal 103.

The application 201 includes the advice object manager 44, the priority attacher 45, and the screen creator 46 described in Embodiment, and performs the following functions via the guest OS instance. The operations performed through the guest OS instance include the advice object manager 44 generating the advice objects and the priority attacher 45 modifying priority as per the rules described in Embodiment 1 and attaching priority to the advice objects. The screen creator 46 performs screen creation using the advice objects sorted according to priority to obtain an interactive screen, and supplies the interactive screen to the terminal 103 through the graphics rendering engine 211 and the event manager 215 of the guest OS instance.

Figure 38A:
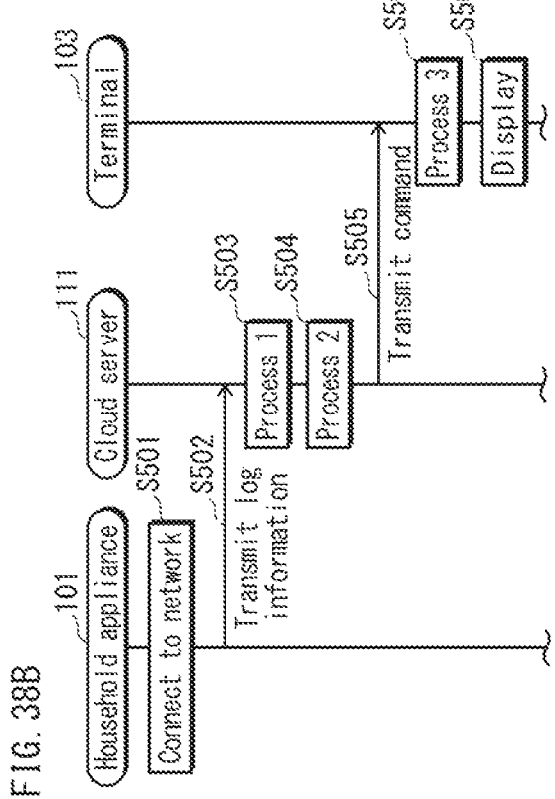
FIG. 38A depicts the household appliance 101 making a network connection (S501), transmitting log information to the cloud server 111, and the cloud server 111 performing processes 1 through 3 as a group.
Figure 38C:
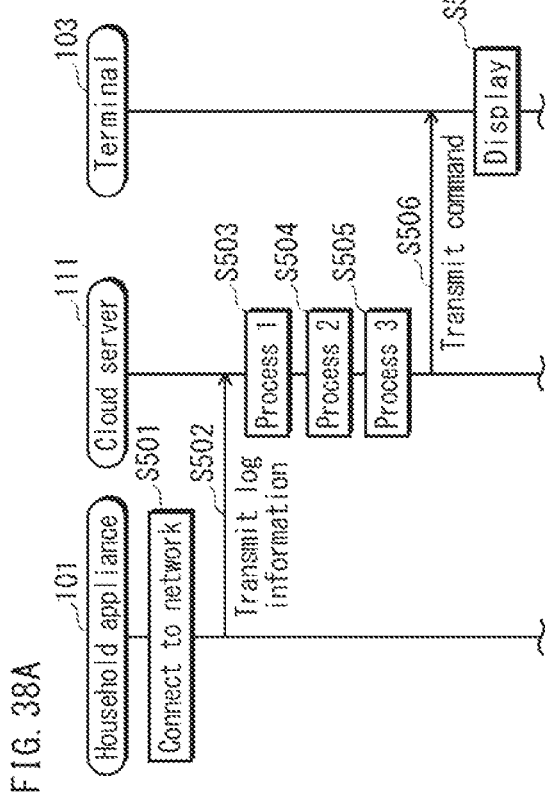
FIG. 38C depicts a sequence in which process 2 and 3 are executed by the terminal 103 rather than the cloud server 111.
Figure 38B:
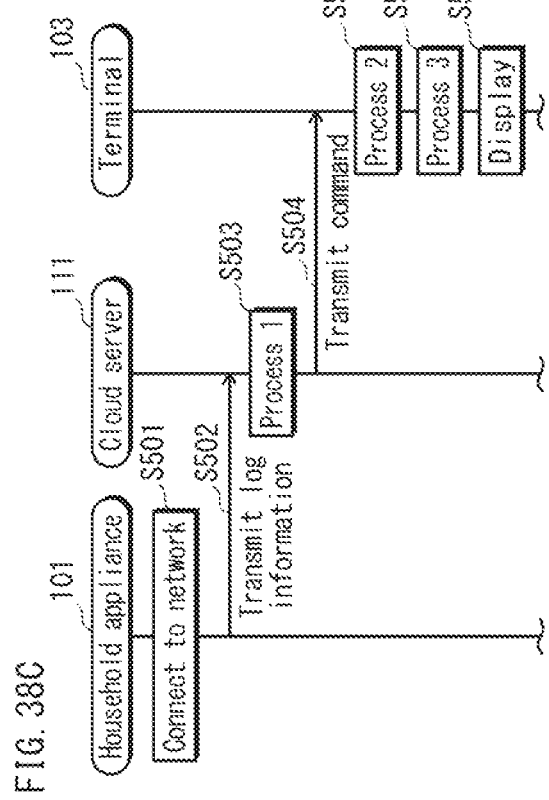
FIG. 38B depicts a sequence in which processes 1 through 3 are performed on the terminal 103 rather than the cloud server 111.

FIGS. 38A through 38C depicts the basic transmission sequence between the cloud server 111 and the terminal 103. In FIG. 38A, the household appliance 101 makes a network connection (S501), transmits the log information to the cloud server 111, and the cloud server 111 performs processes 1 through 3 as a group. Here, process 1 (step S503), process 2 (step S504), and process 3 (step S505) are abstracted out as three process among the flowcharts of FIGS. 19 through 35. Specifically, process 1 is the search for advice using a product code from steps 3 and 4 in the main flowchart of FIG. 19, process 2 is the priority attachment on the pieces of advice from step S6 (including subroutines from FIGS. 20 through 35), and process 3 is the advice display of steps S7 through S12.

Process 1 through 3 result in command transmission (step S506). The terminal 103 performs display in response to the transmitted command (step S507). FIG. 38B depicts a variation of FIG. 38A, differing in that process 1 through 3 are executed by the terminal 103 rather than the cloud server 111. FIG. 38C depicts a variation of FIG. 38A, differing in that process 2 and 3 are executed by the terminal 103 rather than the cloud server 111.

FIGS. 39 through 42 depict four types of cloud services provided by the cloud server.

FIGS. 39 through 42 have the following three points in common. First, the application 201 and the guest OS 202 are running on the data center 203. Second, the log information is transmitted from the device group 100 to the date center 203 (including the cloud server 111) as indicated by arrow 204. Third, the data center 203 supplies advice to the terminal 103 as indicated by arrow 205.

(Service Type 1: Local Data Center)

Figure 39:
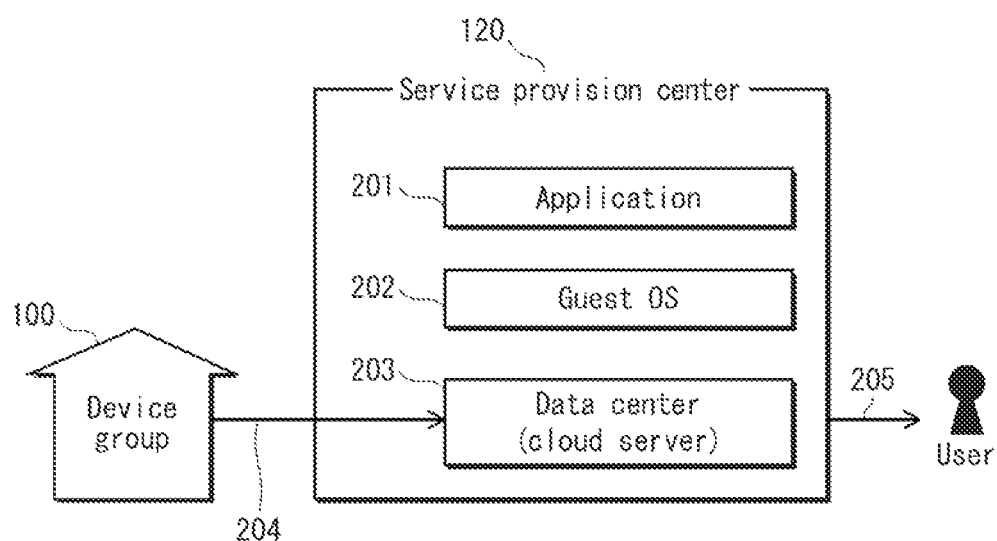
FIG. 39 depicts service type 1 (a local data center).

FIG. 39 depicts service type 1 (a local data center). Here, the service provision center 120 acquires information from the device group 100 and supplies a service to the user. The service provision center 120 serves as the data center operator. That is, the service provider includes the cloud server 111 performing big data management. As such, there is no data center operator.

Here, the data center 203 of the service provision center 120 performs data center (cloud server 111) administration and management. The service provision center 120 also manages the guest OS 202 and the application 201. The service provision center 120 runs the service provider 204 using the guest OS 202 and the application 201 managed by the service provision center 120.

(Service Type 2: IaaS)

Figure 40:
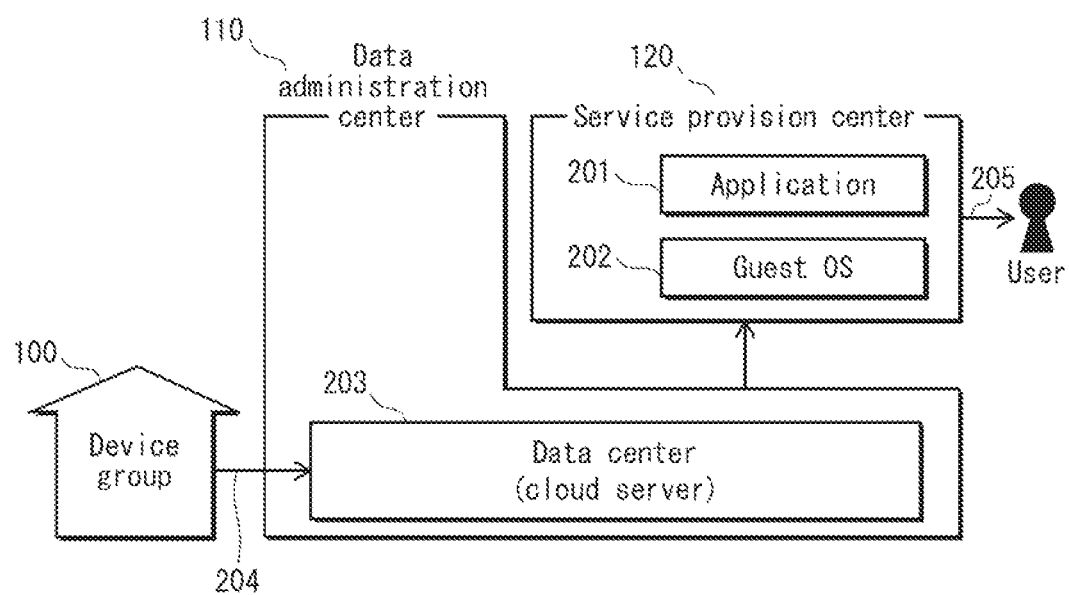
FIG. 40 depicts service type 2 (Infrastructure as a Service, IaaS).

FIG. 40 depicts service type 2 (Infrastructure as a Service, hereinafter IaaS). Here, IaaS is a model in which infrastructure for constructing and operating a computer system is supplied as a cloud service through the Internet. The data center operator administers and manages the data center 203 (corresponding to the cloud server 111). The service provision center 120 also manages the guest OS 202 and the application 201. The service provision center 120 runs the service provider 204 using the guest OS 202 and the application 201 managed by the service provision center 120.

(Service Type 3: PaaS)

Figure 41:
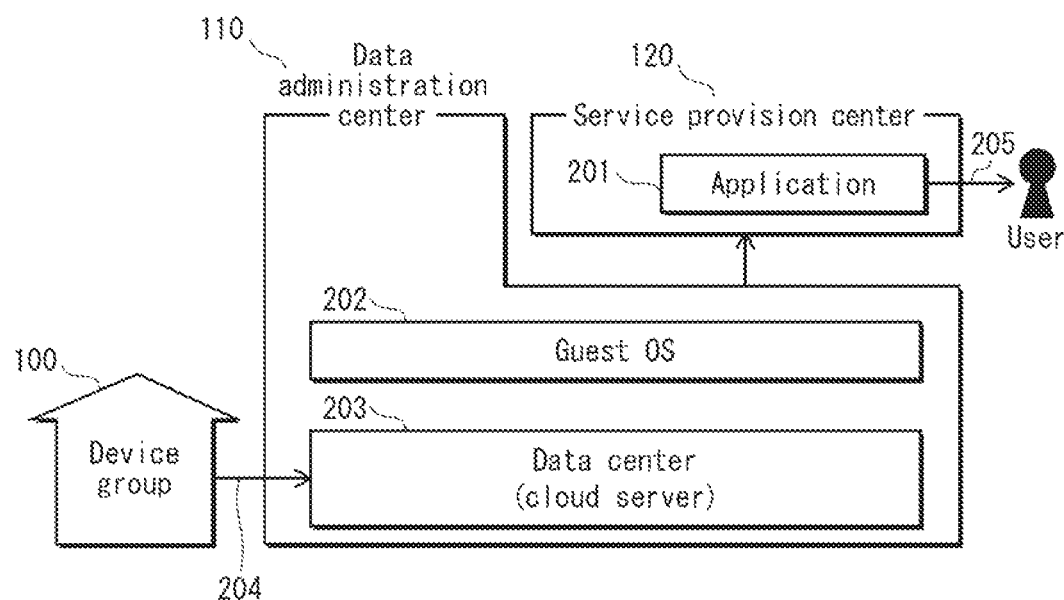
FIG. 41 depicts service type 3 (Platform as a Service, PaaS).

FIG. 41 depicts service type 3 (Platform as a Service, hereinafter PaaS). Here, PaaS is a model in which a platform for constructing and operating a computer system is supplied as a cloud service through the Internet.

Here, the data administration center 110 manages the guest OS 202, and the data center 203 (corresponding to the cloud server 111) performs administration and management. The service provision center 120 also manages the application 201. The service provision center 120 runs the service provider 204 using the guest OS 202 managed by the data center operator and the application 201 managed by the service provision center 120.

(Service Type 4: SaaS)

Figure 42:
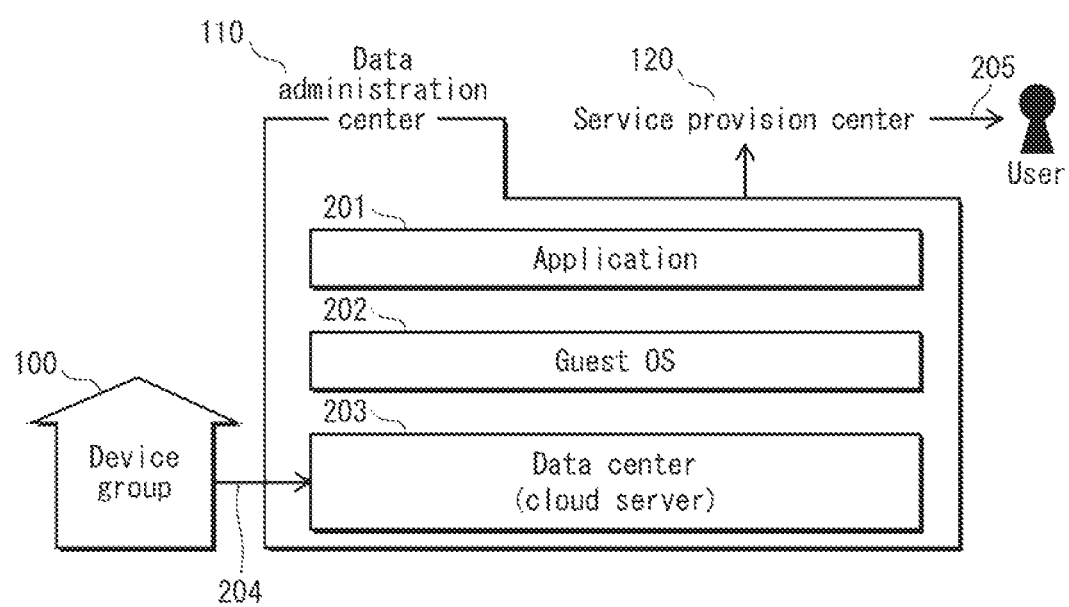
FIG. 42 depicts service type 4 (Software as a Service, SaaS).

FIG. 42 depicts service type 4 (Software as a Service, hereinafter SaaS). In this model, for example, an application provided by a platform provider having a data center (i.e., a cloud server) is supplied to a business or person (i.e., a user) who does not have a data center (i.e., cloud server) as a cloud service using a network such as the Internet.

Here, the data administration center 110 manages the application 201 and the guest OS 202, and the data center 203 (corresponding to the cloud server 111) performs administration and management. The service provision center 120 also runs the service provider 204 using the guest OS 202 and the application 201 managed by the managed by the data center operator 110. The main actor in service provision is the service provision center 120 in all of the above service types. For example, the service provider or the data center operator may also develop their own OS, application, or big data center, or may order any of these from a third party.

Embodiment 3

The present Embodiment provides an improvement to display of the advice objects in association with the respective household appliances. Specifically, this involves displaying an image of the room in which the household appliances are located, and compositing a highest-priority advice object with each of the household appliances in the room image. The room image is a perspective view or a bird's-eye view of the room composited with drawings of the household appliances. The household appliance image is image data in a format such as TIFF, JPEG, or PNG.

Upon user registration, the screen creator 46 displays a selection screen and queries the user for a room type in which the household appliances are located (e.g., kitchen, living room, washroom, bathroom, bedroom, drawing room). Once the room type is determined, a room image for that type of room is displayed a background image, composited with household appliance drawings corresponding to the household appliances owned by the user. As such, a room layout is created with the household appliance drawings composited therein. Afterward, the household appliance drawing having the highest priority advice object is composited.

An advice object to be viewed by the logged-in user is displayed in association with the household appliance disposed in the room on an interactive screen. Thus, the user quickly understands what to do by looking at the advice objects and is easily able to directly handle the advice objects.

Figure 43:
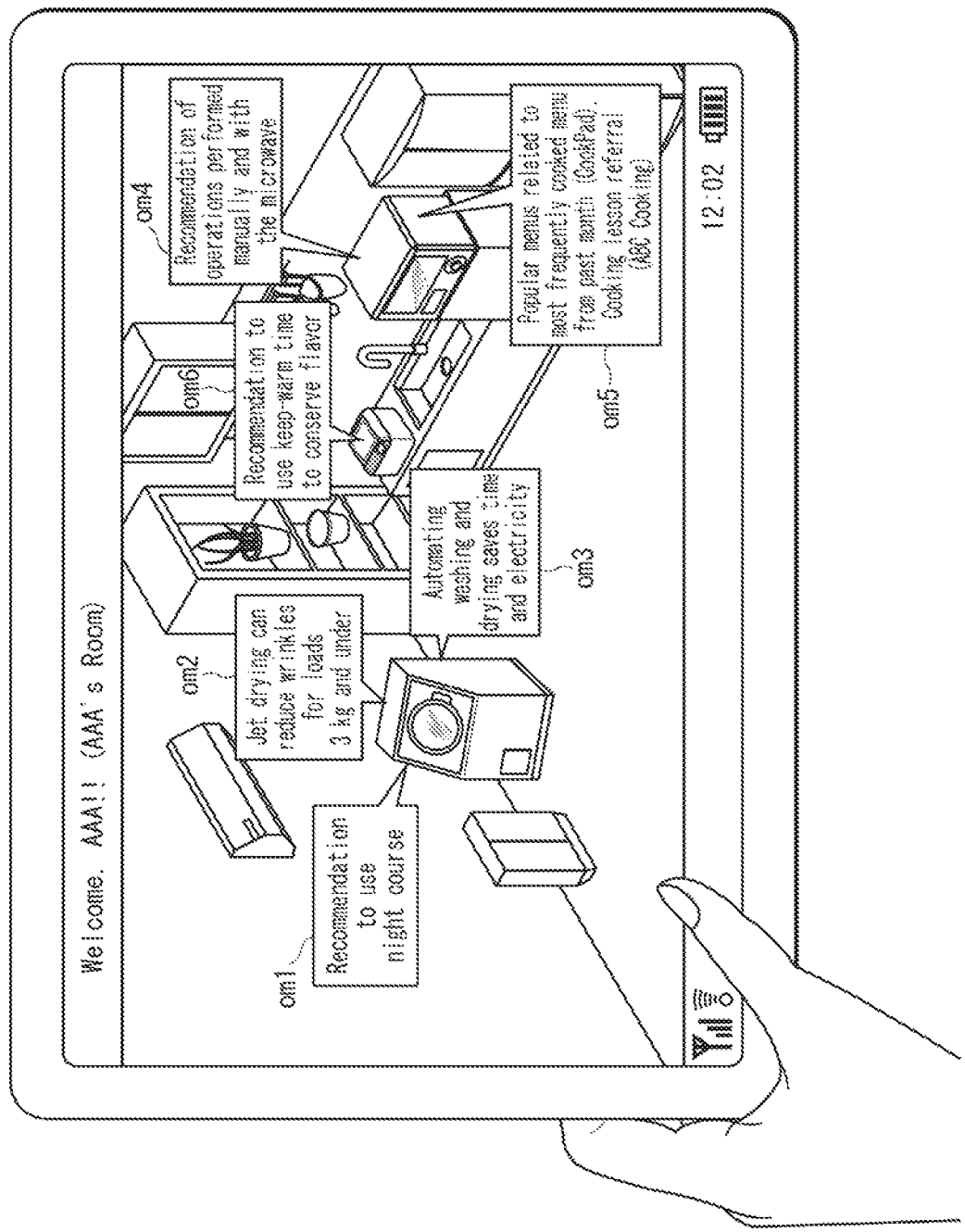
FIG. 43 illustrates an example of a screen on the terminal 103 where a room image serves as background image for the user when a plurality of advice objects are displayed.

FIG. 43 illustrates an example of a screen on the terminal 103 where the room image serves as background image for the user when a plurality of advice objects are displayed. Here, the room image is composited with household appliance drawings at predetermined positions, with advice arranged around the household appliance drawings. In FIG. 43, abbreviated display om1, om2, and om3 each represent abbreviated display of one of three pieces of advice for the laundry machine described in FIG. 15, abbreviated display om4 and om5 each represent one of two pieces of advice described in FIG. 17B, and abbreviated display om6 represents a piece of advice described in FIG. 17B.

Various fixtures, pieces of furniture, and household appliances to be included in the room image may be created using three-dimensional model data. The screen creator 45 performs a sequence or rendering operations such as coordinate conversion, shading calculation, texture mapping, and viewpoint conversion on the three-dimensional model data to define three-dimensional fixtures, pieces of furniture, and household appliances, making the three-dimensional models visible. Accordingly, advice objects are displayed around the household appliances among the visible fixtures, pieces of furniture, and household appliances in the three-dimensional model. As such, the advice to be referenced by the user is displayed in a game-like format.

According to the above-described Embodiment, the advice objects are displayed in a format of association with household appliance drawings appearing in a room image, thus providing direct, viewer-friendly, easy-to-understand advice.

Embodiment 4

The present Embodiment pertains to improvements applied when the remote support storage 42 described in FIG. 7 for storing the log information is realized as part of a big data storage system. The scale of information in auto-log and other device logs generated by the household appliances used by an unspecified large number of users may be on the order of several megabytes to gigabytes per second, requiring a large storage capacity on that level. A big data storage system is beneficially provided at the data provision center to store such data in real time. The big data storage system is a network system that includes a plurality of node devices and a name server, as well as a distributed file system, key value storage, and a work load grid.

The distributed file system divides the log information (including auto-logs and other device logs) input thereto by the devices serving as constituent units of the big data into N pieces, and applies a conversion to obtain N pieces of converted results. The N pieces of converted results are then respectively stored on N node device to realize parallel storage. In this type of storage, the address of each node device storing converted results is registered in the name server.

The key value storage is a database system using metadata to manage the converted results obtained by division and conversion. The divided pieces obtained by dividing the log information (log information 1/N) are converted by applying map, shuffle/sort, and reduce operations. The map operation involves further dividing each of log information 1/N into detailed codewords. The shuffle/sort operation involves handling a bit value contained in each codeword as a value and attaching a key to each codeword, the key being metadata characterizing the codeword. Then, a sort operation of sorting the values according to the keys and a shuffle operation of synthesizing the values on a random node device are performed. The reduce operation involves collecting values among the plurality of values generated from the log information 1/N having similar characteristics indicated by the keys into one, to obtain N collected values corresponding to the N pieces of log information 1/N. The metadata serving as the keys may be a usage start time, a continuous duration or a usage end time, usage contents, troubleshooting code, or an error code, as discussed in Embodiment 1. The sort, shuffle, and reduce operations are performed in accordance with the metadata, such that the pieces of log information in various formats are all stored in the log information format discussed in Embodiment 1 and divided into the key value storage.

The work load grid allocates a task on the node device to each piece of log information 1/N and obtains collected values by causing the map, shuffle/sort, and reduce operations to be executed as the tasks. The big data storage system manages the log information as key value storage database, thus making the scale of the big data expandable for further storage. Also, converting the N pieces of log information 1/N into collected values enables search response times to be guaranteed within a predetermined time.

Hadoop on Google may be used as a framework integrating the distributed file system, the key value storage, and the work load grid. The map, shuffle, and reduce operations are grouped and termed MapReduce. Jubatus™ is also available as an analysis framework enabling the MapReduce operation to be performed recursively. Jubatus™ treats a node performing the map operation as a client node, and has a server node termed JukaKeeper provide map and shuffle operations to that client node. Once the client node sends a job such as morphological analysis to JubaKeeper, JubaKeeper performs the map and shuffle operations and a node in charge of reduce operations transfers a collection of values to JubaKeeper as processing results. Jubatus™ enables recursive morphological analysis by mixing the collected values that result from the reduce operation.

The big data storage method is not limited to key value storage. When NoSQL is used, any of an associative array, a structural array, an in-memory database (i.e., forming a database by storing data in memory), and stream data processing may be used. Stream data processing involves processing the data as-is without storage, when the data is produced in compound event processing.

According to the above-described Embodiment, large-scale log information is usable as the basis for attaching priority to the advice, thus making the advice provided to the logged-in user more closely applicable.

(Variations)

The following variations to Embodiments 1, 2, and 3 are also applicable.

(Increments Allocated to High-Priority and Low-Priority Users)

The allocation of increments to high-priority and low-priority users depends on the judgment of the advice provider. The increment allocated to a high-priority user may be computed by adding a predetermined value or applying a predetermined coefficient to the increment allocated to a low-priority user. Also, a difference may be applied such that the increment allocated to a high-priority user may be positive while the increment allocated to a low-priority user is negative.

(Priority Attachment Simplification)

In FIGS. 15, 16A, 16B, 17A, and 17B, the increments allocated to a high-priority user may be uniformly +1 while the increments allocated to a low-priority user may be uniformly −1. As such, descriptions pertaining to the profile of a high-priority person or of a low-priority person may be prioritized by the number of hits when searching the auto-log, the other device logs, and the overall user information. Also, the description of profile characteristics may be satisfied by any of the auto-log, the other device logs, and the overall user information and the priority change may determined may be determined solely by the weighting of the auto-log, the other device logs, and the overall user information.

(Application to Prohibitions)

A large value (e.g., 1000) may be applied as an initial priority, and when a prohibition such as never looking at the advice is applicable to the usage conditions of the household appliance or to the user circumstances, that priority may be decreased.

(Network Configuration)

The private network, the service provider network, and the cloud network described in Embodiment 2 are beneficially configured as packet exchange networks. The cloud network is beneficially configured as a virtual stank identifiable by a common VLAN tag in a virtual private network (hereinafter, VPN) configured using a layer 3 protocol of multiprotocol label switching (hereinafter, MLPS) or similar. A network node serving as a router or switch in the private customer network is beneficially able to communicate with devices both inside and outside the private network 101 using functions of layer 3 communication using MPLS (hereinafter, L3MLPS) and layer 2 communication using Ethernet™ and a virtual private LAN service (hereinafter, VPLS), and so on using a plurality of layers in an OSI reference model.

(Adding Autoscaler and Load Distribution Device)

The cloud server of Embodiment 2 is beneficially equipped with an autoscaler. An autoscaler performs performance monitoring, scaling management, and instance management. Performance monitoring involves collecting performance data from a sequence of guest OS instances, calculating system performance based on performance metrics that are calculated according to the collected performance data, and generating metrics indicating an average number of requests completed per second, response times, and so on. Furthermore, the cloud network of Embodiment 2 is beneficially equipped with a load distribution device. The load distribution device is connected to a sequence of guest OS instances through a secure plain connection in the data link layer, and distributes the work among internal servers and/or guest OS instances. The distribution is, for example, based on a weighted round robin, a minimum connection, or fastest processing. In Embodiment 2, the auto-log and other device logs are managed daily and cumulatively for a plurality of products in a variety of shops, producing an enormous amount of data. However, the above-described autoscaler and load distribution device change the number of generated guest OS instances in accordance with a request from the screen creator 46. Thus, an information provision request from the screen creator 46 receives a quick response even when the usage history for the household appliance accumulated daily in a variety of shops reaches an extremely large volume.

(Screen Image Variations)

The screen images depicted in FIGS. 5, 6A-6D, 10A, 10B, 11A-11E, 12A-12C, 13A-13D, 14A, and 14B are merely examples of the GUI configured from a combination of various widgets. The screen images in each of the Embodiments may be any images accomplishing the goal of promoting sales of products in a shop. Specifically, the screen created by the screen creator 46 is widely construed to encompass the GUI constructed according to the following.

When a selection pertaining to some sort of advice object is expected, the screen creator 46 uses an interactive screen configuration made of widgets such as a toggle button, a radio button, a list box, a slider, a check-box, a spin button (or drop-down list), a toolbar, a combo box, an icon, a tree view, and so on.

When displaying an advice object to encourage an operation by the user, an interactive screen is made from widgets such as a tab, a scroll bar, and so on.

When expecting text input from the user in response to a displayed advice object, an interactive screen is made from widgets such as a text box, a combo box, and so on.

When providing feedback to the user in response to a user operation while displaying a advice object, an interactive screen is made from widgets such as a label, a tool tip, a help balloon, a progress bar, an info bar, and so on.

When the main data of the advice object is text data in an HTML, or XML format, display may be performed using an interactive screen is made from widgets such as a modal window, a palette window, and so on.

INDUSTRIAL APPLICABILITY

The present disclosure encourages use of household appliances, and is thus applicable to the household appliance manufacturing industry.

REFERENCE SIGNS LIST

101 Device group
110 Data center administration company
111 Cloud server

The invention claimed is:

1. An advice provision method used by a system providing a plurality of pieces of advice pertaining to each of a plurality of household appliances on a user terminal,
receiving (1) first household appliance log information indicating a usage condition of a first household appliance among the household appliances and second household appliance log information indicating a usage condition of a second household appliance among the household appliances, and (2) product information of the first household appliance,
the product information includes a plurality of pieces of advice pertaining to the first household appliance,
with respect to each of the pieces of advice, an indication is defined regarding a profile of a user with respect to which priority corresponding to the piece of advice needs to be changed,
searching, with respect to each of the pieces of advice, the first household appliance log information, and the second household appliance log information for the indication regarding the profile of the user with respect to which the corresponding priority needs to be changed;
performing, with respect to each of the pieces of advice, priority update by increasing the corresponding priority by a predetermined increment, when the searching finds the indication regarding the profile of the user in any of the first household appliance log information, and the second household appliance log information; and
providing the user terminal with two or more pieces of advice corresponding to a higher priority among the pieces of advice as a result of the priority update.

2. The advice provision method of claim 1, further comprising
performing priority calculation with respect to each of the pieces of advice, when the indication regarding the profile of the user who needs to refer to the piece of advice is present in any of the first household appliance log information and the second household appliance log information, the priority calculation being performed with respect to each of the indications regarding the profile of the user, by performing a summation operation taking a sum upon application of a weighting coefficient by an increment in accordance with the any of the first household appliance log information and the second household appliance log information, by performing addition in accordance with a reference count by another user of the piece of advice, and by performing subtraction in accordance with a reference count by the user of the piece of advice.

3. The advice provision method of claim 1, further comprising:
comparing the first household appliance log information and the second household appliance log information in terms of newness; and
weighting the priority according to comparison results, wherein
the comparing and the weighting are performed when changing the priority corresponding to each of the pieces of advice according to at least one of the first household appliance log information and the second household appliance log information.

4. The advice provision method of claim 1, further comprising:
judging which of the first household appliance log information and the second household appliance log information has triggered a change in the priority; and
weighting the priority according to a result of the judging, wherein
the judging and the weighting are performed when changing the priority corresponding to each of the pieces of advice according to at least one of the first household appliance log information and the second household appliance log information,
the pieces of advice each include manual information and appliance-related external information that is obtainable from an external network via an information provision system and needs to be used in relation to household appliance operation.

5. The advice provision method of claim 4, wherein
weighting heaviness applied in the weighting is high in the order of the first household appliance log information and the second household appliance log information.

6. The advice provision method of claim 1, wherein
when displaying each of the pieces of advice, a reference count by another user of the pieces of advice pertaining to the household appliance is acquired, and
the priority is changed according to the reference count by the other user that is acquired, by weighting the priority of any of the pieces of advice pertaining to the household appliance that have been referenced by the other user.

7. The advice provision method of claim 1, wherein
when displaying each of the pieces of advice, a reference count by the user of the pieces of advice pertaining to the household appliance is acquired, and
the priority is changed according to the reference count by the user that is acquired, by lowering the priority of any of the pieces of advice pertaining to the household appliance that have been referenced by the user.

8. The advice provision method of claim 2, wherein
the first household appliance is a laundry machine,
the pieces of advice include a recommendation to select a silent mode and any of a recommendation to automate washing and drying, a recommendation to use a jet drying function, a recommendation to clean a filter in the laundry machine, a recommendation to suppress excessive use of detergent, a recommendation to use a given detergent, and a recommendation to wash a laundry tank,
the profile of the user who needs to refer to the recommendation to select the silent mode indicates any of:
a usage history of the laundry machine at night;
a usage history of an audiovisual device serving as the second household appliance in a mute mode; and
a setting history of a portable phone serving as the second household appliance in a silent mode,
the profile of the user who needs to refer to the recommendation to automate washing and drying indicates any of:
a history of using a house cleaning mode on the first household appliance;
a power consumption for the first household appliance or the second household appliance that is remarkably lower than other users in similar conditions;
a usage history on high-pollen days; and
a difference in volume between washing and drying,
the profile of the user who needs to refer to the recommendation to use the jet drying function indicates any of:
a change in an amount of laundry washed and dried per load exceeding a predetermined value, the change being indicated in the first household appliance log information;
the user's work address;
a usage history of an iron serving as the second household appliance; and
a time slot during which laundry is done daily,
the profile of the user who needs to refer to the recommendation to clean the filter indicates any of:
a count of filter obstructions that is equal to or greater than a predetermined value; and
a cumulative laundry time that is equal to or greater than a predetermined duration,
the profile of the user who needs to refer to the recommendation to suppress excessive use of detergent indicates any of:
a usage count of a defoamer that is equal to or greater than a predetermined value;
an amount of used detergent that is equal to or greater than a predetermined value; and
a change in registered brand of detergent,
the profile of the user who needs to refer to the recommendation to use the given detergent indicates
a registered brand of detergent, and
the profile of the user who needs to refer to the recommendation to wash the laundry tank indicates any of:
an indication that the laundry tank has not been cleaned; and
a cumulative time of laundry that exceeds a predetermined time.

9. The advice provision method of claim 2, wherein
the first household appliance is a cooking device,
the pieces of advice include a recommendation to perform maintenance on the cooking device and any of a recommendation for an automatically-prepared menu and a recommendation to use process or instructions to which use of the cooking device is applicable,
the profile of the user who needs to refer to the recommendation to perform maintenance on the cooking device indicates any of:
a usage history of frying food; and
a usage history of an air purifier or a vacuum cleaner,
the profile of the user who needs to refer to the recommendation for the automatically-prepared menu indicates a history of cooking time that exceeds a predetermined threshold, and
the profile of the user who needs to refer to the recommendation to use the process or instructions to which use of the cooking device is applicable indicates a history of recording foodie-oriented programs on a recording device serving as the second household appliance and a history of recording children's programming.

10. The advice provision method of claim 1, wherein
the user terminal performs a list display of the pieces of advice, and
when displaying each of the pieces of advice, the list display is performed with each of the pieces of advice ordered according to the priority corresponding thereto.

11. The advice provision method of claim 1, wherein
the user terminal performs a cascade display of the pieces of advice, and when displaying each of the pieces of advice, the cascade display is performed with a high-priority piece of advice displayed as front-most.

12. The advice provision method of claim 1, wherein
the user terminal performs a cyclical display of the pieces of advice, and
when displaying each of the pieces of advice:
the cyclical display is performed by selecting one among high-priority pieces of advice from the pieces of advice pertaining to the household appliance of the user for display on the user terminal, and
one among high-priority pieces of advice from the pieces of advice is re-selected for display on the user terminal after a fixed interval.

13. The advice provision method of claim 1, wherein
when displaying each of the pieces of advice, a high-priority piece of advice among the pieces of advice pertaining to the household appliance of the user is colored in a different display color than other pieces of advice.

14. The advice provision method of claim 1, wherein
an audio notification is made to the user regarding only one among the pieces of advice pertaining to the household appliance of the user judged as having a high priority.

15. The advice provision method of claim 1, wherein
the user terminal displays one among the pieces of advice pertaining to the household appliance of the user deemed as having a high priority along with a condition used in judging the high priority.

16. The advice provision method of claim 1, further comprising:
acquiring log information from the household appliance of the user;
judging, in accordance with the log information, whether any of the pieces of advice pertaining to the household appliance of the user have been used by the user; and
deleting any of the pieces of advice judged to have been used by the user from display.

17. The advice provision method of claim 1, wherein
the household appliance of the user is classified into one of a plurality of categories, and
the user terminal simultaneously displays the pieces of advice pertaining to the household appliance of the user that are classified into the same category.

18. The advice provision method of claim 1, wherein
the user terminal displays an icon representing the household appliance of the user,
the icon is user-selectable, and
the user terminal displays pieces of advice pertaining to the household appliance represented by the icon selected by the user, among the pieces of advice pertaining to the household appliance of the user.

19. The advice provision method of claim 1, wherein
the display screen further has a second region, and
a piece of advice displayed in the first region and a piece of advice displayed in the second region differ in terms of display time.

20. The advice provision method of claim 1, wherein
the pieces of advice are each classified as one of support advice for normally operating a household appliance of the user and recommended advice for further usability within a range of normal operations of the household appliance, and
when a determination is made that both the support advice and the recommended advice need to be displayed as a result of change of the priority corresponding to each of the pieces of advice, a user terminal displays the support advice and the recommended advice in different formats.

21. The advice provision method of claim 20, wherein
a support advice display time is longer than a recommended advice display time.

22. The advice provision method of claim 20, wherein
the user terminal displays the support advice and the recommended advice with different timing.

23. The advice provision method of claim 20, wherein
the user terminal displays the support advice in a full-text format and displays the recommended advice in an abbreviated format.

24. The advice provision method of claim 23, wherein
the recommended advice in the abbreviated format indicates that advice is available.

\* \* \* \* \*